(12) United States Patent
Wengreen et al.

(10) Patent No.: US 11,073,838 B2
(45) Date of Patent: *Jul. 27, 2021

(54) SELF-DRIVING VEHICLE SYSTEMS AND METHODS

(71) Applicant: DRIVENT LLC, Bellevue, WA (US)

(72) Inventors: Eric John Wengreen, Sammamish, WA (US); Wesley Edward Schwie, Minneapolis, MN (US)

(73) Assignee: Drivent LLC, Bellevue, WA (US)

( * ) Notice: Subject to any disclaimer, the term of this patent is extended or adjusted under 35 U.S.C. 154(b) by 282 days.

This patent is subject to a terminal disclaimer.

(21) Appl. No.: 16/367,076

(22) Filed: Mar. 27, 2019

(65) Prior Publication Data

US 2019/0220035 A1 Jul. 18, 2019

Related U.S. Application Data

(63) Continuation-in-part of application No. 16/205,013, filed on Nov. 29, 2018, now Pat. No. 10,303,181, and a continuation-in-part of application No. 16/049,275, filed on Jul. 30, 2018, now Pat. No. 10,274,950, and a continuation-in-part of application No. 15/863,903, filed on Jan. 6, 2018, now Pat. No. 10,255,648, and a continuation-in-part of application No. 16/166,057, (Continued)

(51) Int. Cl.
*G08G 1/127* (2006.01)
*G05D 1/02* (2020.01)
*G05D 1/00* (2006.01)
*G01S 13/931* (2020.01)

(52) U.S. Cl.
CPC ......... *G05D 1/0278* (2013.01); *G05D 1/0088* (2013.01); *G05D 1/0231* (2013.01); *G05D 1/0291* (2013.01); *G01S 13/931* (2013.01); *G05D 2201/0213* (2013.01)

(58) Field of Classification Search
CPC .......... G05D 1/0291; G05D 3/00; G05D 1/02; G05D 1/00; G05D 1/0022; G05D 1/0027; G06Q 50/30; G06Q 1/50; G06Q 20/0855; G06Q 10/06315; G01C 21/36; G01C 21/34; G01C 22/00; G08G 1/123; G08G 1/202; B60S 3/00; B60R 22/48; B60R 25/00; B60R 25/01; B60H 1/00; H04W 52/02

See application file for complete search history.

(56) References Cited

U.S. PATENT DOCUMENTS 4,212,069 A 7/1980 Baumann
5,769,471 A 6/1998 Suzuki
(Continued)

OTHER PUBLICATIONS

Google Self-Driving Vehicle—Online prior to Apr. 13, 2016 at www.google.com/selfdrivingcar/.
(Continued)

*Primary Examiner* — Yuri Kan

(57) ABSTRACT

A vehicle management system can include self-driving vehicles. Before entering a self-driving vehicle, a rider can use a remote computing device to select a pick-up location at which a self-driving vehicle will later pick up the rider. Detecting that the remote computing device is unable to communicate with the vehicle management system can trigger several responses configured to minimize the risk of a self-driving vehicle failing to pick up the rider.

25 Claims, 24 Drawing Sheets

Related U.S. Application Data filed on Oct. 19, 2018, now Pat. No. 10,268,192, and a continuation-in-part of application No. 16/128,334, filed on Sep. 11, 2018, now Pat. No. 10,299,216.

(56) References Cited

U.S. PATENT DOCUMENTS

| | | | |
|---|---|---|---|
| 5,798,695 A | 8/1998 | Metalis | |
| 5,871,063 A | 2/1999 | Young | |
| 5,945,919 A | 8/1999 | Trask | |
| 5,960,523 A | 10/1999 | Husby | |
| 5,986,420 A | 11/1999 | Kato | |
| 6,011,478 A | 1/2000 | Suzuki | |
| 6,081,088 A | 6/2000 | Ishihara | |
| 7,093,515 B2 | 8/2006 | Yamanoi | |
| 7,298,250 B2 | 11/2007 | Inoue | |
| 7,413,357 B2 | 8/2008 | Badalian | |
| 7,698,078 B2 | 4/2010 | Kelty | |
| 7,777,619 B2 | 8/2010 | Yopp | |
| 7,999,701 B1* | 8/2011 | Xu | G08G 1/123 340/994 |
| 8,078,359 B2 | 12/2011 | Small | |
| 8,180,379 B2 | 5/2012 | Forstall | |
| 8,255,124 B2 | 8/2012 | Van Houtan | |
| 8,325,025 B2 | 12/2012 | Morgan | |
| 8,433,934 B1 | 4/2013 | On | |
| 8,634,980 B1 | 1/2014 | Urmson | |
| 8,700,251 B1 | 4/2014 | Zhu | |
| 8,818,608 B2 | 8/2014 | Cullinane | |
| 8,849,494 B1 | 9/2014 | Herbach | |
| 8,874,305 B2 | 10/2014 | Dolgov | |
| 8,948,993 B2 | 2/2015 | Schulman | |
| 8,949,016 B1 | 2/2015 | Ferguson | |
| 8,954,217 B1 | 2/2015 | Montemerlo | |
| 8,954,252 B1 | 2/2015 | Urmson | |
| 8,965,621 B1 | 2/2015 | Urmson | |
| 8,996,224 B1 | 3/2015 | Herbach | |
| 9,008,890 B1 | 4/2015 | Herbach | |
| 9,019,107 B2 | 4/2015 | Biondo | |
| 9,026,300 B2 | 5/2015 | Ferguson | |
| 9,119,038 B2 | 8/2015 | Woods | |
| 9,120,484 B1 | 9/2015 | Ferguson | |
| 9,120,485 B1 | 9/2015 | Dolgov | |
| 9,139,133 B2 | 9/2015 | Eng | |
| 9,194,168 B1 | 11/2015 | Lu | |
| 9,262,914 B2 | 2/2016 | Purushothaman | |
| 9,272,713 B1 | 3/2016 | Dvoskin | |
| 9,290,174 B1 | 3/2016 | Zagorski | |
| 9,429,947 B1 | 8/2016 | Wengreen | |
| 9,459,622 B2 | 10/2016 | Abhyanker | |
| 9,514,623 B1 | 12/2016 | Urrutia | |
| 9,527,217 B1 | 12/2016 | Lowy | |
| 9,562,785 B1* | 2/2017 | Racah | G01C 21/343 |
| 9,646,356 B1 | 5/2017 | Schwie | |
| 9,685,058 B2 | 6/2017 | Schmidt | |
| 9,733,096 B2 | 8/2017 | Colijn | |
| 9,915,949 B2 | 3/2018 | Schwie | |
| 9,916,703 B2 | 3/2018 | Levinson | |
| 9,953,283 B2 | 4/2018 | Sweeney | |
| 9,953,539 B1* | 4/2018 | Gkiotsalitis | G06N 5/04 |
| 10,036,642 B2 | 7/2018 | Ross | |
| 10,050,760 B2 | 8/2018 | Ross | |
| 10,082,789 B1 | 9/2018 | Szybalski | |
| 10,093,324 B1 | 10/2018 | Szybalski | |
| 10,115,029 B1 | 10/2018 | Day | |
| 10,127,795 B1 | 11/2018 | Hwang | |
| 10,223,844 B1 | 3/2019 | Schwie | |
| 10,255,648 B2* | 4/2019 | Wengreen | G05D 1/0027 |
| 10,268,192 B1* | 4/2019 | Wengreen | G05D 1/0088 |
| 10,299,216 B1* | 5/2019 | Wengreen | G08G 1/202 |
| 10,303,181 B1* | 5/2019 | Wengreen | G05D 1/0291 |
| 10,466,057 B1* | 11/2019 | Schwie | G06N 20/00 |
| 10,471,804 B1* | 11/2019 | Wengreen | B60H 1/00828 |
| 10,474,154 B1* | 11/2019 | Wengreen | G05D 1/0287 |
| 10,479,319 B1* | 11/2019 | Wengreen | E05B 81/56 |
| 10,481,606 B1* | 11/2019 | Wengreen | G06K 9/00791 |
| 10,493,952 B1* | 12/2019 | Schwie | E05F 15/72 |
| 10,744,976 B1* | 8/2020 | Wengreen | G07F 17/0057 |
| 10,794,714 B2* | 10/2020 | Schwie | G08G 1/202 |
| 10,832,569 B2* | 11/2020 | Wengreen | G08G 1/096783 |
| 10,900,792 B2* | 1/2021 | Wengreen | G05D 1/0088 |
| 2002/0077876 A1 | 6/2002 | O'Meara | |
| 2002/0121291 A1* | 9/2002 | Daum | B60S 3/008 134/8 |
| 2003/0195696 A1 | 10/2003 | Jones | |
| 2003/0214585 A1 | 11/2003 | Bakewall | |
| 2004/0068354 A1 | 4/2004 | Tabe | |
| 2004/0076280 A1 | 4/2004 | Ando | |
| 2004/0219933 A1 | 11/2004 | Faith | |
| 2007/0096447 A1 | 5/2007 | Tabe | |
| 2007/0132567 A1 | 6/2007 | Schofield | |
| 2007/0198144 A1 | 8/2007 | Norris | |
| 2008/0030906 A1 | 2/2008 | Sato | |
| 2008/0144944 A1 | 6/2008 | Breed | |
| 2009/0140886 A1 | 6/2009 | Bender | |
| 2009/0287367 A1 | 11/2009 | Salinger | |
| 2010/0169199 A1 | 7/2010 | Fuller | |
| 2011/0059341 A1 | 3/2011 | Matsumoto | |
| 2011/0098017 A1 | 4/2011 | Berry | |
| 2011/0267186 A1 | 11/2011 | Rao | |
| 2012/0009845 A1 | 1/2012 | Schmelzer | |
| 2012/0083960 A1 | 4/2012 | Zhu | |
| 2012/0158251 A1 | 8/2012 | Van Houtan | |
| 2013/0085817 A1 | 4/2013 | Pinkus | |
| 2013/0132140 A1 | 5/2013 | Amin | |
| 2013/0138460 A1 | 5/2013 | Schumann, Jr. | |
| 2013/0197674 A1 | 8/2013 | Lowry | |
| 2013/0231824 A1 | 9/2013 | Wilson | |
| 2013/0246301 A1 | 9/2013 | Radhakrishnan | |
| 2013/0335213 A1 | 12/2013 | Sherony | |
| 2014/0129132 A1 | 5/2014 | Yoshizu | |
| 2014/0129951 A1 | 5/2014 | Amin | |
| 2014/0172727 A1 | 6/2014 | Abhyanker | |
| 2014/0253314 A1 | 9/2014 | Rambadt | |
| 2014/0316616 A1 | 10/2014 | Kugelmass | |
| 2014/0336935 A1 | 11/2014 | Zhu | |
| 2014/0350855 A1 | 11/2014 | Vishnuvajhala | |
| 2015/0012833 A1 | 1/2015 | Foy | |
| 2015/0046080 A1 | 2/2015 | Wesselius | |
| 2015/0066284 A1 | 3/2015 | Yopp | |
| 2015/0088421 A1 | 3/2015 | Foster | |
| 2015/0120504 A1 | 4/2015 | Todasco | |
| 2015/0148077 A1 | 5/2015 | Jelle | |
| 2015/0149283 A1 | 5/2015 | Horstemeyer | |
| 2015/0185034 A1 | 7/2015 | Abhyanker | |
| 2015/0199619 A1 | 7/2015 | Ichinose | |
| 2015/0248689 A1 | 9/2015 | Paul | |
| 2015/0271290 A1 | 9/2015 | Tao | |
| 2015/0295949 A1 | 10/2015 | Chizeck | |
| 2015/0339923 A1 | 11/2015 | Konig | |
| 2015/0339928 A1 | 11/2015 | Ramanujam | |
| 2015/0346727 A1 | 12/2015 | Ramanujam | |
| 2015/0348221 A1 | 12/2015 | Pedersen | |
| 2016/0027306 A1 | 1/2016 | Lambert | |
| 2016/0027307 A1 | 1/2016 | Abhyanker | |
| 2016/0034828 A1 | 2/2016 | Sarawgi | |
| 2016/0034845 A1 | 2/2016 | Hiyama | |
| 2016/0046261 A1 | 2/2016 | Gulash | |
| 2016/0071056 A1 | 3/2016 | Ellison | |
| 2016/0092976 A1 | 3/2016 | Marusyk | |
| 2016/0116293 A1 | 4/2016 | Grover | |
| 2016/0125735 A1 | 5/2016 | Tuukkanen | |
| 2016/0140835 A1 | 5/2016 | Smith | |
| 2016/0129880 A1 | 6/2016 | Cuddihy | |
| 2016/0182170 A1 | 6/2016 | Daoura | |
| 2016/0187150 A1 | 6/2016 | Sherman | |
| 2016/0209220 A1 | 7/2016 | Laetz | |
| 2016/0209843 A1 | 7/2016 | Meuleau | |
| 2016/0216130 A1 | 7/2016 | Abramson | |
| 2016/0227193 A1 | 8/2016 | Osterwood | |
| 2016/0247095 A1 | 8/2016 | Scicluna | |
| 2016/0247106 A1 | 8/2016 | Dalloro | |
| 2016/0247109 A1 | 8/2016 | Scicluna | |
| 2016/0264021 A1 | 9/2016 | Gillett | |
| 2016/0277560 A1 | 9/2016 | Gruberman | |

(56) References Cited

U.S. PATENT DOCUMENTS

| | | |
|---|---|---|
| 2016/0301698 A1 | 10/2016 | Katara |
| 2016/0342934 A1 | 11/2016 | Michalik |
| 2016/0360382 A1 | 12/2016 | Gross |
| 2016/0364812 A1 | 12/2016 | Cao |
| 2016/0364823 A1 | 12/2016 | Coa |
| 2016/0370194 A1 | 12/2016 | Colijn |
| 2017/0024393 A1 | 1/2017 | Choksi |
| 2017/0050321 A1 | 2/2017 | Look |
| 2017/0068245 A1 | 3/2017 | Scofield |
| 2017/0075358 A1 | 3/2017 | Zhang |
| 2017/0089715 A1 | 3/2017 | Guo |
| 2017/0090480 A1 | 3/2017 | Ho |
| 2017/0103490 A1 | 4/2017 | Haparnas |
| 2017/0127215 A1 | 5/2017 | Khan |
| 2017/0129399 A1 | 5/2017 | Appukutty |
| 2017/0132540 A1 | 5/2017 | Haparnas |
| 2017/0144774 A1 | 5/2017 | Pollard |
| 2017/0147951 A1 | 5/2017 | Meyer |
| 2017/0147959 A1 | 5/2017 | Sweeney |
| 2017/0213165 A1 | 7/2017 | Stauffer |
| 2017/0248949 A1 | 8/2017 | Moran |
| 2017/0277191 A1 | 9/2017 | Fairfield |
| 2017/0300053 A1 | 10/2017 | Wengreen |
| 2017/0301220 A1 | 10/2017 | Jarrell |
| 2017/0313321 A1 | 11/2017 | Jefferies |
| 2017/0316516 A1 | 11/2017 | Goldman-Shenhar |
| 2017/0316533 A1 | 11/2017 | Goldman-Shenhar |
| 2017/0316621 A1 | 11/2017 | Jefferies |
| 2017/0327082 A1 | 11/2017 | Kamhi |
| 2017/0337437 A1 | 11/2017 | Kanagaraj |
| 2017/0344010 A1 | 11/2017 | Rander |
| 2017/0352250 A1 | 12/2017 | de Barros Chapiewski |
| 2017/0357973 A1 | 12/2017 | Van Os |
| 2017/0363430 A1 | 12/2017 | Al-Dahle |
| 2017/0365030 A1 | 12/2017 | Shoham |
| 2017/0372394 A1 | 12/2017 | Chan |
| 2018/0060778 A1 | 3/2018 | Guo |
| 2018/0061242 A1 | 3/2018 | Bavar |
| 2018/0075565 A1 | 3/2018 | Myers |
| 2018/0108103 A1* | 4/2018 | Li .................... G06Q 20/322 |
| 2018/0109934 A1 | 4/2018 | Grube |
| 2018/0115924 A1 | 4/2018 | Harris |
| 2018/0126960 A1 | 5/2018 | Reibling |
| 2018/0130161 A1* | 5/2018 | Wengreen ............ G05D 1/0027 |
| 2018/0137693 A1 | 5/2018 | Raman |
| 2018/0156625 A1 | 6/2018 | Mangal |
| 2018/0157268 A1 | 6/2018 | Mangal |
| 2018/0189717 A1 | 7/2018 | Cao |
| 2018/0191596 A1 | 7/2018 | Bhaya |
| 2018/0196417 A1 | 7/2018 | Iagnemma |
| 2018/0211540 A1 | 7/2018 | Bedegi |
| 2018/0211541 A1 | 7/2018 | Rakah |
| 2018/0220189 A1 | 8/2018 | Hodge |
| 2018/0225749 A1 | 8/2018 | Shoen |
| 2018/0225890 A1 | 8/2018 | Jales Costa |
| 2018/0356239 A1 | 12/2018 | Marco |
| 2018/0357907 A1 | 12/2018 | Reiley |
| 2019/0035277 A1 | 1/2019 | Son |
| 2019/0220035 A1* | 7/2019 | Wengreen ............ G08G 1/202 |

OTHER PUBLICATIONS

Testa Autopilot—Online prior to Apr. 13, 2016 at www.technologyreview.com/s/600772/10-breakthrough-technologies-2016-tesla-autopilot/.
Tesla Model S Software Version 7—Autopilot—Online prior to Apr. 13, 2016 at www.teslamotors.com/presskit/autopilot.
BMW Heads Up Display—Online prior to Apr. 13, 2016 at www.autotrader.com/car-news/full-color-heads-up-display-to-debut-on-new-3-series-132586.
Uber Details—Online prior to Apr. 13, 2016 at www.wikihow.com/Use-Uber.
Raspberry Pi: How can I detect the direction of a sound—Online prior to Apr. 13, 2016 at www.quora.com/Raspberry-Pi-1/How-can-I-detect-the-direction-of-a-sound.
Wikipedia: Biometric Device—Downloaded on Aug. 19, 2016 from en.wikipedia.org/wiki/Biometric_device.
Self-Driving Cars Go Public; Uber Offers Rides in Pittsburgh—Downloaded on Aug. 19, 2016 from www.yahoo.com/news/uber-autonomous-cars-haul-people-125127470.html?ref=gs.
Mark Harris, Uber Could be First to Test Completely Driverless Cars in Public, Sep. 14, 2015, IEEE Spectrum, http://spectrum.ieee.org/cars-that-think/transportation/self-driving/uber-could-be-first-to-test-completely-driverless-cars-in-public.
Zach Epstein, You'll be riding in self-driving cars as soon as next year, May 6, 2016, BGR.com, http://bgr.com/2016105'06/lyft-self-driving-cars-2017/, pp. 1-5.
Ramsey et al., GM, Lyft to Test Self-Driving Electric Taxis, May 5, 2016, the Wall Street Journal, http://www.wsj.com/articles/gm-lyft-to-test-self-driving-electric-taxis-1462460094, pp. 1-4.
Explain That Stuff: Smoke Detectors—Downloaded on Sep. 28, 2018 from www.explainthatstuff.com/smokedetector.html.
Nittan: EV-DP Smoke Detector—Downloaded on Sep. 28, 2018 from nittan.co.uk/products/products/ev/ev-dp.
Wikipedia: Rain Sensor—Downloaded on Sep. 28, 2018 from en.wikipedia.org/wiki/Rain_sensor.
Nest: Split-Spectrum White Paper—Downloaded on Oct. 1, 2018 from nest.com/support/images/misc-assets/Split-Spectrum-Sensor-White-Paper.pdf.
How Police Visually Detect Drunk Drivers—Downloaded on Oct. 19, 2018 from thelaw.com/law/how-police-visually-detect-drunk-drivers.185.
Velodyne VLS-128 LiDAR Sensor—Downloaded on Oct. 22, 2018 from velodynelidar.com/vls-128.html.
Waymo's Suite of Custom-Built, Self-Driving Hardware—Downloaded on Oct. 22, 2018 from medium.com/waymo/introducing-waymos-suite-of-custom-built-self-driving-hardware-c47d1714563.
Lidar—Downloaded on Oct. 24, 2018 from en.wikipedia.org/wiki/Lidar.
Radar—Downloaded on Oct. 24, 2018 from en.wikipedia.org/wiki/Radar.
Assisted GPS—Downloaded on Nov. 19, 2018 from lifewire.com/assisted-gps-1683306.
How GPS Works—Downloaded on Nov. 19, 2018 from lifewire.com/iphone-gps-set-up-1683393.
Indoor Positioning System—Downloaded on Nov. 19, 2018 from en.wikipedia.org/wiki/Indoor_positioning_system.
LTE—Downloaded on Nov. 27, 2018 from en.wikipedia.org/wiki/LTE_(telecommunication).
OTDOA—Downloaded on Nov. 27, 2018 from en.wikipedia.org/wiki/OTDOA.
Ping for Beginners—Downloaded on Jan. 30, 2019 from https://social.technet.microsoft.com/wiki/contents/articles/30110.ping-for-beginners.aspx.

* cited by examiner

SELF-DRIVING VEHICLE SYSTEMS AND METHODS

CROSS-REFERENCE TO RELATED APPLICATIONS

The entire contents of the following application are incorporated by reference herein: U.S. patent application Ser. No. 16/205,013; filed Nov. 29, 2018; and entitled SELF-DRIVING VEHICLE SYSTEMS AND METHODS.

The entire contents of the following application are incorporated by reference herein: U.S. patent application Ser. No. 16/166,057; filed Oct. 19, 2018; and entitled SELF-DRIVING VEHICLE SYSTEMS AND METHODS.

The entire contents of the following application are incorporated by reference herein: U.S. patent application Ser. No. 16/128,334; filed Sep. 11, 2018; and entitled SELF-DRIVING VEHICLE ACTIONS IN RESPONSE TO A LOW BATTERY.

The entire contents of the following application are incorporated by reference herein: U.S. patent application Ser. No. 16/049,275; filed Jul. 30, 2018; and entitled SELF-DRIVING VEHICLE SYSTEMS AND METHODS.

The entire contents of the following application are incorporated by reference herein: U.S. patent application Ser. No. 15/863,903; filed Jan. 8, 2018; and entitled SELF-DRIVING VEHICLE SYSTEMS AND METHODS.

The entire contents of the following application are incorporated by reference herein: U.S. patent application Ser. No. 15/589,619; filed May 8, 2017; and entitled SELF-DRIVING VEHICLE SYSTEMS AND METHODS.

The entire contents of the following application are incorporated by reference herein: U.S. patent application Ser. No. 15/181,413; filed Jun. 14, 2016; and entitled SELF-DRIVING VEHICLE SYSTEMS AND METHODS.

The entire contents of the following application are incorporated by reference herein: U.S. patent application Ser. No. 15/099,565; filed Apr. 14, 2016; and entitled SELF-DRIVING VEHICLE SYSTEMS AND METHODS.

BACKGROUND

Field

Various embodiments disclosed herein relate to vehicles. Certain embodiments relate to self-driving motorized vehicles.

Description of Related Art

Vehicles typically require a driver. These vehicles often can only perform actions when directly instructed by the driver. However, self-driving vehicles are not reliant upon drivers and can perform actions based upon external events. As such, self-driving vehicles can save time and dramatically increase convenience in roadway travel. As a result, there is a need for systems and methods that enable self-driving vehicles to perform actions based upon external events.

SUMMARY

Self-driving vehicles will save tens of thousands of lives per year. The majority of vehicle-related deaths are caused by driver error. Tests have shown that self-driving vehicles nearly eliminate self-inflicted accidents (although they are not immune to accidents caused by human drivers of other vehicles). Self-driving vehicles have unlimited attention spans and can process complex sensor data nearly instantaneously. The ability of self-driving vehicles to save lives is so impressive that society has a moral imperative to develop self-driving technology such that it can be widely adopted.

Self-driving vehicles also have the ability to dramatically save time and improve convenience in roadway travel. Specifically, self-driving vehicles have unlimited potential to learn and predict human behavior and perform actions accordingly. Many embodiments described herein enable a self-driving vehicle to monitor human activity and predict when and where the human will be located and whether the human needs a ride from the self-driving vehicle. Self-driving vehicles will be able to perform such tasks with incredible efficacy and accuracy that will allow self-driving vehicles to proliferate at a much faster rate than would otherwise be the case.

Some embodiments comprise using a vehicle management system to operate a self-driving vehicle, wherein the vehicle management system is configured to be communicatively coupled with a remote computing device configured to operate software adapted to enable a user to control behaviors of the self-driving vehicle. Methods may include coupling communicatively, by the vehicle management system, the remote computing device to the self-driving vehicle, and then determining, by the vehicle management system, that the remote computing device is no longer communicatively coupled to the vehicle management system; identifying, by the vehicle management system, a pick-up location of the user; and sending, by the vehicle management system, the self-driving vehicle to the pick-up location in response to determining that the remote computing device is no longer communicatively coupled to the vehicle management system.

Embodiments may also comprise sending, by the vehicle management system, the self-driving vehicle to the pick-up location in response to an estimated pick-up time. Additionally, methods may include determining, by the vehicle management system, that the remote computing device is no longer communicatively coupled to the vehicle management system by sending a wireless communication to the remote computing device and then determining that the remote computing device did not respond to the wireless communication.

In some embodiments, methods comprise determining, by the vehicle management system, that the remote computing device is no longer communicatively coupled to the vehicle management system by determining that a battery of the remote computing device is depleted below a predetermined threshold. Even still, embodiments may include determining, by the vehicle management system, that the remote computing device is no longer communicatively coupled to the vehicle management system in response to determining that the vehicle management system has not received a first wireless communication from the remote computing device for a predetermined amount of time. In some embodiments, the predetermined amount of time is greater than thirty seconds and less than thirty minutes.

According to some embodiments, after sending the self-driving vehicle to the pick-up location, methods include instructing, by the vehicle management system, the self-driving vehicle to find a parking location in response to determining, by the vehicle management system, that communicative coupling between the vehicle management system and the remote computing device has been restored. As well, in some embodiments, methods include sending a second wireless communication from the vehicle management system to the remote computing device in response to determining that the remote computing device is no longer communicatively coupled to the vehicle management system. The second wireless communication may be configured to elicit a reply wireless communication from the remote computing device to the vehicle management system when the remote computing device regains cellular communication abilities.

Some embodiments comprise sending a second wireless communication from the vehicle management system to the remote computing device in response to determining that the remote computing device is no longer communicatively coupled to the vehicle management system, wherein the second wireless communication is configured to elicit a reply wireless communication from the remote computing device to the vehicle management system when the remote computing device regains cellular communication abilities, and then instructing, by the vehicle management system, the self-driving vehicle to find a parking location in response to receiving the reply wireless communication. The parking location may be located remotely relative to the pick-up location. Additionally, the pick-up location may be within fifty yards of a drop-off location where the self-driving vehicle last dropped off the user.

Some embodiments comprise receiving, by the vehicle management system, the pick-up location from the remote computing device prior to determining, by the vehicle management system, that the remote computing device is no longer communicatively coupled to the vehicle management system. In some embodiments, methods include determining, by the vehicle management system, the pick-up location by analyzing location data of the remote computing device in a period within thirty minutes of when the vehicle management system determines that the remote computing device is no longer communicatively coupled to the vehicle management system.

Some embodiments comprise determining, by the vehicle management system, a pick-up time based on the location data of the remote computing device during the period. Methods also include sending, by the vehicle management system, the self-driving vehicle to the pick-up location at a time determined, by the vehicle management system, based on analyzing past amounts of time from past drop-offs to past pick-ups.

Some embodiments comprise sending, by the vehicle management system, the self-driving vehicle to the pick-up location at a time determined, by the vehicle management system, based on analyzing past amounts of time from past drop-offs to past pick-ups at past drop-off locations within fifty yards of a most recent drop-off location. Methods may even include analyzing location data of the remote computing device after a most recent drop-off of the user, and then sending, by the vehicle management system, the self-driving vehicle to the pick-up location at a time determined, by the vehicle management system, based on analyzing the location data.

In some embodiments, after sending the self-driving vehicle to the pick-up location, methods include determining that the user is not located at the pick-up location, and instructing, by the vehicle management system, the self-driving vehicle to move away from the pick-up location and to return to the pick-up location after a first period of time. Methods also include determining that the user is not located at the pick-up location after the first period of time, and instructing, by the vehicle management system, the self-driving vehicle to move away from the pick-up location and to return to the pick-up location after a second period of time, and determining that the user is not located at the pick-up location after the second period of time, and instructing, by the vehicle management system, the self-driving vehicle to move away from the pick-up location and to return to the pick-up location after a third period of time, wherein the third period is greater than the second period, and the second period is greater than the first period.

Some embodiments comprise analyzing, by the vehicle management system, a schedule of the user to estimate at least one of the pick-up location and a pick-up time. Methods also include determining that the user is not located at the pick-up location, and instructing, by the vehicle management system, the self-driving vehicle to move to a predetermined parking location that is located remotely relative to the pick-up location and a most-recent drop-off location.

Some embodiments comprise receiving, by the vehicle management system, from the remote computing device the predetermined parking location prior to determining, by the vehicle management system, that the remote computing device is no longer communicatively coupled to the vehicle management system. The predetermined parking location may be a residence of the user.

Some embodiments comprise sending, by the vehicle management system, a notification to an emergency contact in response to determining, by the vehicle management system, that the remote computing device is no longer communicatively coupled to the vehicle management system. The notification may comprise at least one of a most recent drop-off location of the user and location information of the self-driving vehicle.

Some embodiments comprise receiving from the emergency contact, by the vehicle management system, at least one of a pick-up time and the pick-up location for the user in response to sending the notification. Even still, methods include sending the notification in response to determining, by the vehicle management system, that the user is not located at the pick-up location.

Some embodiments comprise using a vehicle management system to operate a self-driving vehicle, wherein the vehicle management system is configured to be communicatively coupled with a remote computing device configured to operate software adapted to enable a user to control behaviors of the self-driving vehicle. Methods include coupling communicatively, by the vehicle management system, the remote computing device to the self-driving vehicle, and then determining, by the vehicle management system, that the remote computing device is no longer communicatively coupled to the vehicle management system; identifying, by the vehicle management system, a pick-up location of the user; and sending, by the vehicle management system, the self-driving vehicle to a first location that is within a direct wireless communication range of a smart key from a most-recent drop-off location in response to determining, by the vehicle management system, that the remote computing device is no longer communicatively coupled to the vehicle management system.

Some embodiments comprise receiving, by the vehicle management system, an indication that an antenna of the self-driving vehicle detected a first wireless communication from the smart key, and then sending, by the vehicle management system, the self-driving vehicle to the pick-up location in response to receiving the indication. Methods also include identifying, by the vehicle management system, the pick-up location by analyzing a directionality of the first wireless communication from the smart key.

Some embodiments comprise using a vehicle management system to operate a self-driving vehicle, wherein the vehicle management system is configured to be communicatively coupled with a remote computing device configured to operate software adapted to enable a user to control behaviors of the self-driving vehicle. Methods include coupling communicatively, by the vehicle management system, the remote computing device to the self-driving vehicle; detecting, by the remote computing device, a battery charge indication below a predetermined threshold; notifying, by the remote computing device, the user to select a pick-up time in response to detecting the battery charge indication below the predetermined threshold; and sending, by the vehicle management system, the self-driving vehicle to a pick-up location in response to the pick-up time selected by the user.

Some embodiments comprise determining, by the vehicle management system, that the remote computing device is no longer communicatively coupled to the vehicle management system, and then sending, by the vehicle management system, the self-driving vehicle to the pick-up location in response to determining, by the vehicle management system, that the remote computing device is no longer communicatively coupled to the vehicle management system. Additionally, methods include determining, by the vehicle management system, that the remote computing device is no longer communicatively coupled to the vehicle management system in response to determining that the vehicle management system has not received a first wireless communication from the remote computing device for a predetermined amount of time.

Some embodiments comprise methods of using a vehicle management system to operate a self-driving vehicle. The vehicle management system can be configured to be communicatively coupled with a remote computing device. The remote computing device can be configured to enable a user to control behaviors of the self-driving vehicle. The remote computing device can comprise a battery configured to provide electrical power to the remote computing device. The battery can comprise one or more cells.

Several embodiments comprise coupling communicatively the remote computing device to the vehicle management system; and detecting, by the remote computing device, a first battery charge indication of the battery. The remote computing device can be configured to detect when the first battery charge indication is below a first predetermined threshold. The system can take various actions in response to detecting that the battery life is low (e.g., to reduce the risk of the user needing to communicate with the self-driving vehicle, but being unable to communicate with the self-driving vehicle).

Some embodiments comprise determining, by the remote computing device, that the first battery charge indication is below a first predetermined threshold; prompting, by the remote computing device, the user to select a pick-up time in response to determining that the first battery charge indication is below the first predetermined threshold; and sending, by the remote computing device, the pick-up time selected by the user to the vehicle management system. The remote computing device can send information to the vehicle management system through direct wireless communication methods and/or through indirect wireless communication methods (e.g., using other communication systems such as cellular communication networks, satellite communication networks, radio communication networks, and any other communication devices and technologies).

Some embodiments comprise prompting, by the remote computing device, the user to select a pick-up location in response to determining, by the remote computing device, that a second battery charge indication is below a second predetermined threshold. Some embodiments comprise sending, by the remote computing device, the pick-up location selected by the user to the vehicle management system.

Some embodiments comprise determining, by the remote computing device, that a third battery charge indication is below a third predetermined threshold. (The third predetermined threshold is less than the first predetermined threshold.) Some embodiments comprise reminding, by the remote computing device, the user regarding the pick-up time in response to determining that the third battery charge indication is below the third predetermined threshold.

Some embodiments comprise estimating, by at least one of the remote computing device and the vehicle management system, that a battery power supply of the remote computing device will be depleted before the pick-up time, and then in response to the estimating, reminding, by the remote computing device, the user regarding the pick-up time prior to depleting the battery power supply.

Some embodiments comprise receiving, by the remote computing device, a first pick-up time; estimating, by at least one of the remote computing device and the vehicle management system, that a battery power supply of the remote computing device will be depleted before the first pick-up time; and then in response to the estimating, prompting, by the remote computing device, the user to select a second pick-up time configured to supersede the first pick-up time. Embodiments can comprise sending, by the remote computing device, the second pick-up time to the vehicle management system.

Some embodiments comprise sending, by the remote computing device, the second pick-up time to the vehicle management system such that the second pick-up time supersedes the first pick-up time.

Some embodiments comprise receiving, by the remote computing device, a first pick-up time; estimating, by the remote computing device, that a battery power supply of the remote computing device will be depleted before the first pick-up time; and then in response to the estimating, prompting, by the remote computing device, the user to select a back-up pick-up location. Some embodiments comprise sending, by the remote computing device, the back-up pick-up location to the vehicle management system such that the vehicle management system is configured to send the self-driving vehicle to the back-up pick-up location in response to the vehicle management system being unable to communicate with the remote computing device.

Some embodiments comprise determining, by the remote computing device, that the first battery charge indication is below a first predetermined threshold; and entering, by the remote computing device, a low battery mode in response to determining that the first battery charge indication is below the first predetermined threshold and in response to determining, by the remote computing device, that the vehicle management system is in a pick-up expected mode.

In several embodiments, entering the low battery mode comprises disabling a radio-frequency signal transmission system of the remote computing device.

In several embodiments, entering the low battery mode comprises disabling at least one feature of the remote computing device to reduce power consumption of the remote computing device.

In several embodiments, the vehicle management system is configured to be in the pick-up expected mode from a first time when the self-driving vehicle drops off the user until a second time when the self-driving vehicle picks up the user.

In several embodiments, the vehicle management system is configured to be in the pick-up expected mode from a first time when the vehicle management system drops off the user (e.g., with a first self-driving vehicle) until a second time when the vehicle management system picks up the user (e.g., with the first self-driving vehicle or with a different self-driving vehicle).

In several embodiments, the pick-up expected mode comprises a mode in which at least one of the user is located remotely relative to the self-driving vehicle yet the self-driving vehicle anticipates picking up the user, the vehicle management system is waiting for an instruction from the remote computing device to pick up the user, and a pick-up time selected by the user is less than twelve hours away.

Some embodiments comprise receiving, by the remote computing device, a pick-up time; sending, by the remote computing device, the pick-up time to the vehicle management system; and exiting, by the remote computing device, the low battery mode in response to receiving the pick-up time.

Some embodiments comprise receiving, by the remote computing device, a pick-up location; sending, by the remote computing device, the pick-up location to the vehicle management system; and exiting, by the remote computing device, the low battery mode in response to receiving the pick-up location.

Some embodiments comprise receiving, by the remote computing device, at least one of a pick-up time and a pick-up location; sending, by the remote computing device, at least one of the pick-up time and the pick-up location to the vehicle management system; and exiting, by the remote computing device, the low battery mode in response to sending at least one of the pick-up time and the pick-up location.

Some embodiments comprise shutting down the remote computing device in response to determining, by the remote computing device, that a second battery charge indication is below a second predetermined threshold and in response to determining, by the remote computing device, that the vehicle management system is in the pick-up expected mode. The second predetermined threshold can be lower than the first predetermined threshold.

Some embodiments comprise determining, by the remote computing device, that the first battery charge indication is below a first predetermined threshold; and prompting, by the remote computing device, the user to select a back-up contact in response to determining that the first battery charge indication is below the first predetermined threshold. Some embodiments comprise sending, by the remote computing device, the back-up contact selected by the user to the vehicle management system.

Some embodiments comprise sending, by the vehicle management system, a wireless communication to the back-up contact in response to determining, by the vehicle management system, that the vehicle management system is no longer able to communicate with the remote computing device. The wireless communication can comprise location information regarding the user. The wireless communication can be configured to prompt the back-up contact to take action to aid the user. The wireless communication can prompt the back-up contact to select a pick-up time and pick-up location for the user. The wireless communication can prompt the back-up contact to select where the vehicle should go (e.g., the back-up contact can instruct the vehicle to move to a waiting location, a home base, and/or to the user's home).

Some embodiments comprise granting control, by at least one of the remote computing device and the vehicle management system, of the self-driving vehicle to the back-up contact in response to receiving, by the remote computing device, the back-up contact from the user. In several embodiments, granting control enables the back-up contact to choose a destination for the self-driving vehicle.

Some embodiments comprise granting control, by at least one of the remote computing device and the vehicle management system, of the self-driving vehicle to the back-up contact in response to receiving, by the remote computing device, the back-up contact from the user and in response to determining, by the vehicle management system, that the vehicle management system is no longer able to communicate with the remote computing device.

Some embodiments comprise determining, by the remote computing device, that the first battery charge indication is below a first predetermined threshold; determining, by the remote computing device, that a back-up contact is located within 50 yards of the user; and prompting, by the remote computing device, the user to select the back-up contact to at least one of receive a notification regarding the self-driving vehicle and control at least one movement of the self-driving vehicle. Prompting the user can be in response to determining that the first battery charge indication is below the first predetermined threshold.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Self-driving vehicles will provide significant savings to the economy and society at-large. For example, self-driving vehicles will not only greatly reduce roadway congestion, thus making transportation more efficient and less costly, but self-driving vehicles will also learn and adapt to human behavior, thus providing an unimaginable level of convenience in today's world of transportation. The ability of self-driving vehicles to positively impact the economy and public is so impressive that society has a moral imperative to develop self-driving technology such that it can be widely adopted.

Self-driving vehicles have unlimited potential to learn and predict human behavior and perform actions accordingly. Many embodiments described herein enable a self-driving vehicle to monitor human activity and predict when and where the human will be located and whether the human needs a ride from the self-driving vehicle. Self-driving vehicles will be able to perform such tasks with incredible efficacy and accuracy, which will allow self-driving vehicles to proliferate much faster than would otherwise be the case.

Self-driving cars are sometimes referred to as autonomous cars, autonomous vehicles, driverless cars, and driverless vehicles. Various levels of "self-driving" behaviors are possible to sense surrounding environments and navigate appropriately (e.g., without hitting objects, in a time-efficient manner).

Figure 1:
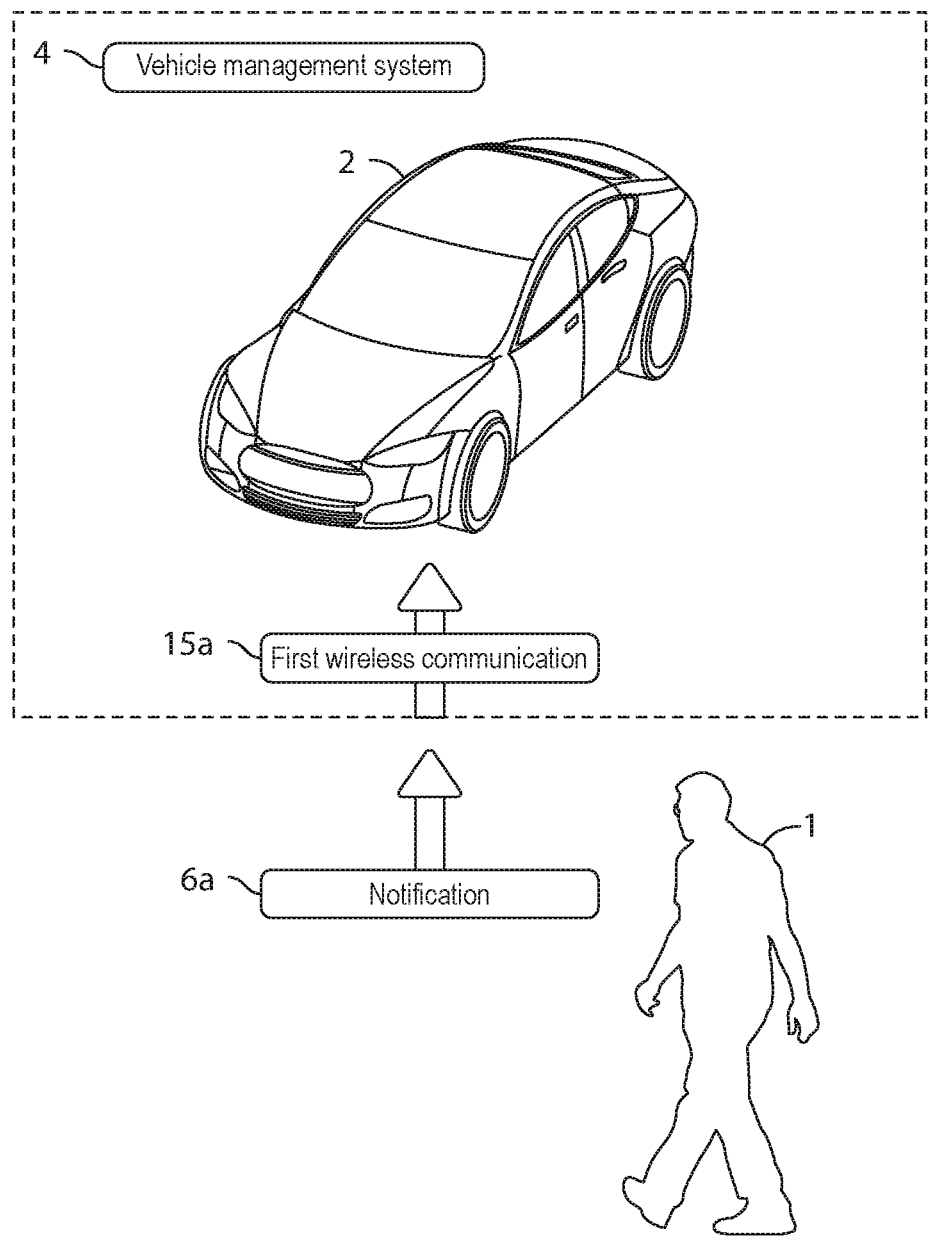
FIG. 1 illustrates a diagrammatic view of a self-driving vehicle, according to some embodiments.

FIG. 1 illustrates a diagrammatic view of a self-driving vehicle 2 and a vehicle management system 4. In some embodiments, the system 4 comprises the vehicle 2. In this regard, the system 4 can comprise a plurality of vehicles (e.g. self-driving vehicles and non-self-driving vehicles) that are communicatively coupled to the system 4. In some embodiments, the vehicle 2 comprises the system 4. In this regard, the system 4 can be implemented as an on-board system located within the vehicle 2. In such embodiments, the system 4 can still be communicatively coupled to other vehicles (e.g. self-driving vehicles and non-self-driving vehicles).

With continued reference to FIG. 1, the system 4 can receive a notification 6a. In some embodiments, the system 4 can send a first wireless communication 15a to the vehicle 2 in response to the system 4 receiving the notification 6a. The first wireless communication 15a can thereby prompt the vehicle 2 to move towards the person 1. It should be noted that any of the transmission steps described in this disclosure, such as sending, receiving, and the like, can be executed directly and/or indirectly.

Figure 2:
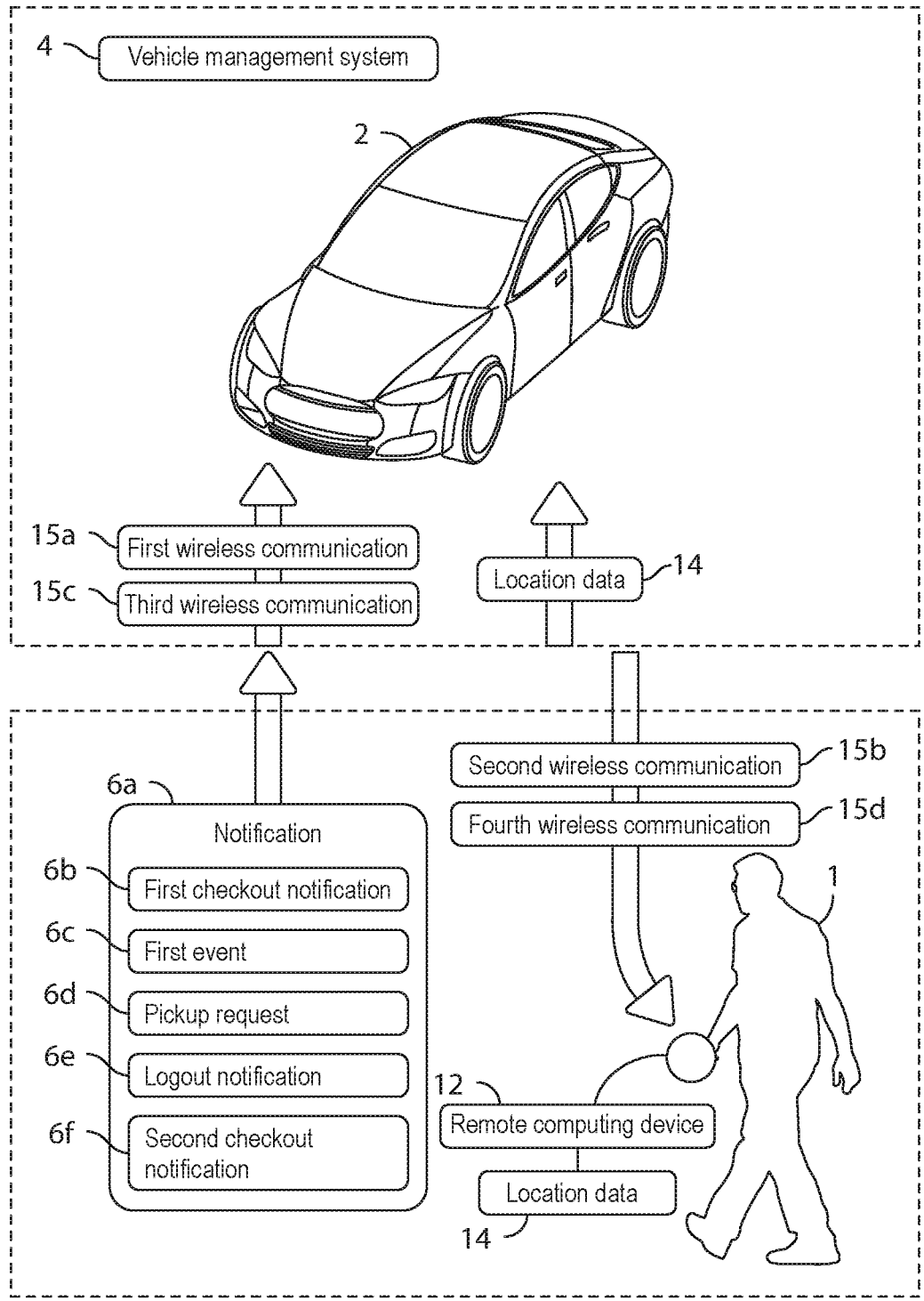
FIG. 2 illustrates a diagrammatic view of a self-driving vehicle, according to some embodiments.

As shown in FIG. 2, the notification 6a can be any type of notification that indicates that a person, such as the person 1 or another person, needs a ride from the vehicle 2. In some embodiments, the notification 6a comprises a checkout notification 6b, such as a notification that the person has purchased an item or service from a store. Accordingly, in some embodiments, the vehicle management system 4 receives the checkout notification 6b in response to the person 1 purchasing the item or service at the store.

Figure 3:
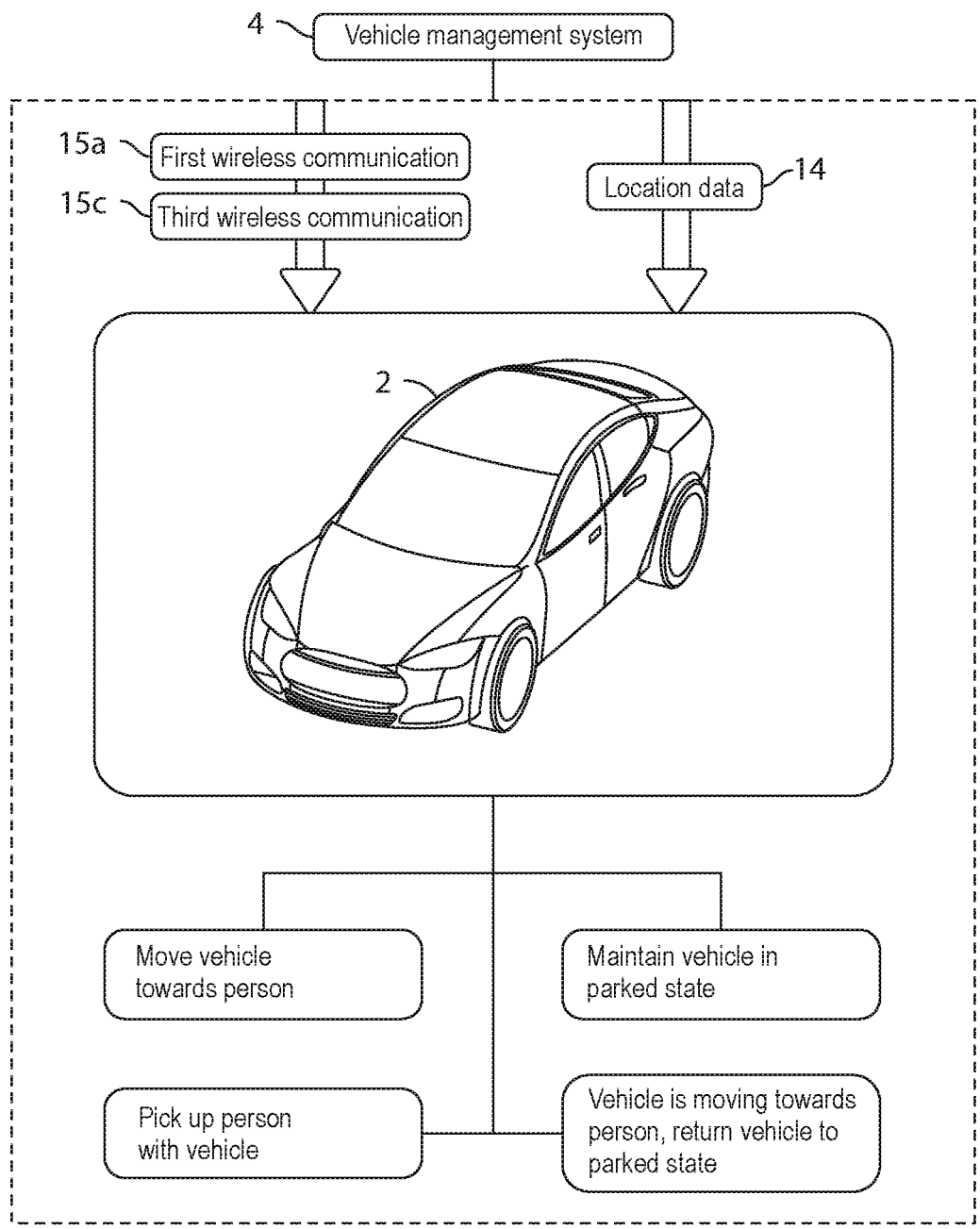
FIG. 3 illustrates a diagrammatic view of a method of using a self-driving vehicle, according to some embodiments.

According to FIGS. 2 and 3, the vehicle 2 and/or system 4 may perform actions in response to the system 4 receiving an indication of the notification 6a. For example, in response to receiving the notification 6a, such as the checkout notification 6b, the system 4 may send a second wireless communication 15b to the remote computing device 12. The second wireless communication 15b may prompt the remote computing device 12 to ask the person 1 whether the person 1 wants the vehicle 2 to move towards the person 1. In this regard, the system 4 can respond to the notification by sending an indication to the remote computing device 12 to determine whether the person 1 wants the vehicle 2 to move towards the person 1 (e.g. pick up the person 1). Because the vehicle 2 and/or system 4 can receive wireless communications while the vehicle 2 is in a parked state or a driving state, such as when the vehicle 2 is in a holding pattern (e.g. driving around the parking lot waiting for the person 1 to be picked up), the system 4 may receive the second wireless communication 15c. In some embodiments, the second wireless communication 15c may instruct the vehicle 2 to move to a parked state, enter the holding pattern, continue the holding pattern, or move towards a pickup location to retrieve the person 1.

As shown in FIG. 2, the notification 6a can comprise various types of notifications and events, such as a first event 6c associated with the person 1. In some embodiments, the first event 6c may comprise a text message or email sent by the remote computing device 12, a post on a social network communicatively coupled to the remote computing device 12, such as status or "check in" posted on a social network (e.g. Facebook®, Twitter®, and the like). The first event 6c may also include other external events, such as a severe weather alert. For example, the system 4 may be configured to determine if severe weather is about to occur. In response to this determination, the vehicle 2 can move towards the person 1 to pick up the person 1 and take them out of harm's way.

The system 4 can also be configured to determine the occurrence of many other events, such as whether an event or appointment that the person is attending has concluded or is about to conclude whereby the event has a known ending time. For example, the system 4 can determine that the person 1 is attending a movie and the movie has ended or is about to end within a predetermined amount of time, such as within 5 minutes.

The system 4 can also be configured to determine whether an event or appointment that the person is attending has concluded or is about to conclude whereby the event has an unknown ending time. Described differently, many appointments and events, such as sporting events, can last for unknown amounts of time. For example, a baseball game may have a tie score whereby the game is extended into extra innings. In this regard, the system 4 can determine that the person 1 is not only attending the baseball game, but the system can determine, via a third party database, whether the game has been extended to extra innings. The system 4 may continue to monitor the progress of the baseball game and once the game is over, the vehicle 2 may be dispatched to retrieve the person 1. The system 4 may further be configured with advanced features, or analytics, to determine the conclusion of the event based upon statistical probabilities. For example, the system 4 may be monitoring the progress of the baseball game and the system 4 may determine that the home team has scored 7 runs in the bottom of the $12^{th}$ inning and that the home team now leads by a score of 8-1. The system 4 may implement statistical analysis and determine that the other team has a very low statistical chance of scoring 7 or more runs during the top of the $13^{th}$ inning. In response to this determination, the vehicle 2 may move towards the person 1 based upon the assumption that the game will end after the top of the $13^{th}$ inning. It should be appreciated that these are just a few of the many examples of how statistical analysis and analytics can be used to predict the end of events with unknown ending times. Accordingly, in response to this analysis, the vehicle 2 and system 4 can respond by performing any appropriate action, as described in this disclosure.

The notification 6a can also include various notifications, such as a second checkout notification 6f. The second checkout notification 6f can indicate that the person 1 has purchased a second item from the same store, or even a different store. This type of notification can indicate that the person 1 is still shopping and may not want to be picked up just yet. Alternatively, this type of notification can indicate that the person 1 has concluded her shopping and is ready to be picked up. The system 4 can learn the person's behavior patterns and respond to future occurrences in accordance with these patterns, which can indicate the person's desires.

In some embodiments, the system 4 receives the checkout notification 6b in response to the person 1 purchasing the item with a credit card. In response to the checkout notification, the vehicle 2 can thereby move towards the person 1. In some embodiments, the system 4 can further determine the location data 14 of the remote computing device 12 of the person in response to the checkout notification (e.g. credit card transaction) and the vehicle 2 can thereby move towards the location of the remote computing device 12. To further illustrate with a scenario, a person grocery shopping in a store may proceed through the checkout lane and pay for his/her groceries with a credit card. The vehicle 2 and/or system 4 can detect the occurrence of the credit card transaction, which can thereby indicate that the person 1 is done grocery shopping and about to leave the store. Accordingly, in response to the credit card transaction, the vehicle 2 can move towards the person, move to the location where the vehicle 2 dropped the person 1 off, move to a predetermined location, move to a location of the person's remote computing device 12 (which can indicate the location of the person 1), or move to any other location to thereby pick up the person 1.

Because so many people carry remote computing devices, such as smartphones, the system 4 can monitor and respond to various events associated with remote computing devices. For example, in some embodiments where the person 1 has a remote computing device 12, in response to the electronic payment transaction for a purchase of the item at the store, the system 4 can receive the checkout notification 6b, such as a first checkout notification 6b. It should be appreciated that the electronic payment transaction can be a mobile payment and/or digital wallet service, such as Apple Pay (provided by Apple Inc.) that lets users make payments with their remote computing devices, which include smartphones, wearable devices, tablets, and the like. It should also be appreciated that the electronic payment transaction can include services like Android Pay (provided by Android, Inc.), Samsung Pay (provided by Samsung Electronics Co., Ltd.), and the like.

Embodiments of the system 4 can also be configured to determine whether the remote computing device 12 is located within a predetermined distance of the vehicle 2. In this regard, the first wireless communication 15a can prompt the vehicle 2 to move towards the person 1 having the remote computing device 12 in response to the remote computing device 12 being located within the predetermined distance. For example, the system 4 may determine that the person 1 was previously located with respect to the vehicle a distance greater than the predetermined distance, but the person 1 has now moved to within the predetermined distance of the vehicle. Accordingly, this can indicate that the person 1 is ready to be picked up by the vehicle 2. In response, the vehicle 2 can move towards the person 1 to pick up the person 1. It should be appreciated that the predetermined distance can be any distance preset by the vehicle manufacturer, vehicle owner, vehicle operator, and anyone affiliated with the vehicle 2 and/or system 4. Additionally, the predetermined distance can be any distance such as 10 feet, 100 feet, 1,000 feet, 1 mile, and any distance greater than 1 mile.

The system 4 can also be configured to send various wireless communications to the vehicle 2 in response to the location of the remote computing device 12. In some embodiments, if the remote computing device 12 is not located within the predetermined distance of the vehicle 2, the system 4 can send a second wireless communication 15b to the remote computing device 12. However, in some embodiments, if the remote computing device 12 is located within the predetermined distance of the vehicle 2, the system 4 can send the second wireless communication 15b to the remote computing device 12. The second wireless communication 15b can prompt the remote computing device 12 to ask the person 1 whether the person 1 wants the vehicle 2 to move towards the person 1. To better illustrate with a real-life scenario, if the person 1 is shopping at a large shopping mall, the system 4 may determine that the remote computing device 12 (and the person 1) is located greater than 2,000 feet away from the vehicle 2, perhaps at the other end of the shopping mall. In response to this determination, the system 4 may then send the second wireless communication 15b to the remote computing device 12 to determine if the person 1 wants to get picked up at the other end of the shopping mall or if the person does not want to get picked up, because he/she wants to continue shopping.

As illustrated in FIGS. 2 and 3, the system 4 can also be configured to receive a third wireless communication 15c in response to the system 4 sending the second wireless communication 15b and/or the remote computing device 12 receiving the second wireless communication 15b. Stated differently, the remote computing device 12 can be configured to send the third wireless communication 15b in response to the system 4 sending the second wireless communication 15b and/or the remote computing device 12 receiving the second wireless communication 15b. Accordingly, in some embodiments, the system 4 can receive the third wireless communication 15c from the remote computing device 12. The third wireless communication 15c can include various instructions, such as first instructions to maintain the vehicle 2 in a parked state, second instructions to move the vehicle 2 towards the person 1, third instructions to put the vehicle 2 in a holding pattern mode whereby the vehicle 2 drives around a portion of a parking lot or roadway waiting for the person 1 to be ready to be picked up, and the like.

Furthermore, the third wireless communication 15c can include instructions to perform actions for a predetermined amount of time, or an amount of time until the system 4 receives a subsequent notification. For example, the third wireless communication 15c can include instructions to maintain the vehicle 2 in a parked state for a predetermined amount of time or maintain the holding pattern until the system 4 receives a subsequent notification indicating the person 1 is ready to be picked up. Once the predetermined amount of time has elapsed, the vehicle 2 can perform subsequent actions, such as any of the actions described in this disclosure, including moving towards the person 1.

Embodiments can also include communications between the person 1 and vehicle 2 and/or system 4 whereby the person 1 can provide specific location data 14 to the system 4 so that the vehicle 2 can pick up the person 1 at a desired location. For example, in some embodiments, in response to the system 4 receiving the third wireless communication 15c, the system 4 can send a fourth wireless communication 15d to the remote computing device 12. The fourth wireless communication 15d can prompt the remote computing device 12 to ask the person 1 where the person 1 wants to meet the vehicle 2. The system 4 can then receive desired location data for where the person 1 wants to meet the vehicle 2. This configuration can provide user convenience for instances when portions of the roadway are congested with traffic. Accordingly, the person 1 (i.e. user) can thereby summon the vehicle to a new desired location with less traffic.

Figure 4:
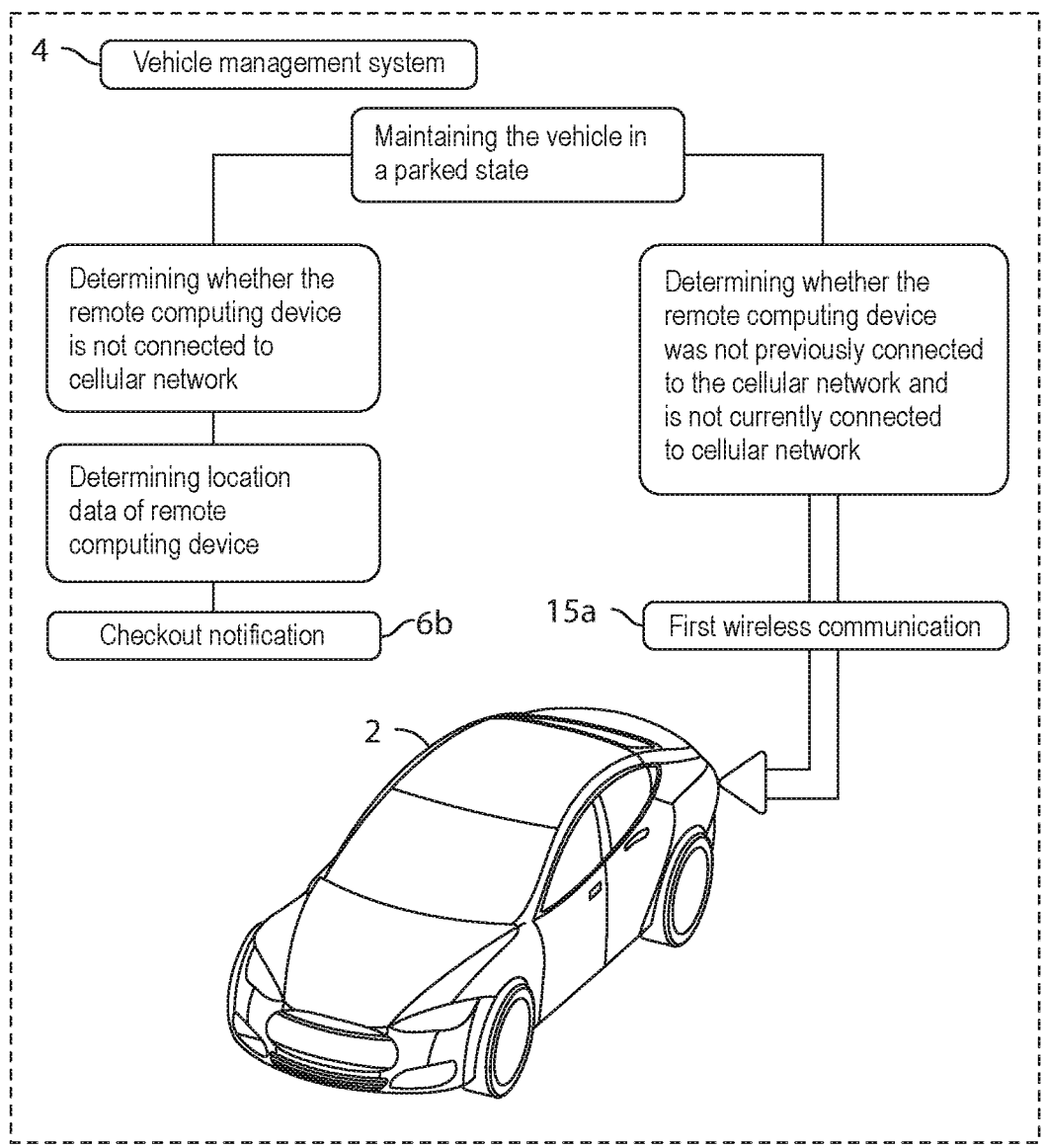
FIG. 4 illustrates a diagrammatic view of another method of using a self-driving vehicle, according to some embodiments.
Figure 4:
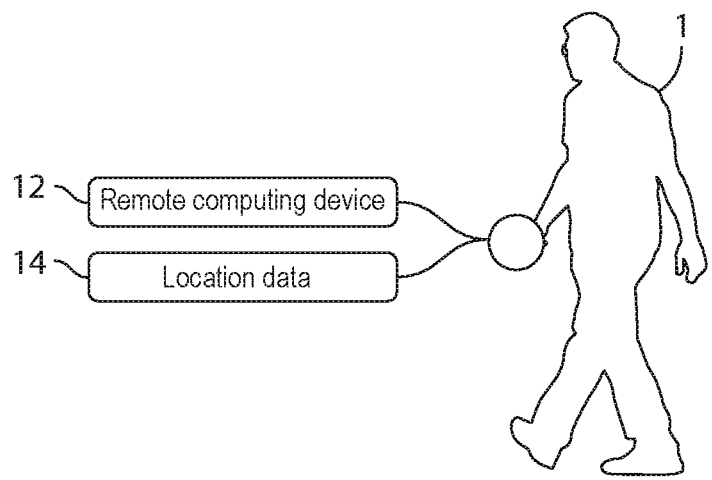

The system 4 can also be configured to perform advanced steps to more accurately determine not only whether the person 1 is in need of a ride from the vehicle 2, but also the location of the remote computing device 12 and/or person 1. With reference to FIGS. 3 and 4, in some embodiments, the system 4 can determine the connectivity of the remote computing device 12 and thereby perform actions with the vehicle 2 in response to the connectivity of the remote computing device 12. In some embodiments, in response to receiving a notification of an occurrence of an event, such as the checkout notification 6b, the system 4 can then determine whether the remote computing device 12 is connected to a cellular network and/or a wireless network. In response to determining the remote computing device 12 is not connected to the cellular network, the system 4 can maintain the vehicle 2 in a parked state. Described in further detail, the system 4 may detect that the person has purchased an item from a store, and the system 4 may perform additional verifications to determine whether the person 1 is actually leaving the store. As such, in response to the checkout notification 6b, the system 4 may determine that the remote computing device 12 is not connected to the cellular network, which may indicate that the person and the remote computing device 12 are still located inside the store. The system 4 may determine that the remote computing device 12 is instead connected to the wireless network (perhaps the wireless network operated by the store), which may further indicate that the person is still inside the store and not yet ready to leave. Embodiments of the system 4 may be configured to respond to these determinations in any number of ways, such as moving the vehicle 2 towards the person 1, maintaining the vehicle 2 in a parked state, and the like.

The system 4 may also perform additional steps to determine whether the person 1 is ready to be picked up by the vehicle 2. In some embodiments, the system 4 may determine whether the remote computing device 12 was previously not connected to the cellular network and then determine whether the remote computing device 12 is subsequently connected to the cellular network. Additionally, in some embodiments, the system 4 may send the first wireless communication 15a to the vehicle 2 in response to determining that the remote computing device 12 was previously not connected to the cellular network and then determining whether the remote computing device is subsequently connected to the cellular network. This sequence may indicate that the person 1 was located inside a building where her remote computing device 12 was unable to receive a signal, and then the person 1 moved near the exit of the building or even outside the building whereby her remote computing device 12 was able to receive a signal. This may indicate that the person 1 needs to be picked up by the vehicle 2.

Figure 5:
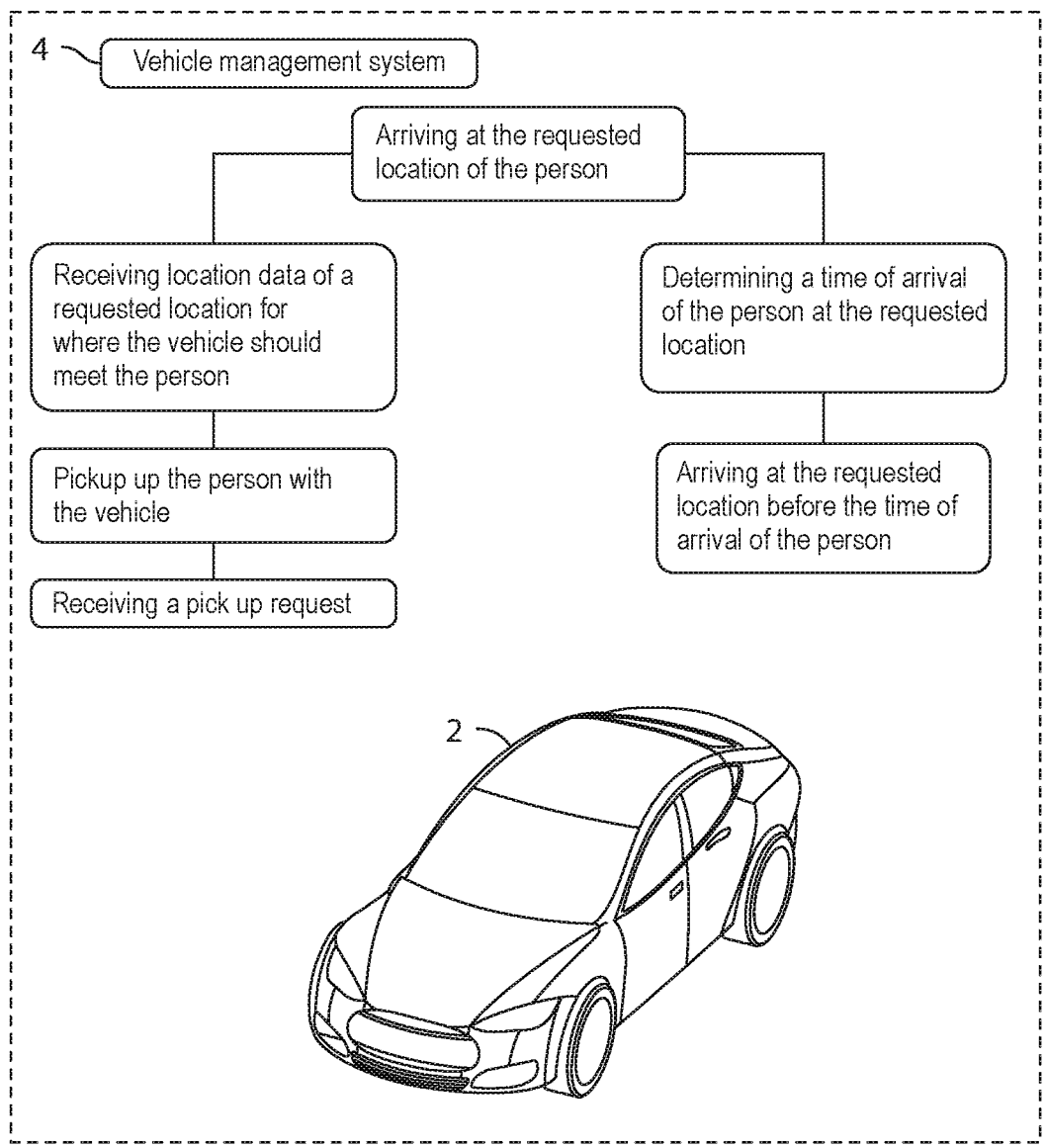
FIG. 5 illustrates a diagrammatic view of another method of using a self-driving vehicle, according to some embodiments.
Figure 5:
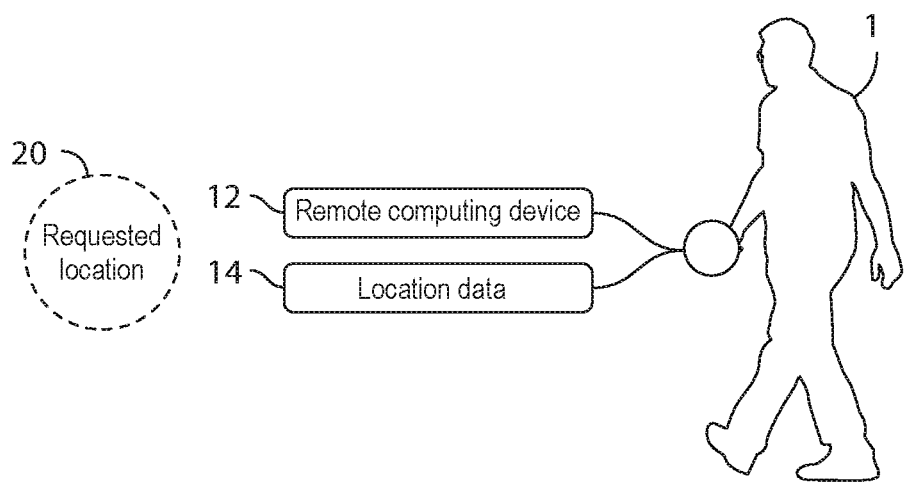

The system 4 may also be configured to receive manual summons requests from the person 1, whereby the summons request can indicate that the person 1 would like to be picked up by the vehicle 2. As illustrated in FIG. 5, in some embodiments, the system 4 may receive a pickup request 6d for the vehicle 2 to pick up the person 1. Accordingly, the vehicle 2 may move towards the person 1 and/or pick up the person 1. It should be appreciated that the person 1 may manually summon the vehicle 2 by submitting a request through her remote computing device 12, which can be received by the system 4.

The system 4 can also be configured to search for location data 14 of the remote computing device 12. In some embodiments, searching for the location data 14 occurs in response to various other events or notifications 6a, such as the electronic payment transaction. In this regard, the system 4 can determine the location of the remote computing device 12, and because the person 1 likely has the remote computing device 12 close by, or coupled to her person, the location data 14 can thereby indicate the location of the person 1. Accordingly, the system 4 can also be configured to send the location data 14 of the remote computing device 12 to the vehicle 2. The location data 14 can thereby allow the vehicle 2 to drive towards the location of the remote computing device 12, to thereby retrieve the person 1.

As illustrated in FIG. 5, some embodiments of the system 4 can also receive a requested pickup location that indicates where the person 1 would like to be picked up by the vehicle 2. In this manner, the person 1 may request the pickup location in a number of ways. In some embodiments, the person 1 sends a text message, via the remote computing device 12, which includes location data, such as a street address, to the system 4. The text message can thereby instruct the vehicle 2 to pick up the person at a requested location 20. In some embodiments, the person 1 drops a pin on a map displayed on the screen of the remote computing device 12 to indicate the location where the person 1 would like to be picked up. Once the system 4 receives the requested location 20, the vehicle 2 can thereby travel towards the requested location 20 of the person 1. The system 4 can also be configured to recognize frequently visited, or known locations, such as home, work, and the like.

With continued reference to FIG. 5, the system 4 may also perform additional steps to precisely coordinate the arrival time of the person 1 at the requested location 20 with the arrival time of the vehicle 2 at the requested location 20. Accordingly, the system 4 may determine a time of arrival of the person at the requested location 20. In some embodiments, the vehicle 2 may arrive at the requested location 20 at approximately the time of arrival of the person. In other words, the person 1 and the vehicle 2 arrive at the requested location 20 at approximately the same time. In some embodiments, the vehicle 2 may arrive at the requested location 20 before the time of arrival of the person 1. Even still, in some embodiments, the vehicle 2 may arrive at the requested location 20 after the time of arrival of the person. It should be appreciated the term "approximately" may be defined as arriving within plus or minus 5 minutes. In other words, the person 1 and the vehicle 2 may arrive at the requested location 20 within 5 minutes of each other.

Figure 6:
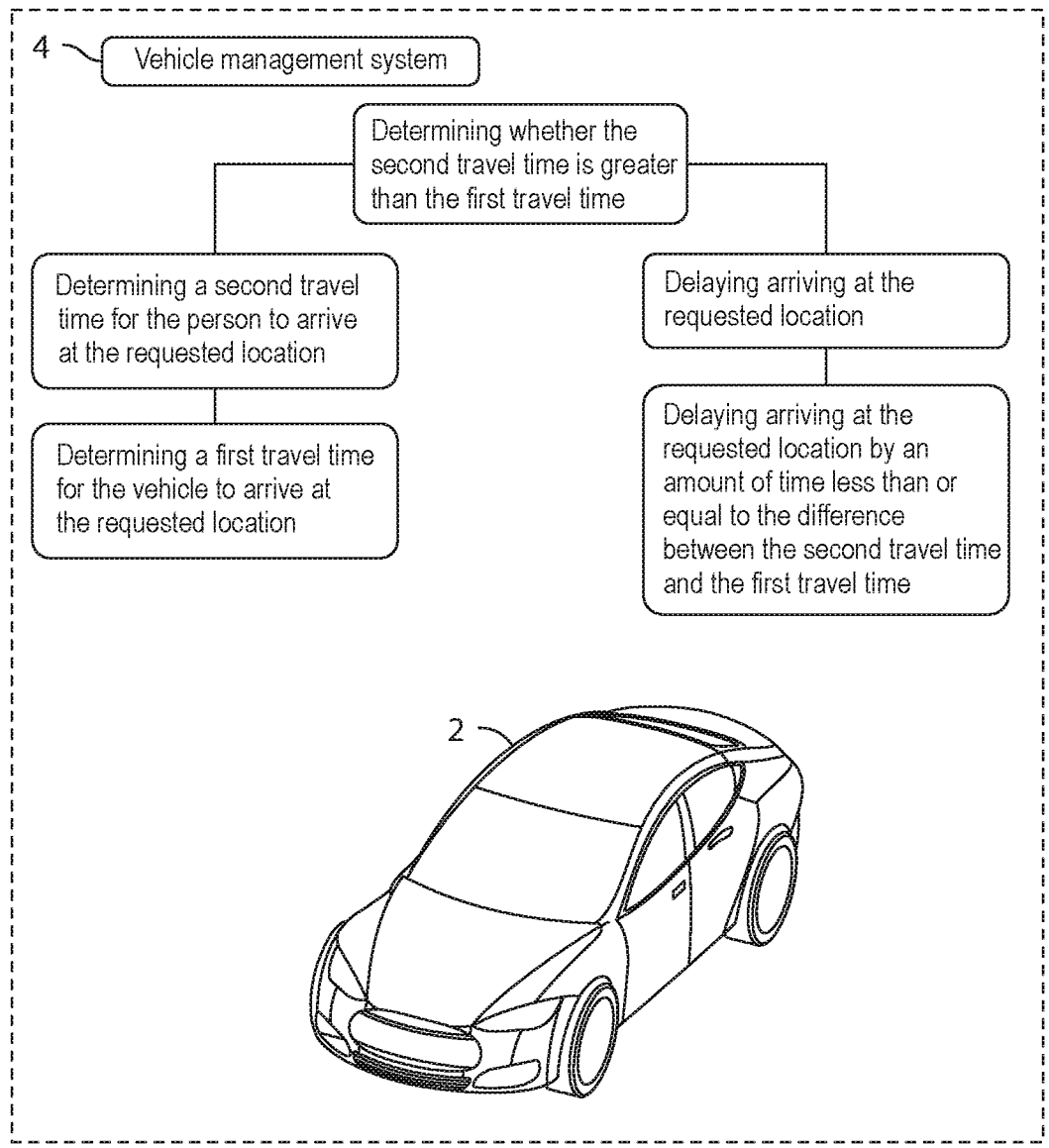
FIG. 6 illustrates a diagrammatic view of another method of using a self-driving vehicle, according to some embodiments.

The system 4 may even determine travel times for the person 1 and vehicle 2 to the requested location 20 and thereby coordinate the departure of the vehicle 2 so that it corresponds with the arrival of the person 1. As illustrated in FIG. 6, the system 4 may determine a first travel time for the vehicle 2 to arrive at the requested location 20. The system 4 may also determine a second travel time for the person 1 to arrive at the requested location 20. The system 4 may then determine whether the second travel time is greater than the first travel time, or whether the second travel time is equal to or less than the first travel time. In response to the system 4 determining that the second travel time is greater than the first travel time, the system 4 may delay the vehicle's departure by an amount of time so that the vehicle arrives at the requested location 20 at approximately the same time as the person 1. In other words, the system 4 can delay the vehicle 4 arriving at the requested location 20 in response to determining the second travel time is greater than the first travel time. In some embodiments, delaying arriving at the requested location 20 can include delaying arriving at the requested location 20 by an amount of time less than or equal to the difference between the second travel time and the first travel time. In response to the system 4 determining that the second travel time is equal to or less than the first travel time, the system 4 may immediately dispatch the vehicle 2 so that the vehicle 2 arrives at the requested location 20 as close as possible to the arrival time of the person 1. In the event that the second travel time is less than the first travel time, the system 4 may send a notification to the remote computing device 12 to thereby notify the person 1 that the vehicle 2 will arrive later than the person 1.

Figure 7:
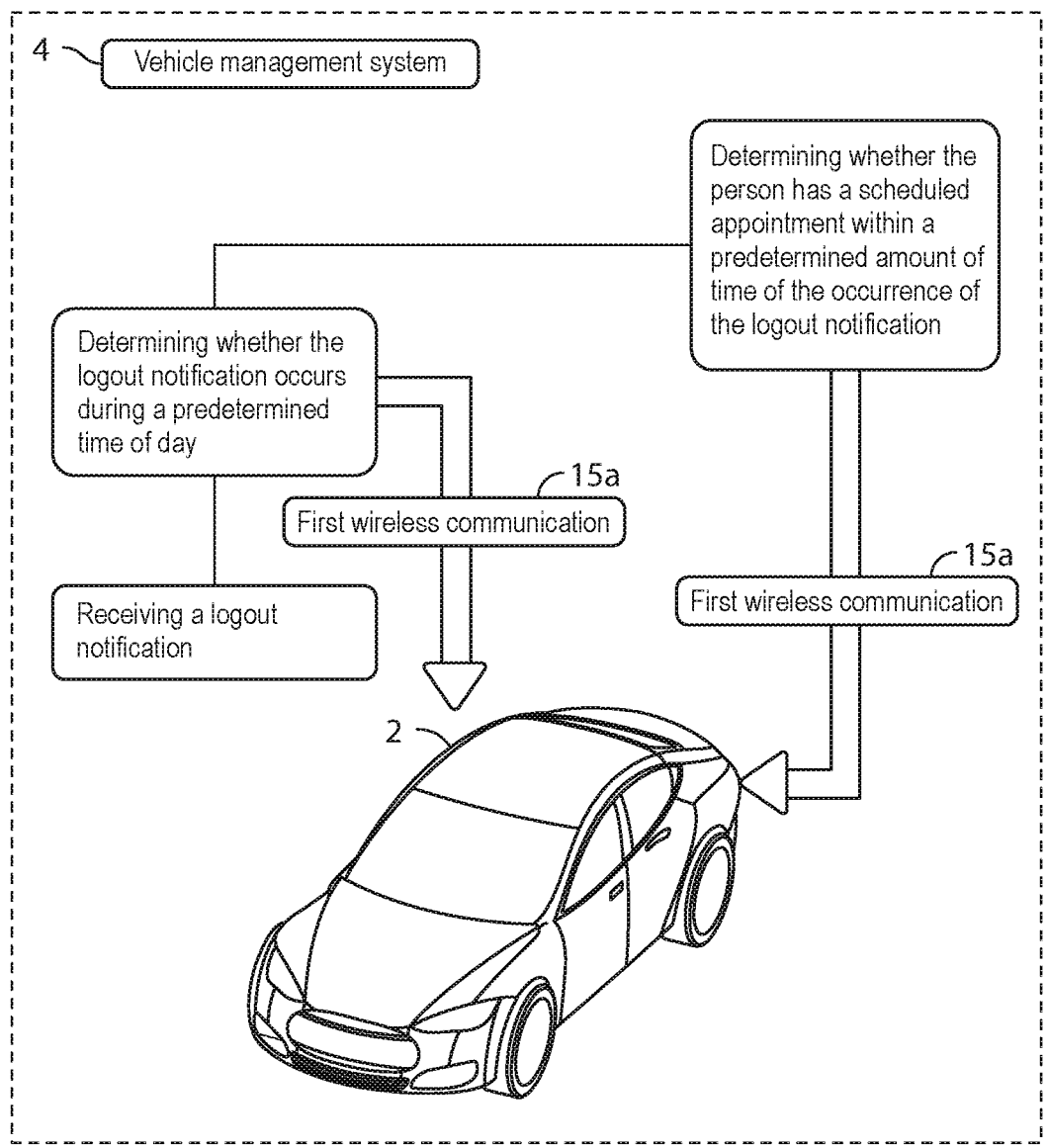
FIG. 7 illustrates a diagrammatic view of another method of using a self-driving vehicle, according to some embodiments.
Figure 7:
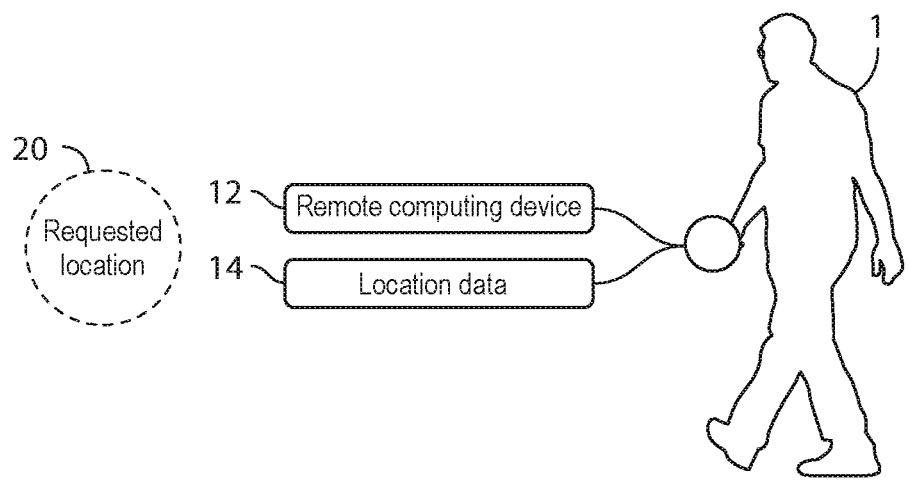

This disclosure also includes embodiments configured to monitor a person's computer activity and then pick up the person 1 in response to the activity. Specifically, these embodiments can be useful during the workday while the person 1 is at work. Accordingly, the notification 6a can include various computer notifications, such as a logout notification 6e whereby the person 1 logs out of a computer, such as a work computer. As shown in FIG. 7, the system 4 can receive the logout notification 6e in response to the person logging out of a computer. The logout notification 6e can indicate that the person 1 is leaving work for the day and the person 1 needs to be picked up by the vehicle 2. In response to the system 4 receiving the logout notification 6e, the vehicle 2 can then move towards a location to pick up the person 1.

People often logout out of their computers at various times during the middle of the workday but don't intend to leave work. Rather, the person may log out for various activities that commonly occur during the workday and/or occur onsite at the office, such as meetings, bathroom breaks, coffee breaks, and the like. In some embodiments, the system 4 may determine that the logout notification 6e occurs during a predetermined time of day. Accordingly, the system 4 may send the first wireless communication 15a to the vehicle 2 in response to receiving the logout notification 6e and the logout notification 6e occurring during the predetermined time of day. In other words, the system 4 can be configured to pick up or not pick up the person in response to the logout notification 6e. For example, if the logout notification 6e occurs during a predetermined time of day, such as during working hours (e.g. 9 am to 5 pm), then the system 4 may not instruct the vehicle 2 to pick up the person 1. Whereas, if the logout notification 6e occurs during a second predetermined time of day, such as after 5 pm, then the system 4 may instruct the vehicle 2 to pick up the person 1 because this time is after the person's workday has ended.

However, there are exceptions to this criteria, such as if the logout notification 6e occurs during lunch hours (e.g. 11 am to 1 pm). Accordingly, in response to the logout notification occurring during lunch hours, the vehicle 2 may move towards the person 1 to pick up the person 1 and take them to a restaurant or to an offsite appointment.

Additionally, the system 4 may be configured to determine if the logout notification 6e occurs within a predetermined amount of time of a scheduled appointment. The system 4 may further determine the location of the scheduled appointment. For example, if the system 4 determines that the scheduled appointment is located offsite (i.e. located remotely to the person's work), and the system 4 determines that the scheduled appointment occurs within a predetermined amount of time of the occurrence of the logout notification 6e, then the system 4 may instruct the vehicle 2 to move towards the person 1 to pick him or her up. Furthermore, if the system 4 determines that the scheduled appointment is located onsite (i.e. the appointment is located in the same building as the person's work or within a very short distance, such as 500 feet away), and the system 4 determines that the scheduled appointment occurs within a predetermined amount of time of the occurrence of the logout notification 6e, then the system 4 may not instruct the vehicle 2 to move towards the person 1 to pick him or her up.

Systems and methods may also be configured to determine the signal strength of the remote computing device 12, which may further indicate the person's location and need for a ride from the vehicle 2. In some embodiments, the system 4 is configured to determine whether a remote computing device 12 associated with the person 1 is disconnected from the cellular network or connected to the cellular network, but with a first signal that is less than a predetermined level. The system 4 can then determine whether the remote computing device 12 is connected to the cellular network with a second signal greater than or equal to the predetermined level. If the system determines that the remote computing device 12 is connected to the cellular network with the first signal that is less (weaker) than the predetermined level, then this may indicate that the person 1 was previously inside the building (e.g. the store) and her remote computing device 12 was receiving no signal or a weak signal. The subsequent determination that the remote computing device 12 is connected to the cellular network with the second signal strength that is greater than or equal to the predetermined level may indicate that the person 1 is outside the building or closer to the exit of the building whereby her remote computing device 12 is receiving a stronger signal. These determinations taken in sequence may indicate that the person 1 is thereby moving toward the exit and in need of a ride from the vehicle 2. In response to one or both of these determinations, the system 4 may send a first wireless communication to the vehicle 2. In some embodiments, the predetermined threshold is equal to the first signal. In some embodiments, the predetermined threshold is equal to the second signal. It should be appreciated that stating that a signal is greater than, less than, or equal to a predetermined level is referring to the strength of the signal.

Figure 8:
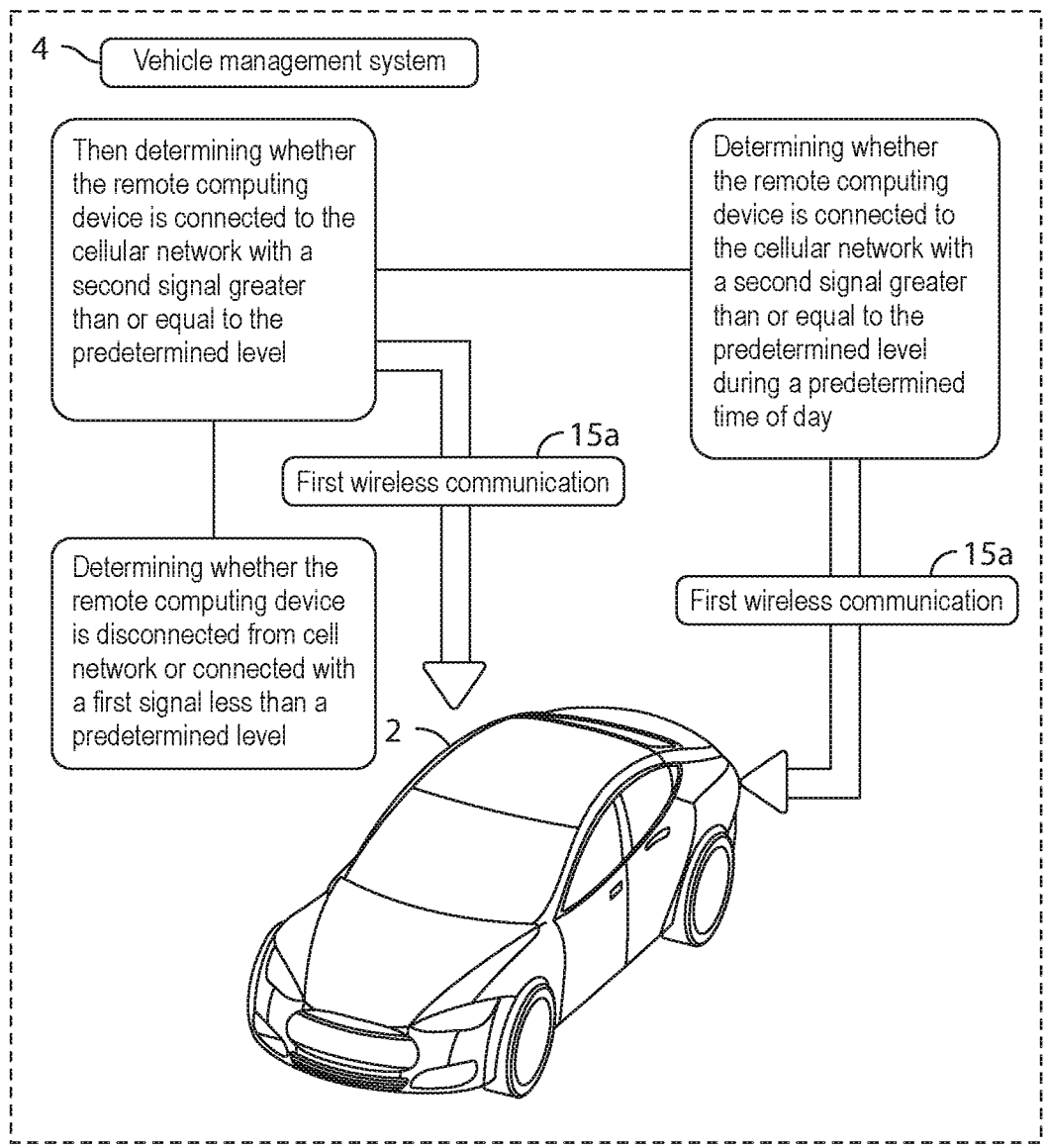
FIG. 8 illustrates a diagrammatic view of another method of using a self-driving vehicle, according to some embodiments.
Figure 8:
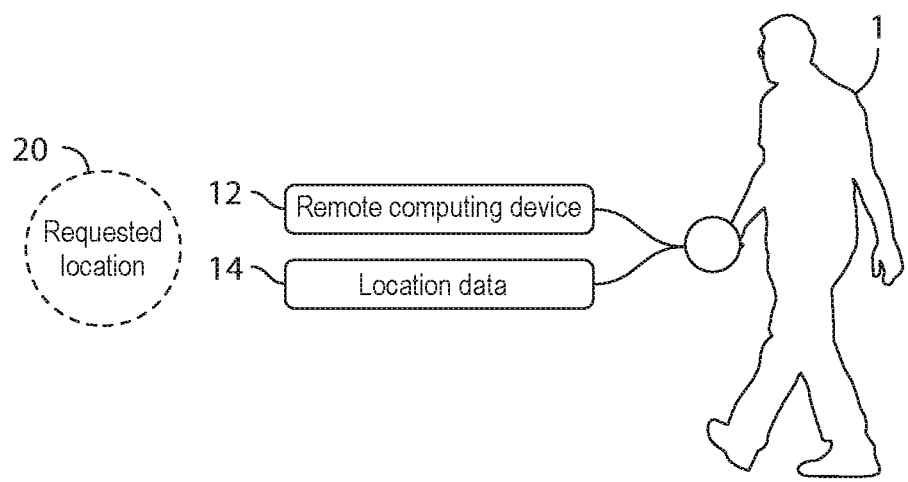

The system 4 may also be configured to further determine the person's need for a ride from the vehicle 2 by tracking the signal strength of the remote computing device 12 at predetermined times of day. As shown in FIG. 8, in some embodiments, the system 4 may determine whether the remote computing device 12 is connected to the cellular network with a second signal greater than or equal to the predetermined level during a predetermined time of day. In this regard, the system 4 may determine that the remote computing device 12 is connected to the cellular network with a second signal greater than the predetermined threshold. However, determining signal strength alone may not provide enough information for the system 4 to accurately conclude whether the person 1 needs a ride from the vehicle 2.

In this regard, the determination of the second signal strength can be further augmented by the system 4 determining if the second signal occurs during a specific time of day, such as between 10 am and 6 pm, or after 6 pm. For example, if the system 4 determines that the second signal is greater than the predetermined threshold at 2 pm, then this might indicate that the person 1 is outside of the building or near the entrance but is not actually leaving the building. For example, the person 1 might be taking a short walk break outside the building whereby the remote computing device 12 receives a stronger signal as compared to when the remote computing device 12 is inside the building. On the other hand, if the system 4 determines that the second signal is greater than the predetermined threshold at 7 pm, then this might indicate that the person 1 is near the entrance or physically outside the building, but more importantly, this determination might indicate that the person 1 is leaving work. In response to this determination, the vehicle 2 can begin moving towards the person 1 to pick the person 1 up.

Figure 9:
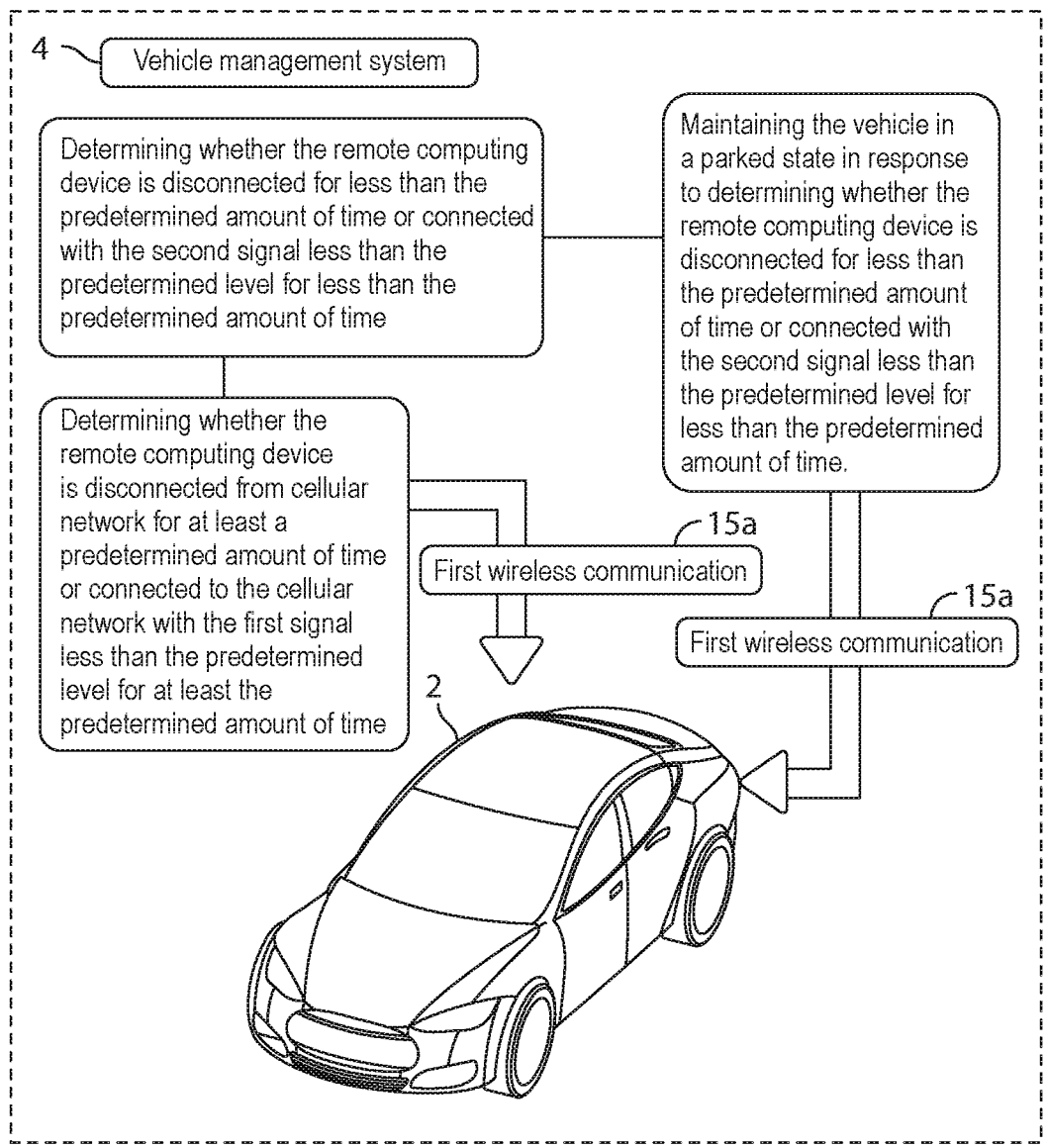
FIG. 9 illustrates a diagrammatic view of another method of using a self-driving vehicle, according to some embodiments.
Figure 9:
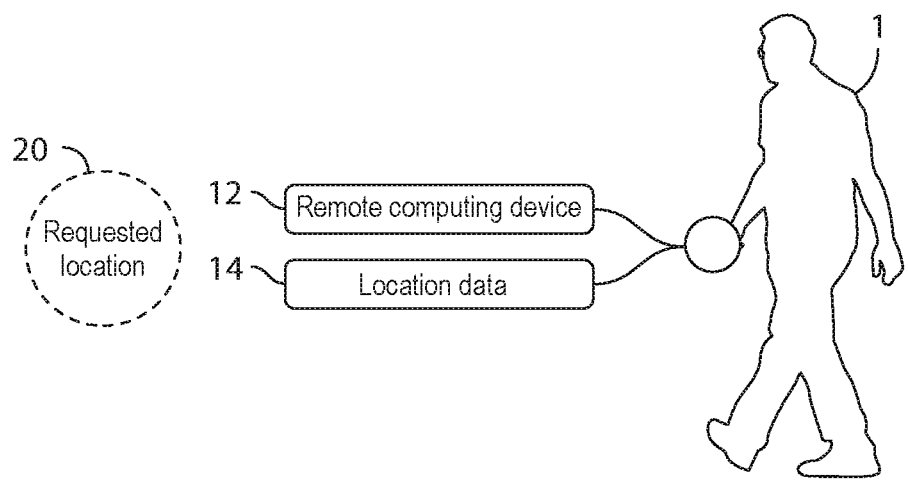

In addition to determining the signal strength of the remote computing device 12 during predetermined times of day, the system 4 may also be configured to determine how long the remote computing device 12 is receiving a signal with a strength greater than or less than the predetermined threshold. As shown in FIG. 9, the system 4 can be configured to determine whether the remote computing device 12 is disconnected from the cellular network for at least a predetermined amount of time or connected to the cellular network with the first signal less than the predetermined level for at least the predetermined amount of time.

In this regard, the system 4 can send the first wireless communication to the vehicle 2 in response to determining whether the remote computing device 12 is disconnected from the cellular network for at least a predetermined amount of time or connected to the cellular network with the first signal less than the predetermined level for at least the predetermined amount of time. To further illustrate with an example, the person 1 may be moving between areas of the building where the cellular signal or Wi-Fi signal of the remote computing device 12 is impaired. For example, the person 1 might be in an elevator whereby the remote computing device 12 receives a diminished signal or no signal at all. Furthermore, depending upon which floor the person 1 is going to, the system 4 may determine the amount of time that the remote computing device 12 receives the diminished signal and then interpret this differently.

For example, a person 1 may have an office on the $40^{th}$ floor so when the person 1 leaves the office for the day, the person 1 likely has to take the elevator to the $1^{st}$ floor. Accordingly, the system 4 can determine how long it commonly takes to travel from the $40^{th}$ floor to the $1^{st}$ floor (plus-minus additional time depending on whether the elevator has to pick up or drop off other passengers). Accordingly, in some instances, the person 1 might travel from the $40^{th}$ floor to another floor within the building (e.g. the $25^{th}$ floor). In this regard, the system 4 may determine that the remote computing device 12 received a diminished signal for an amount of time less than the amount it takes to travel from the $40^{th}$ floor to the $1^{st}$ floor. As such, the system 4 may interpret this to mean that the person 1 is not leaving the building and is instead simply moving between floors in the building, without intending to leave the office. Therefore, the system 4 may maintain the vehicle 2 in a parked state in response to determining that the remote computing device 12 is disconnected from the cellular network (or connected to the cellular network with the second signal less than the predetermined level) for less than the predetermined amount of time. In some embodiments, the predetermined amount of time may be the amount of time it commonly takes for the person 1 to travel by elevator from her work floor to the ground level.

Generally, it should be appreciated that the system 4 can learn the person's day-to-day behavioral patterns and the system 4 can adapt its responses accordingly. Because machine learning can require more than one data point, the system 4 can also be configured to receive manual inputs from a user, such as the person 1. For example, if the person 1 relocates her desk from the 40$^{th}$ floor to the 25$^{th}$ floor, the system 4 may be configured to receive a manual input whereby the person 1 can override the previous learning of the system 4. In this regard, the system 4 can be fully configured to automatically learn and adjust to a person's behavior, as well as be manually configured to a specific setting as dictated by the user.

In the past, people parked their vehicles and then had to remember where they parked their vehicles. Various systems were later invented to help people remember the location of their vehicles. For example, Apple iPhones include a feature that remembers the location at which a user parks her car.

Self-driving vehicles 2, however, present a major difficulty: These vehicles sometimes can park themselves when users are not in the vehicle, so users (e.g., people who use the cars to get rides) might not know where to find their vehicles. This is often not a problem because a person can use a remote computing device 12 such as a smartphone (e.g., an iPhone) or a tablet device (e.g., an iPad) to open an app that summon a vehicle 2 to pick up the person. Some of the embodiments described herein address how the system picks up the user in the event that the user's smartphone is lost, broken, or has a dead battery (such that the person cannot use her smartphone to tell the vehicle when and/or where to pick her up). The vehicle management system 65 and the self-driving vehicle 2 can thereby respond in a number of ways, such as sending a self-driving vehicle 2 to a pick-up location in an attempt to pick-up the user.

The vehicle management system 65 can be a portion of the self-driving vehicle 2. Communication between the vehicle 2 and the vehicle management system 65 can occur via electrical wires that couple the vehicle management system 65 to other portions of the vehicle 2.

Additionally, the vehicle management system 65 can be located remotely relative to the self-driving vehicle 2. Communication between the vehicle 2 and the vehicle management system 65 can occur via wireless communications that travel over intermediary communication systems.

In some embodiments, intermediary communication systems are used to perform each step. Intermediary communication systems can comprise wireless networks, Wi-Fi routers, Bluetooth systems, cellular networks, telephone networks, Internet systems, servers, cloud computing, remotely located computers, satellite systems, communication systems, and any other suitable means of enabling communication between the various components.

Furthermore, the communicative coupling between the remote computing device 12 and the vehicle management system 65 is via intermediary communication systems. In other words, intermediary communication systems can communicatively couple the remote computing device 12 and the vehicle management system 65. This communicative coupling may be via intermittent wireless communications. For example, the vehicle management system 65 may send a wireless message to the remote computing device 12 periodically (e.g., every 10 seconds, every 60 seconds, every 10 minutes). As used herein, "periodically" does not imply that every period has the same duration. In some embodiments, the communicative coupling between the self-driving vehicle 2 and the vehicle management system 65 is via intermediary communication systems.

Figure 10:
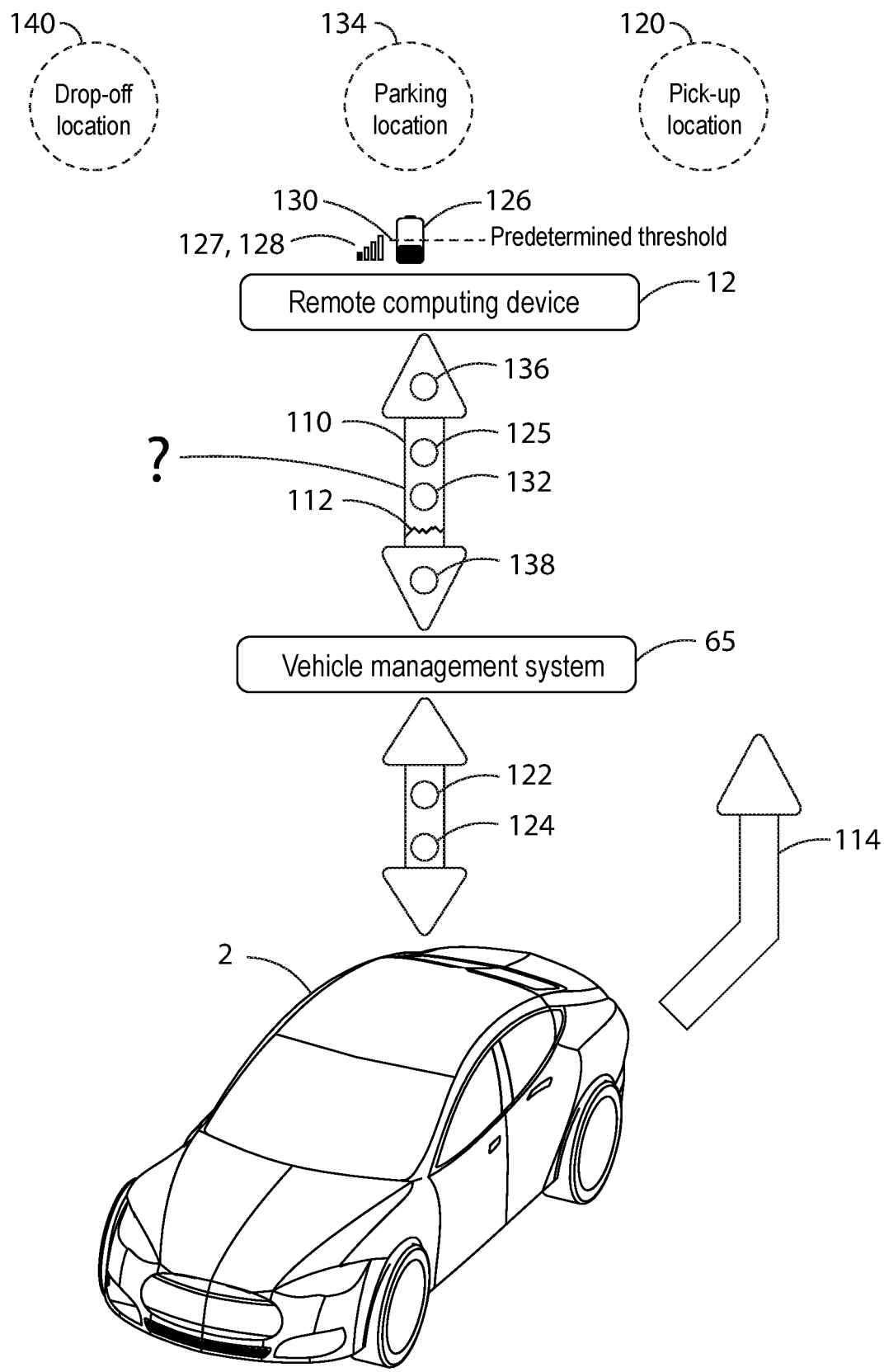
FIG. 10 illustrates a diagrammatic view of another method of using a self-driving vehicle, according to some embodiments.

With reference to FIG. 10, many embodiments include a method of using the vehicle management system 65 to operate the self-driving vehicle 2. The vehicle management system 65 is configured to be communicatively coupled with a remote computing device 12, which is thereby configured to operate software, such as an iPhone application or an Android application adapted to enable a user to control behaviors of the self-driving vehicle 2. Behaviors can include actions and non-actions of the self-driving vehicle 2, such as picking up the user at a location, picking up the user at a time based on a schedule of the user or a time based on past pick-up times, remaining idle, driving to a residence of the user, pulling out of a garage, parking the vehicle, getting gas, charging the vehicle, and the like.

As illustrated by arrow 110 in FIG. 10, methods include coupling communicatively, by the vehicle management system 65, the remote computing device 12 to the self-driving vehicle 2. The user may thereby use the remote computing device 12 to perform such actions as determining a location of the self-driving vehicle 2 and controlling movements of the self-driving vehicle 2. As shown by arrow 112, methods also include determining, by the vehicle management system 65, that the remote computing device 12 is no longer communicatively coupled to the vehicle management system 65.

Once this determination has been made, the vehicle management system 65 may perform any number of actions. In some embodiments, the vehicle management system 65 identifies a pick-up location 120 of the user. Accordingly, the vehicle management system 65 may thereby send 114 the self-driving vehicle 2 to the pick-up location 120 in response to determining that the remote computing device 12 is no longer communicatively coupled to the vehicle management system 65. In some embodiments, the vehicle management system 65 sends a command or an instruction 122, which causes the self-driving vehicle 2 to travel to the pick-up location 120.

Additionally, several embodiments comprise sending, by the vehicle management system 65, the self-driving vehicle 2 to a pick-up location 120 in response to (1) detecting, by the remote computing device 12, a battery charge indication below a predetermined threshold and in response to (2) determining, by the vehicle management system 65, that the remote computing device 12 is no longer communicatively coupled to the vehicle management system 65. Furthermore, methods include sending, by the vehicle management system 65, the self-driving vehicle 2 to a pick-up location 120 in response to (1) detecting, by the vehicle management system 65, a battery charge indication below a predetermined threshold (e.g., by asking the remote computing device 12 for its battery status and then receiving the battery status data from the remote computing device 12) and in response to (2) determining, by the vehicle management system 65, that the remote computing device 12 is no longer communicatively coupled to the vehicle management system 65. Methods may also include sending, by the vehicle management system 65, the self-driving vehicle 2 to the pick-up location 120 in response to an estimated pick-up time 124. In other words, if the vehicle management system 65 loses contact with the remote computing device 12, the system 65 will wait until a time that is closer to the estimated pick-up time before sending the vehicle 2 to the pick-up location 120. This may reduce the occurrence of false positives (e.g. false alarms or unnecessary pick-up attempts). For example, a user may travel to a confined location, such as a basement, whereby the remote computing device 12 loses communication with the vehicle management system 65. In such an instance, the system 65 may wait until at least a predetermined amount of time has elapsed, such as at least 20 minutes, after determining the remote computing device 12 is no longer communicating with the vehicle management system 65 before sending the vehicle 2 to the pick-up location 120. As such, waiting to send the vehicle 2 to the pick-up location may thereby reduce the occurrence of unnecessary pick-up attempts.

The vehicle management system 65 may further be arranged and configured to take more deliberate steps to determine whether the remote computing device 12 is no longer communicatively coupled with the vehicle management system 65. For example, methods may include determining, by the vehicle management system 65, that the remote computing device 12 is no longer communicatively coupled to the vehicle management system 65 by sending a wireless communication 125 to the remote computing device 12. The system 65 may thereby determine that the remote computing device 12 did not respond to the wireless communication 125 and thereby send the vehicle 2 to the pick-up location 120.

Additionally, the vehicle management system 65 may employ other methods to determine that the remote computing device 12 is no longer communicatively coupled to the system 65. In some embodiments, methods include determining, by the vehicle management system 65, that the remote computing device 12 is no longer communicatively coupled to the vehicle management system 65 by determining that a present battery power 127 of a battery 126 of the remote computing device 12 is depleted below a predetermined threshold 130 of the battery power 128. The predetermined threshold may be any amount or percentage of the battery power 128, such as 90%, 50%, 20%, 10%, 5%, 1%, and even 0%. In some embodiments, the battery power 128 is the initial overall battery capacity (at the time of purchase) or the present overall battery capacity (at the present time of performing the method steps) of the remote computing device 12. This can ensure that the system 65 accounts for changes, over time, to the performance of the remote computing device 65 so that the system 65 and vehicle 2 provide service that matches the present day conditions of the remote computing device 12. However, in some embodiments, the system 65 is programmed not to account for changes in battery performance to the remote computing device 12.

In several cases, the vehicle management system 65 will be able to distinguish between a remote computing device 12 that has a dead battery and a remote computing device 12 that is simply turned off. If the battery 126 is dead, then the vehicle management system 65 can try to pick up the user. If the remote computing device 12 is simply turned off, then having the vehicle management system 65 try to pick up the user is unnecessary. If the remote computing device 12 is simply turned off, then the vehicle management system 65 can wait until the remote computing device 12 is turned back on to receive pick up instructions from the user.

In some cases, however, the vehicle management system 65 might not be able to distinguish between a remote computing device 12 that has a dead battery and a remote computing device 12 that is simply turned off. If the vehicle management system 65 does not receive a reply to the vehicle management system's attempts to communicate with the remote computing device 12, the vehicle management system 65 may assume the remote computing device 12 is unable to send pick up instructions, and thus, can send the vehicle 2 to try to pick up the user (either right away or later, closer to an estimated pick up time). This approach sometimes leads to unnecessary pick-up attempts (e.g., when the user's remote computing device 12 is simply turned off rather than out of battery power).

To reduce unnecessary pick-up attempts, the vehicle management system 120 can rely on two indicators. The first indicator can include periodically asking the remote computing device 12 for the status of its battery power. The second indicator can include sending a wireless communication 125 to the remote computing device 12. If the remote computing device 12 does not reply to the wireless communication 125, then the vehicle management system 65 can interpret the lack of a reply as the remote computing device 12 no longer being communicatively coupled to the vehicle management system 65.

If the vehicle management system 65 receives data from the remote computing device 12 that indicates the battery power 128 of the remote computing device 12 is below a predetermined threshold (e.g., less than 40% of a full charge, less than 30% of maximum capacity), and then the remote computing device 12 does not reply to a wireless communication 125 from the vehicle management system 65, the vehicle management system 65 can enter a "disabled phone mode" and can send the vehicle 2 to pick up the user at any moment in time, such as immediately, within thirty minutes of determining that the remote computing device 12 did not reply to the wireless communication 125, and/or at a pick-up time that the vehicle management system 65 estimated based on historical behavior of the user or by analyzing the user's calendar (e.g., schedule). Using both the battery status data and the lack of a response from the remote computing device 12 can reduce unnecessary pick-up attempts.

Figure 11:
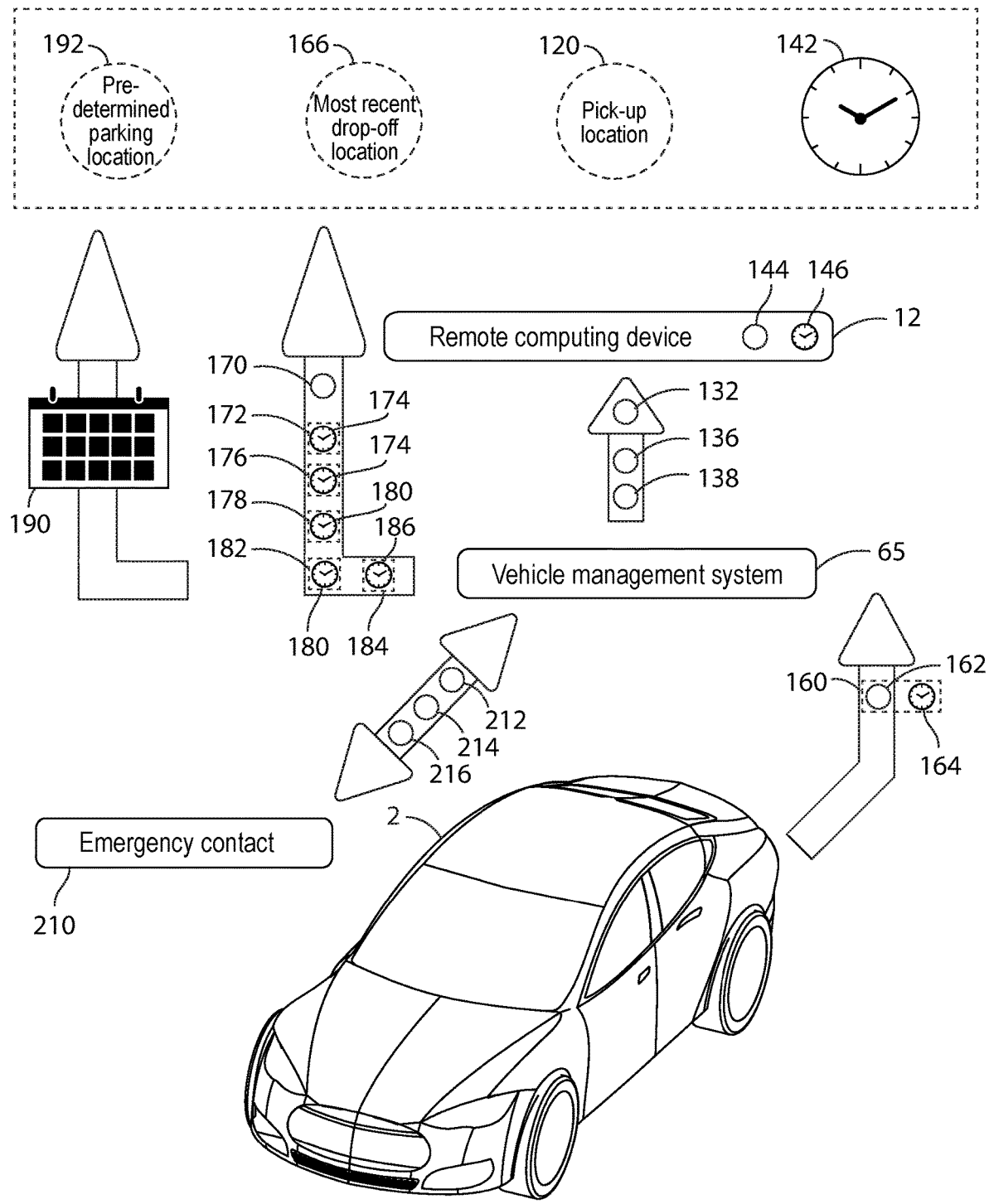
FIG. 11 illustrates a diagrammatic view of another method of using a self-driving vehicle, according to some embodiments.

As shown in FIGS. 10 and 11, methods can further include determining, by the vehicle management system 65, that the remote computing device 12 is no longer communicatively coupled to the vehicle management system 65 in response to determining that the vehicle management system 65 has not received a first wireless communication 132 from the remote computing device 12 for a predetermined amount of time. In some embodiments, the predetermined amount of time is greater than thirty seconds and less than thirty minutes. Furthermore, in some embodiments, the predetermined amount of time can be a time from when the vehicle management system 65 last tried to communicate with the remote computing device 12.

False alarms may still occur, as such, the vehicle management system 65 may be arranged and configured to respond accordingly. For example, if the remote computing device 12 starts communicating with the vehicle management system 65 again (e.g., because the device 12 regained reception or the user charged the device 12), the vehicle 2 may thereby park itself. Stated differently, after sending the self-driving vehicle 2 to the pick-up location 120, the vehicle management system 65 may instruct the self-driving vehicle 2 to find a parking location 134 in response to determining, by the vehicle management system 65, that communicative coupling between the vehicle management system 65 and the remote computing device 12 has been restored.

In some embodiments, the vehicle management system 65 may not initially hear from the remote computing device 12, so the system 65 repeatedly tries to communicate with the device 12 so the system 12 knows when the device 12 regains reception. As shown in FIG. 11, methods may thereby include sending a second wireless communication 136 from the vehicle management system 65 to the remote computing device 12 in response to determining that the remote computing device 12 is no longer communicatively coupled to the vehicle management system 65. The second wireless communication 136 may be configured to elicit a reply wireless communication 138 from the remote computing device 12 to the vehicle management system 65 when the remote computing device 12 regains cellular communication abilities. The system 65 may repeatedly send the second wireless communication 136 until the remote computing device 12 finally receives a response from the remote computing device 12 (e.g., the phone leaves the building that was blocking reception).

Oftentimes, the remote computing device 12 eventually regains reception and re-establishes communication with the vehicle management system 65. Accordingly, and as further shown in FIG. 10, methods may also include sending a second wireless communication 136 from the vehicle management system 65 to the remote computing device 12 in response to determining that the remote computing device 12 is no longer communicatively coupled to the vehicle management system 65. The second wireless communication 136 is configured to elicit a reply wireless communication 138 from the remote computing device 12 to the vehicle management system 65 when the remote computing device 12 regains a connection, such as a cellular communication or Wi-Fi communication. Methods may also include instructing, by the vehicle management system 65, the self-driving vehicle 2 to find a parking location 134 in response to receiving the reply wireless communication 138. It should be appreciated that the parking location 134 can be located remotely relative to the pick-up location 120. In some embodiments, the parking location 134 is the same, or nearly the same, location as the pick-up location 120. In some embodiments, the pick-up location 120 is within fifty yards of the parking location 134 or a drop-off location 140 where the self-driving vehicle 2 last dropped off the user.

The vehicle management system 65 may define various modes so that the self-driving vehicle 2 may pick up the user. For example, the self-driving vehicle 2 may enter an emergency mode when the vehicle management system 65 is unable to communicate with the remote computing device 12. Once communication is re-established, the vehicle 2 may thereby exit emergency mode and park itself, either in the original parking location or in a new parking location. It should be appreciated that when the self-driving vehicle 2 is in the emergency mode, the vehicle management system 65 sends a series of second wireless communications 136 to the remote computing device 12. In other words, in the emergency mode, the vehicle management system 65 sends multiple requests to the remote computing device 12, and then when the vehicle management system 65 does contact the remote computing device 12, the vehicle 2 can repark itself or pick up the user.

The vehicle management system 65 may also be configured to receive a pick-up location 120 and a pick-up time 142 prior to the remote computing device losing communication with the vehicle management system 65. For example, the system 65 may receive the location information 120, 142 at the time a user downloads the software. As such, methods include receiving, by the vehicle management system 65, at least one of the pick-up location 120 and the pick-up time 142 from the remote computing device 12 prior to determining, by the vehicle management system 65, that the remote computing device 12 is no longer communicatively coupled to the vehicle management system 65.

As illustrated in FIG. 11, the vehicle management system 65 may also determine the pick-up location 120 based on location data 144 from the remote computing device 12. Accordingly, methods may include determining, by the vehicle management system 65, the pick-up location 120 by analyzing location data 144 of the remote computing device in a period 146 within a predetermined amount of time (e.g., thirty minutes) of when the vehicle management system 65 determines that the remote computing device 12 is no longer communicatively coupled to the vehicle management system 65. The location data 144 can be GPS data from the remote computing device 12.

Furthermore, methods may include determining, by the vehicle management system 65, a pick-up time 142 based on the location data 144 of the remote computing device 12 during the period 146. For example, the system 65 may determine that the remote computing device 12 is located offshore, in a location unreachable by the vehicle 2. In this regard, the system 65 may predict a time at which the remote computing device 12 will be located in or adjacent to a location where the vehicle 2 is able to drive and thereby pick up the user.

With continued reference to FIG. 11, the system 65 may have access to data regarding past drop-offs and past pick-ups, which can be used to show trends and predict times whereby the user may be located. In this regard, the system 65 may access the user's past schedule, and even the user's current schedule and future schedule to determine where a user may be located. Accordingly, methods may include sending 160, by the vehicle management system 65, the self-driving vehicle 2 to the pick-up location 120 at a time 162 determined, by the vehicle management system 65, based on analyzing past amounts of time 164 from past drop-offs to past pick-ups. Methods may also include sending 160, by the vehicle management system 65, the self-driving vehicle 2 to the pick-up location 120 at a time 162 determined, by the vehicle management system 65, based on analyzing past amounts of time 164 from past drop-offs to past pick-ups at past drop-off locations within a predetermined distance (e.g., fifty yards) of a most recent drop-off location 166. Even still, methods include analyzing location data 144 of the remote computing device 12 after a most recent drop-off 166 of the user, and then sending 160, by the vehicle management system 65, the self-driving vehicle 2 to the pick-up location 120 at a time 162 determined, by the vehicle management system 65, based on analyzing the location data 144. In this regard, the vehicle management system 65 may analyze the user's past amount of time at the drop-off location and/or analyze typical pick times of a day at the drop-off location to estimate a pick-up time 142. The vehicle management system 65 may thereby analyze the user's past amount of time at the last known location of the user (e.g., as requested from the remote computing device 12 of the user) and/or analyze typical pick-up times of day at the last known location of the user to estimate a pick-up time 142. Additionally, methods may include analyzing, by the vehicle management system 65, a schedule 190 of the user to estimate at least one of the pick-up location 120 and a pick-up time 142.

In some embodiments, the self-driving vehicle 2 may travel to the pick-up location 120 but find that the user is not located at the pick-up location 120. As such, the vehicle 2 may leave the pick-up location 120 and then later travel back to the pick-up location 120 at increasing intervals in attempts to pick up the user. For example, the vehicle 2 might travel to the pick-up location 120 to find the user is not there and then come back to the pick-up location 120 in 20 minutes, the next come back time the vehicle 2 might come back 30 minutes later, and the next time the vehicle 2 might come back an hour later. Stated differently, after sending 160 the self-driving vehicle 2 to the pick-up location 120, methods may include determining 170, by the vehicle management system 65, that the user is not located at the pick-up location 120, and instructing 172, by the vehicle management system 65, the self-driving vehicle 2 to move away from the pick-up location 120 and to return to the pick-up location 120 after a first period of time 174. Methods may also include determining 176 that the user is not located at the pick-up location after the first period of time 174, and instructing 178, by the vehicle management system 65, the self-driving vehicle 2 to move away from the pick-up location 120 and to return to the pick-up location 120 after a second period of time 180. Additionally, methods may even include determining 182 that the user is not located at the pick-up location 120 after the second period of time 180, and instructing 184, by the vehicle management system 65, the self-driving vehicle 2 to move away from the pick-up location 120 and to return to the pick-up location 120 after a third period of time 186. In some embodiments, the third period 186 is greater than the second period 180, and the second period 180 is greater than the first period 174. However, in some embodiments, the third period 186 less than the second period 180, and the second period 180 is less than the first period 174. Even still, the first, second, and third periods 174, 180, 186 can all be equal to each other.

In some scenarios, the self-driving vehicle 2 may be unable to locate and/or pick up the user. For example, the user may have taken a different means of transportation to travel to her next destination (e.g., travel back home). Accordingly, the vehicle management system 65 may be arranged and configured to instruct the vehicle 2 to travel to another location, such as the user's residence and/or a location where the car will be safe and easily located by the user at a later time. As such, methods include determining that the user is not located at the pick-up location 120, and instructing, by the vehicle management system 65, the self-driving vehicle 2 to move to a predetermined parking location 192 that is located remotely relative to the pick-up location 120 and a most-recent drop-off location 166.

The predetermined components, such as the predetermined parking location 192, may be received by the vehicle management system 65 at a time prior to the system 65 determining that the remote computing device 12 is no longer communicatively coupled to the system 65. For example, some methods include receiving, by the vehicle management system 65, from the remote computing device 12 the predetermined parking location 192 prior to determining, by the vehicle management system 65, that the remote computing device 12 is no longer communicatively coupled to the vehicle management system 65. In several embodiments, the predetermined parking location 192 is a residence of the user and/or parking spot associated with the user, such as a friend's house, a parking spot at the user's employer, and the like.

As further illustrated in FIG. 11, in some embodiments, the vehicle management system 65 is arranged and configured to notify other people (e.g., an emergency contact and/or a person associated with the user) of various situations involving the self-driving vehicle 2 and/or the user. For example, methods include sending, by the vehicle management system 65, a notification 212 to an emergency contact 210 in response to determining, by the vehicle management system 65, that the remote computing device 12 is no longer communicatively coupled to the vehicle management system 65. In some embodiments, the notification 212 comprises at least one of a most recent drop-off location 166 of the user and any location information of the self-driving vehicle 2. It should be appreciated that the vehicle management system 65 may be arranged and configured to send to the emergency contact 210 any type of notification and/or information regarding the user's last known location, the self-driving vehicle's location, and the like.

Because the user and the emergency contact 210 may have been in contact with each other during the time when the remote computing device 12 and the vehicle management system 65 were not communicatively coupled, the system 65 may be configured to receive information from the emergency contact 210. In some embodiments, methods include receiving from the emergency contact 210, by the vehicle management system 65, at least one of a pick-up time 214 and the pick-up location 216 for the user in response to sending the notification 212. As such, the vehicle management system 65 may be arranged and configured to be communicatively coupled to at least two remote computing devices 12, associated and/or unassociated with the user, so that the system 65 can receive any such information that may help the self-driving vehicle 12 and/or system 65 locate and thereby pick up the user.

The vehicle management system 65 may send notifications and/or communicate with the emergency contact 210 under a variety of circumstances. For example, the vehicle management system 65 might determine the user is not at the pick-up location 120 by sensing that the user did not enter the self-driving vehicle 2. As such, in some embodiments, methods include sending the notification 212 in response to determining, by the vehicle management system 65, that the user is not located at the pick-up location 120. The notification can include a text, a phone call, a text and phone call, and the like to another person associated and/or unassociated with the user.

In some embodiments, the emergency contact 210 is a friend or family member of the user. The emergency contact 210 may even include emergency personnel (e.g., a 911-dispatcher, any personnel associated with law enforcement, roadside service, fire department, and the like). The user may have more than one emergency contact 210. In this regard, the vehicle management system 65 may contact the emergency contacts 210 according to priority. For example, the vehicle management system 65 may contact the user's spouse first and then contact emergency personnel second.

Self-driving vehicles 2 may be used to pick up users in high traffic locations or environments where the vehicle 2 is not allowed to park in one location for long periods of time, such as in front of a mall on Black Friday or in front of a stadium after a game. The vehicle management system 65 may thereby be arranged and configured such that if the user goes to the pick-up location 120, the user may summon the self-driving vehicle 2 to the pick-up location 120 and/or a first location 220 with a smart key 223. The smart key 223 can be a key fob configured to enable unlocking a door of the self-driving vehicle 2. In many embodiments, the smart key 223 is a wireless verification system configured to send an authorization signal to the vehicle 2 so the vehicle 2 knows that the user is authorized to use the vehicle 2. Smart keys 223 are made by many car brands including Lexus, Acura, BMW, and Toyota. In some embodiments, the user may press a button on the smart key 223, or key fob, to summon the self-driving vehicle 2 to the location 120, 220. It should be appreciated that the smart key 223 can be a device that sends a radio wave (e.g., a Bluetooth signal). In some embodiments, the smart key 223 is a second remote computing device 12. Generally, the smart key 223 is a radio communication device that uses Bluetooth and/or any type of wireless transmission to send a signal to the vehicle management system 65 and/or self-driving vehicle 2.

Figure 12:
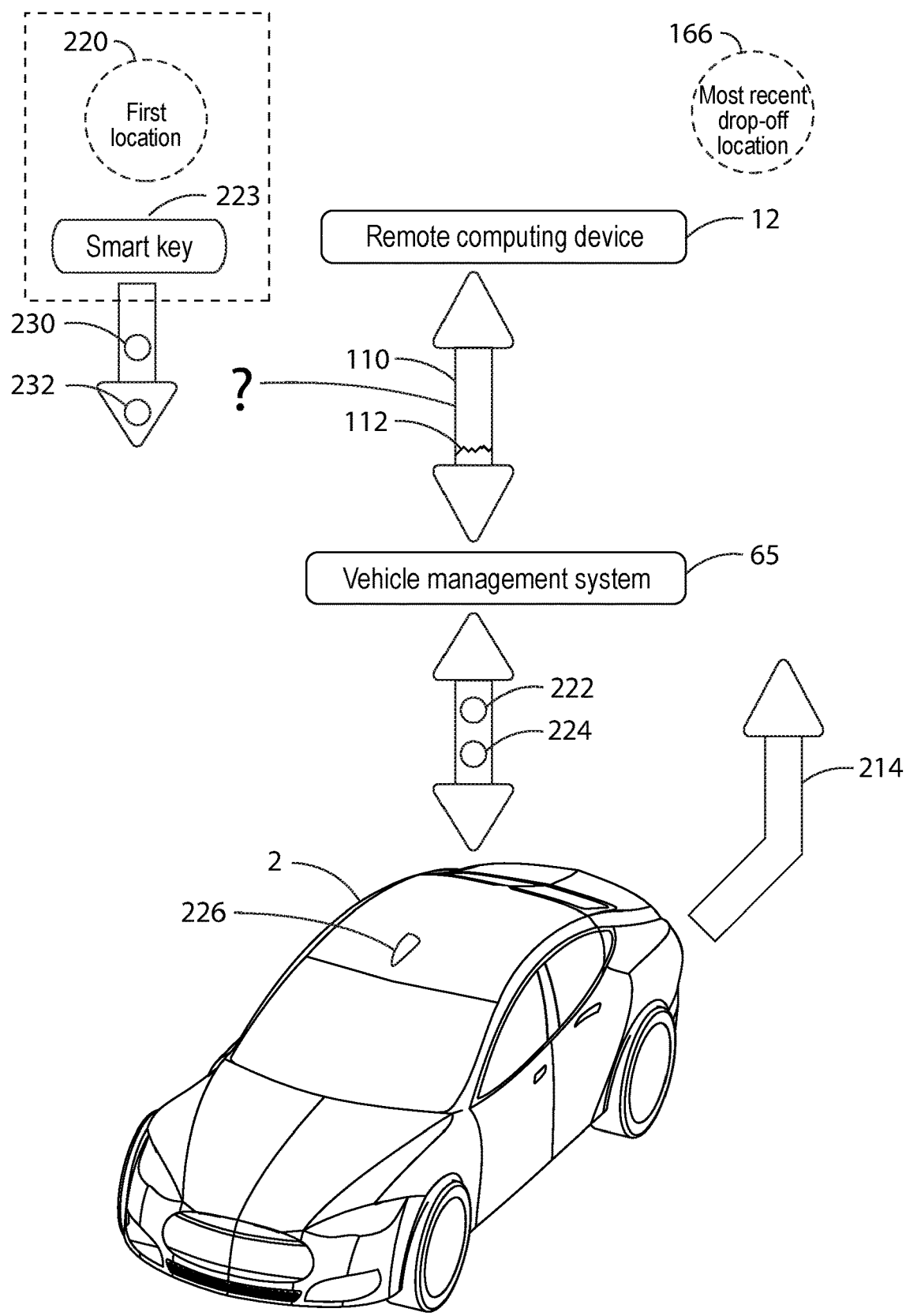
FIG. 12 illustrates a diagrammatic view of another method of using a self-driving vehicle, according to some embodiments.

Accordingly, with reference to FIG. 12, methods include coupling communicatively 210, by the vehicle management system 65, the remote computing device 12 to the self-driving vehicle 2, and then determining 212, by the vehicle management system 65, that the remote computing device 12 is no longer communicatively coupled to the vehicle management system 65.

Additionally, methods include identifying, by the vehicle management system 65, a pick-up location 120 of the user. Additionally, methods include sending 214, by the vehicle management system 65, the self-driving vehicle 2 to a first location 220 that is within a direct wireless communication range of a smart key 222 from a most-recent drop-off location 166 in response to determining, by the vehicle management system 65, that the remote computing device 12 is no longer communicatively coupled to the vehicle management system 65. In some embodiments, the sending 214 step comprises sending instructions 222 from the vehicle management system 65 to the self-driving vehicle 2.

In order for the self-driving vehicle 2 and/or vehicle management system 65 to communicate with the smart key 223, the vehicle 2 may thereby include equipment arranged and configured to detect wireless communications from the smart key 223. Accordingly, many methods include receiving, by the vehicle management system 65, an indication 224 that an antenna 226 of the self-driving vehicle 2 detected a first wireless communication 230 from the smart key 223, and then sending 214, by the vehicle management system 65, the self-driving vehicle 2 to the pick-up location 120 in response to receiving the indication 224.

The self-driving vehicle 2 can include multiple directional antennas, each of which is arranged to receive greater power in a specific direction. This way, the vehicle management system 65 can determine which antenna received the greatest signal from the smart key 223, and thereby estimate the direction of the smart key 223 relative to the vehicle 2. The vehicle 2 can then move in the estimated direction and then "listen" for another wireless signal from the smart key 223, which can communicate via radio waves (e.g., Bluetooth). Once the multiple directional antennas receive another wireless communication, the vehicle management system 65 can determine which antenna received the greatest signal from the smart key's latest communication, and thereby estimate the direction of the smart key 223 relative to the vehicle 2. The vehicle 2 can then correct its estimate of the location of the user of the smart key 223. Accordingly, methods include identifying, by the vehicle management system 65, the pick-up location 120 by analyzing a directionality 232 of the first wireless communication from the smart key 223.

In some embodiments, the smart key 223 is an electronic device configured to send radio frequency ("RF") wireless communications directly to an antenna of the vehicle 2. The radio frequency wireless communications can be Bluetooth communications. For example, a user can walk out of a building and then press a button on the smart key 223. Pressing the button on the smart key 223 can cause the smart key 223 to send an RF wireless communication configured to be detected by the vehicle 2 (if the vehicle 2 is within a direct wireless communication range of the smart key 223). The smart key 223 can include an RF antenna configured to send and/or receive RF communications.

Figure 13:
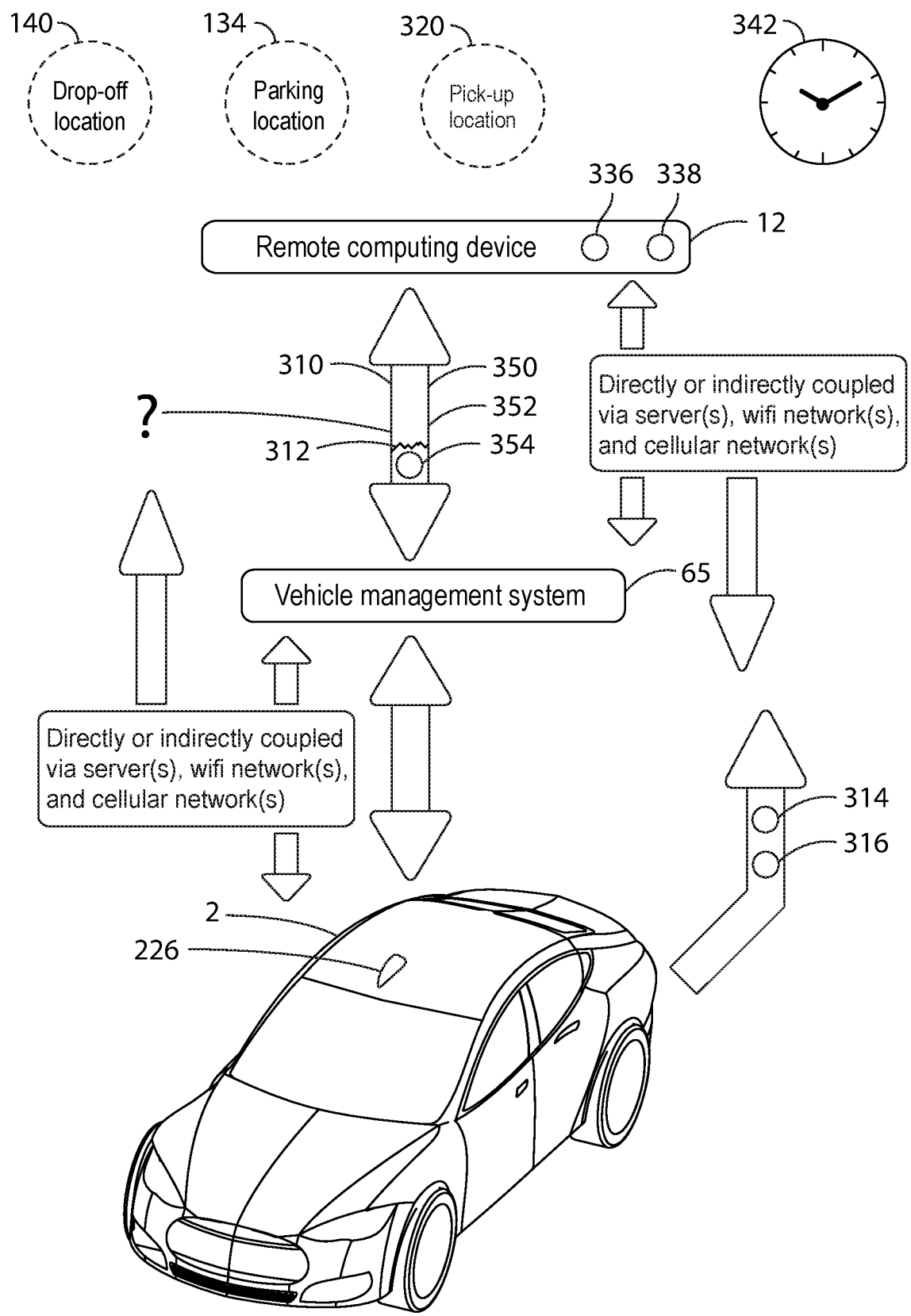
FIG. 13 illustrates a diagrammatic view of another method of using a self-driving vehicle, according to some embodiments.

As shown in FIG. 13, in some embodiments, the remote computing device 12 and/or the vehicle management system 65 detects that the battery 126 of the remote computing device 12 is low. As such, the device 12 and/or system 65 may ask the user for a pick-up location 320 and/or pick-up time 342 prior to the battery 126 dying. Accordingly, methods include coupling communicatively 310, by the vehicle management system 65, the remote computing device 12 to the self-driving vehicle 2 and detecting, by the remote computing device 12, a battery charge indication below a predetermined threshold 336. Methods may thereby include notifying, by the remote computing device 12, the user to select a pick-up time 338 in response to detecting the battery charge indication 128 below the predetermined threshold 130. Additionally, some methods include sending 314, by the vehicle management system 65, the self-driving vehicle 2 to a pick-up location 320 in response to the pick-up time 342 selected by the user.

In some embodiments, the method includes determining 312, by the vehicle management system 65, that the remote computing device 12 is no longer communicatively coupled to the vehicle management system 65, and then sending 316, by the vehicle management system 65, the self-driving vehicle 2 to the pick-up location 320 in response to determining, by the vehicle management system 65, that the remote computing device 12 is no longer communicatively coupled to the vehicle management system 65. In such embodiments, the pick-up time 342 selected by the user may only used if the remote computing device dies. If the remote computing device 12 does not die, then the user can simply select a pick-up time 342 later.

In some embodiments, the vehicle management system 65 is arranged and configured to determine that the remote computing device 12 is not communicatively coupled to the system 65 because the system 65 has not received a wireless communication from the remote computing device 12. Accordingly, methods may also include determining 350, by the vehicle management system 65, that the remote computing device 12 is no longer communicatively coupled to the vehicle management system 65 in response to determining 352 that the vehicle management system 65 has not received a first wireless communication 354 from the remote computing device for a predetermined amount of time.

Figure 14:
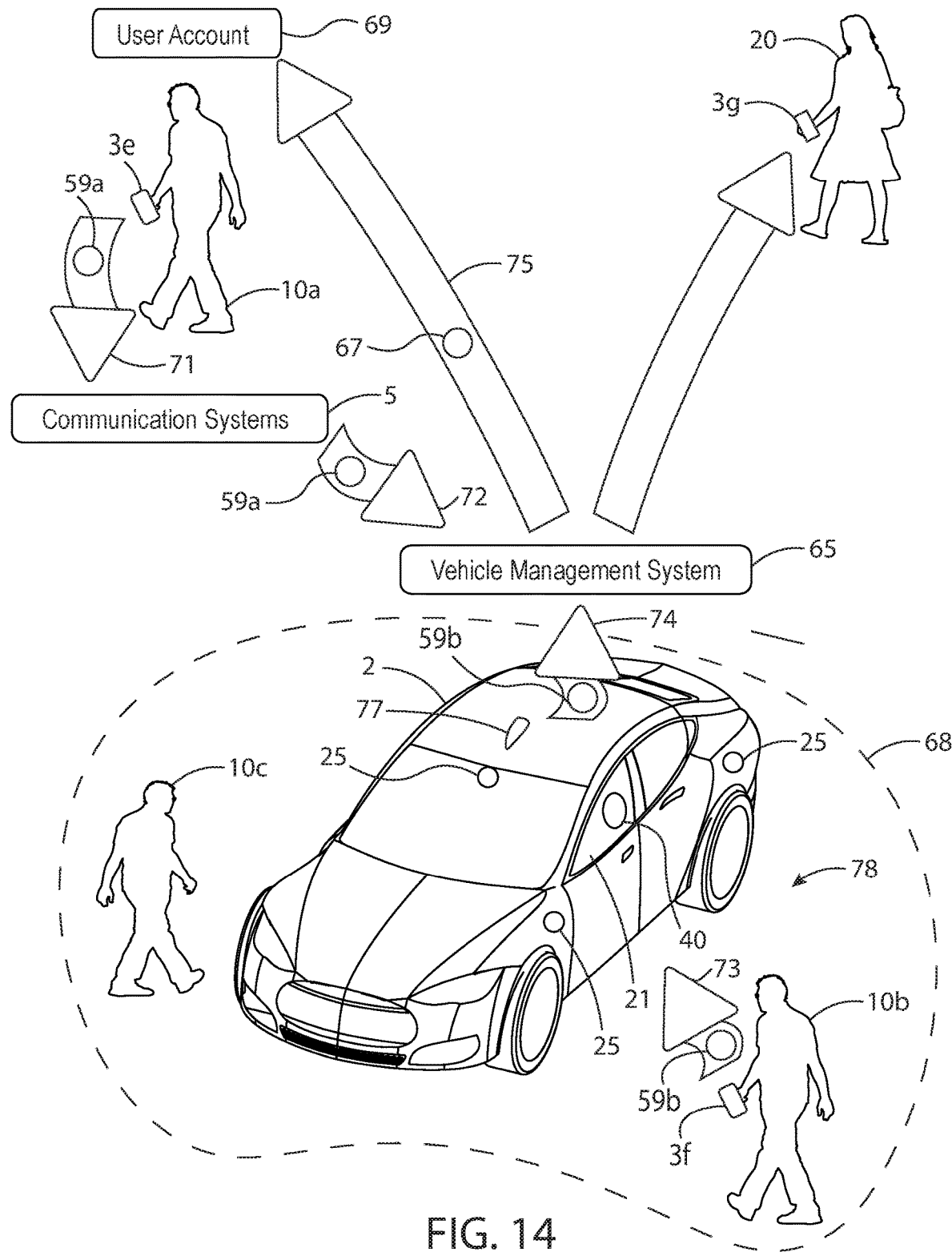
FIG. 14 illustrates a diagrammatic view of another method of using a self-driving vehicle, according to some embodiments.

FIG. 14 illustrates a diagrammatic view of an embodiment that includes a vehicle management system 65 that can be located in the vehicle 2, can be located remotely relative to the vehicle 2, and can be located partially in the vehicle 2 and partially remotely relative to the vehicle 2. FIG. 14 is explained as FIG. 6 in U.S. patent application Ser. No. 15/248,910. The entire contents of U.S. patent application Ser. No. 15/248,910 are incorporated by reference herein. Some embodiments comprise methods of using a vehicle management system to operate a self-driving vehicle. The vehicle management system can be configured to be communicatively coupled with a remote computing device configured to operate software adapted to enable a user to control behaviors of the self-driving vehicle. The software can be an "app" and/or any other suitable software.

The vehicle management system 65 may send notifications and/or communicate with the emergency contact 210 under a variety of circumstances. For example, the vehicle management system 65 might determine that is has lost communication with a remote computing device (e.g., a smartphone, smart key, or other electronic device) of the user of the self-driving vehicle 2. This situation can be very troublesome because, in some cases, the remote computing device is the means by which the user tells the vehicle 2 to pick up the user. In some embodiments, methods include sending a notification in response to determining, by the vehicle management system 65, that the remote computing device is no longer communicatively coupled to the vehicle management system. This notification can include a push notification, a text, a phone call, a text and phone call, and/or any suitable communication to another person who acts as the "emergency contact" of the user.

As used herein, an "emergency contact" can any person or entity to whom the vehicle management system sends the notification when the vehicle 2 has difficulty locating the user (e.g., due to the user not being at the pick-up location, due to a dead or low battery of the remote computing device of the user, due to insufficient wireless communication abilities of the remote computing device of the user, or any other reason). As used herein, the term "emergency" does not require there to be a fire, flood, bodily injury, or the like. Simply having trouble communicating with the user can be an "emergency" as defined herein even if the user is perfectly safe and unaware that she has lost contact with her self-driving vehicle 2.

In some embodiments, the emergency contact 210 is a friend or family member of the user. The emergency contact 210 can also be a call-center worker tasked with helping the user. The emergency contact 210 may even include emergency personnel (e.g., a 911-dispatcher, any personnel associated with law enforcement, roadside service, fire department, and the like). The user may have more than one emergency contact 210. In this regard, the vehicle management system 65 may contact the emergency contacts 210 according to priority. For example, the vehicle management system 65 may contact the user's spouse first and then contact emergency personnel second.

Some embodiments comprise receiving, by the vehicle management system, contact information of an electronic device (e.g., a smartphone, a computer) of the emergency contact (e.g., a person, an entity) in response to the user choosing the emergency contact. In several embodiments, the user chooses the emergency contact via an "app" on her smartphone or a website on a laptop computer, a desktop computer, a tablet computer, or any other suitable computer. The user can also choose the emergency contact(s) by talking to a device such as Amazon Echo. The emergency contact selection system can ask the user to specify the contact information of the person or entity that the user wants to take control of the vehicle 2 in the event that the vehicle management system cannot find the user, cannot communicate with the user, the user is incapacitated (e.g., passed out), etc.

The contact information can include the name, phone number, identification number, username, screenname, address, Skype contact information, Facebook name, etc. configured to enable identifying and/or contacting the emergency contact. For example, the user could select a Facebook profile of the emergency contact, which would enable a system to find contact information of the person or entity associated with the Facebook profile. In some embodiments, the contact information comprises a phone number. The vehicle management system can receive the phone number and then use the phone number to send push notification, text messages, phone calls, etc. to the emergency contact.

The contact information can be configured to enable the vehicle management system to send the notification to the emergency contact in response to the remote computing device no longer being communicatively coupled to the vehicle management system.

The emergency contact can comprise a person that the user chose prior to the vehicle management system determining that the remote computing device is no longer communicatively coupled to the vehicle management system. The emergency contact can comprise the person authorized by the user to send movement instructions to the self-driving vehicle in the event that the vehicle management system is communicatively uncoupled from the remote computing device of the user.

Movement instructions can comprise a pick-up time (e.g., a time to pick up the user), a pick-up location (e.g., a location to pick up the user), and/or an instruction to move the vehicle to a remote location (e.g., go to parking spot, a home base, circle the area until finding the user). Movement instructions can also be more specific steering maneuvers such as turn right here, turn left there, do not hit that car, etc.

The emergency contact can comprise a person that the user chose prior to the vehicle management system determining that the remote computing device is no longer communicatively coupled to the vehicle management system. The emergency contact can comprise the person authorized by the user to send a movement instruction to the self-driving vehicle. Methods can comprise receiving, by the vehicle management system, the movement instruction in response to the notification sent by the vehicle management system to the emergency contact.

In several embodiments, the emergency contact comprises an entity that the user chose prior to the vehicle management system determining that the remote computing device is no longer communicatively coupled to the vehicle management system. The emergency contact can comprise the entity authorized to send movement instructions to the self-driving vehicle in the event that the vehicle management system is communicatively uncoupled from the remote computing device of the user.

In some embodiments, the emergency contact comprises an entity chosen prior to the vehicle management system determining that the remote computing device is no longer communicatively coupled to the vehicle management system. The emergency contact can comprise the entity authorized to send movement instructions to the self-driving vehicle in an event that the vehicle management system is communicatively uncoupled from the remote computing device of the user.

Several embodiments comprise coupling communicatively, by the vehicle management system, the remote computing device to the self-driving vehicle; and sending, by the vehicle management system, a notification to an emergency contact in response to determining, by the vehicle management system, that the remote computing device is no longer communicatively coupled to the vehicle management system.

Several embodiments comprise (in response to sending the notification) receiving from the emergency contact, by the vehicle management system, an instruction to move the vehicle to a remote location, and then instructing, by the vehicle management system, the self-driving vehicle to move to the remote location. The remote location can be a parking spot, the user's home, a pick-up location, etc.

Some embodiments comprise receiving from the emergency contact, by the vehicle management system, a waiting location in response to sending the notification, and then instructing, by the vehicle management system, the self-driving vehicle to move to the waiting location. The vehicle can wait at the waiting location until the vehicle can pick up the user. The waiting location can be located remotely relative to a pick-up location of the user. The waiting location can be a parking garage and the pick-up location can be on a street right outside a store in which the user is shopping.

Some embodiments comprise instructing, by the vehicle management system, the self-driving vehicle to return to a home base in response to determining, by the vehicle management system, that the remote computing device is no longer communicatively coupled to the vehicle management system. The home base can a central storage area (e.g., a parking garage) configured to store vehicles. The home base can also be a garage attached to, near, or inside the user's home.

Several embodiments comprise instructing, by the vehicle management system, the self-driving vehicle to return to a home base in response to determining, by the vehicle management system, that the remote computing device is no longer communicatively coupled to the vehicle management system and in response to determining, by the vehicle management system, that the user is not located at a pick-up location.

Some embodiments comprise instructing, by the vehicle management system, the self-driving vehicle to return to a home base after a predetermined amount of time in response to determining, by the vehicle management system, that the remote computing device is no longer communicatively coupled to the vehicle management system.

Some embodiments comprise instructing, by the vehicle management system, the self-driving vehicle to go to a predetermined pick-up location of the user in response to determining, by the vehicle management system, that the remote computing device is no longer communicatively coupled to the vehicle management system.

Several embodiments comprise instructing, by the vehicle management system, the self-driving vehicle to go to a most recent drop-off location of the user in response to determining, by the vehicle management system, that the remote computing device is no longer communicatively coupled to the vehicle management system.

Some embodiments comprise determining, by the vehicle management system, that the user is not located at the most recent drop-off location, and instructing, by the vehicle management system, the self-driving vehicle to move away from the most recent drop-off location and to return to the most recent drop-off location after a first period of time.

Some embodiments comprise determining, by the vehicle management system, that the user is not located at the most recent drop-off location after the first period of time, and instructing, by the vehicle management system, the self-driving vehicle to move away from the most recent drop-off location and to return to the most recent drop-off location after a second period of time that is greater than the first period of time.

Several embodiments comprise determining that the user is not located at the most recent drop-off location after the second period of time, and instructing, by the vehicle management system, the self-driving vehicle to move away from the most recent drop-off location and to return to the most recent drop-off location after a third period of time that is greater than the second period of time.

In some embodiments, a vehicle management system might lose communicative coupling with a remote computing device, take action in response to losing the communicative coupling (e.g., by trying to pick up the user), and then regain communicative coupling. Once communicative coupling is restored, the vehicle can return to its regular response mode by finding a parking location and waiting for further instructions (e.g., regarding a pick-up time and location).

In some embodiments, (after determining the remote computing device is no longer communicatively coupled to the vehicle management system and instructing, by the vehicle management system, the self-driving vehicle to attempt to pick-up the user) the embodiments comprise instructing, by the vehicle management system, the self-driving vehicle to find a parking location in response to determining, by the vehicle management system, that communicative coupling between the vehicle management system and the remote computing device has been restored.

Self-driving vehicles can drop off a user 1 and then later can pick-up the user 1. In some cases, the user 1 owns a self-driving vehicle 2 that drops off and picks up the user 1. In other cases, the user 1 pays a service that owns multiple self-driving vehicles 2. This service might use one self-driving vehicle 2 to drop off the user 1 and then might use another self-driving vehicle 2 to pick up the user 1. A vehicle management system 65 may govern one self-driving vehicle 2 (e.g., owned by the user 1) and/or may govern many fleets of self-driving vehicles 2.

The vehicle management system 65 can be partially or completely mechanically coupled to the self-driving vehicle 2 (e.g., such that the vehicle transports at least a portion of the vehicle management system 65). In some embodiments, the vehicle management system 65 is not mechanically coupled to the self-driving vehicle 2, but is communicatively coupled to the self-driving vehicle 2 such that the vehicle management system 65 can provide information such as destinations, waiting locations, driving directions, traffic information, pick-up times, and pick-up locations to the self-driving vehicle 2.

The vehicle management system 65 can be wirelessly communicatively coupled to the self-driving vehicle 2 via intermediary communication systems 5. The remote computing device 12 can be wirelessly communicatively coupled to the vehicle management system 65 via intermediary communication systems 5. Intermediary communication systems 5 can comprise wireless networks, cellular networks, telephone networks, Internet systems, servers, cloud computing, remotely located computers, radio communication systems 5, satellite systems, communication systems 5, and any other suitable means of enabling wired and/or wireless communication between the remote computing device 12, the vehicle management system 65, and/or the self-driving vehicle 2.

In embodiments that include elements such as sending information or otherwise communicating, the remote computing device 12, the vehicle management system 65, and the self-driving vehicle 2, can do these elements by using intermediary communication systems 5. For example, the remote computing device 12, the vehicle management system 65, and the self-driving vehicle 2 may send wireless communications and/or receive wireless communications via intermediary communication systems 5, which can serve as a communication bridge between the remote computing device 12, the vehicle management system 65, and the self-driving vehicle 2.

Once the user 1 is dropped off (e.g., at a shopping area), the vehicle management system 65 may or may not know when the user 1 wants to be picked up. Even if the user 1 specifies to the vehicle management system 65 (e.g., via her remote computing device 12) when the user 1 wants to be picked up, the user 1's plans may change, which could necessitate an earlier pick-up time, a later pick-up time, and/or a different pick-up location. As a result, a dead battery 13 of the user 1's remote computing device 12 could be particularly problematic. If the user 1 loses the ability to communicate with the vehicle management system 65 (e.g., due to a dead smartphone battery 13), the user 1 may be stranded without a ride home and the self-driving vehicle 2 may circle the wrong pick-up location for hours or might otherwise wait for hours or even days for instructions from the user 1.

Some of the embodiments described herein reduce the risk of the user 1 being stranded without a means to communicate with the vehicle management system 65. In some embodiments, detecting a battery 13 charge indication below a threshold can trigger several responses configured to minimize the risk of the self-driving vehicle 2 failing to pick up the user 1 due to the remote computing device 12 having a low or dead battery 13.

Figure 15:
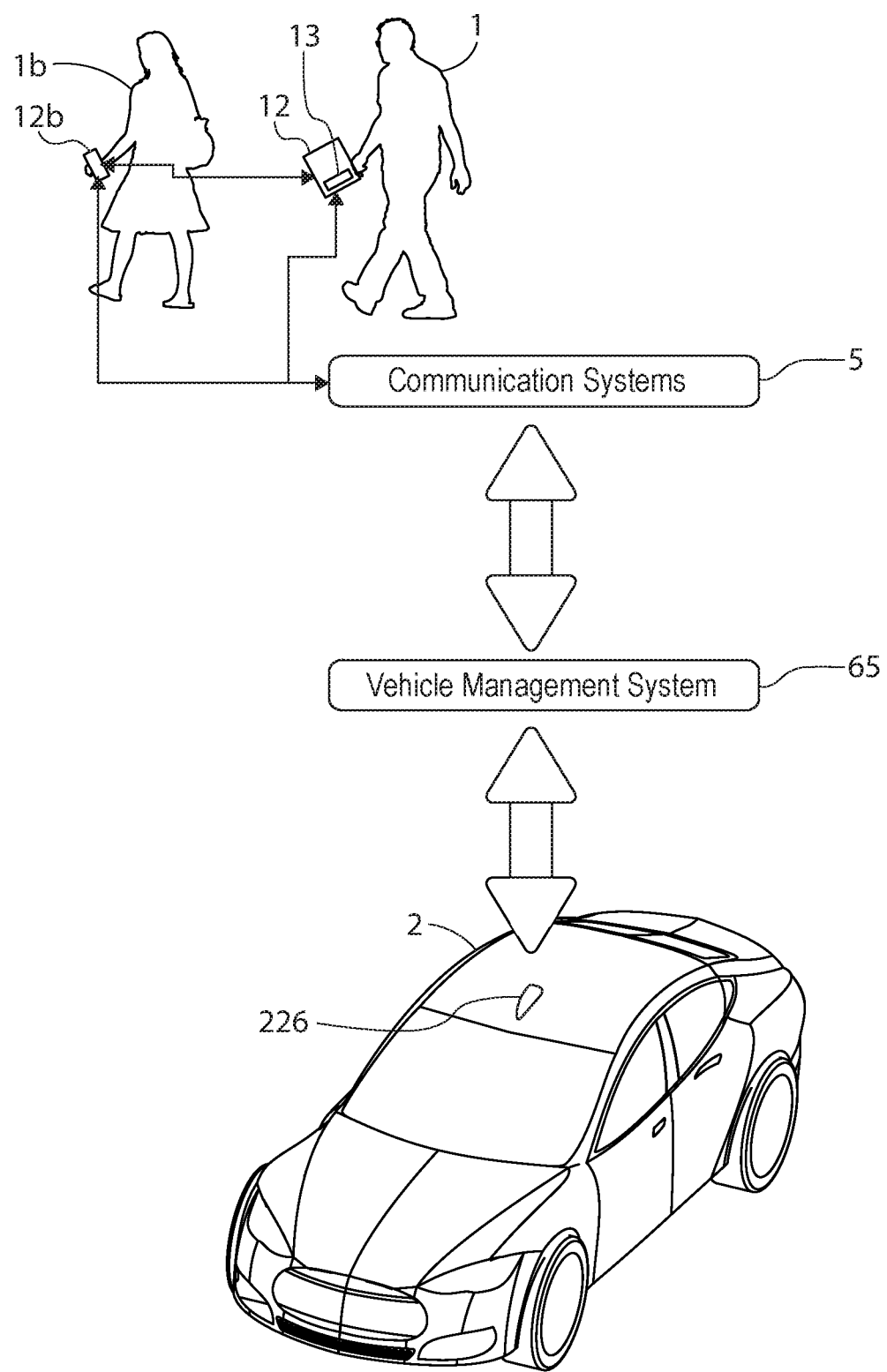
FIGS. 15-20 illustrate diagrammatic views of methods of using a self-driving vehicle, according to some embodiments.

FIG. 15 illustrates a self-driving vehicle 2 communicatively coupled with a vehicle management system 65. Intermediary communication systems 5 can communicatively couple the vehicle management system 65 to a first remote computing device 12 of the user 1 and to a second remote computing device 12b of a back-up contact. The back-up contact can be associated with a person 1b. The person 1b can be located near the user 1 (e.g., within 50 yards) or can be located far away from the user 1 (e.g., in a call center in another state). In some cases, the person 1b is a trusted friend of the user 1. The user 1 can transfer control of the self-driving vehicle 2 to the back-up contact (e.g., a second remote computing device 12b) owned or controlled by the trusted friend. In some cases, the person 1b receives a notification via the back-up contact (e.g., a second remote computing device 12b associated with the person 1b) in the event that the system determines the risk is high that the user 1 has lost (or will soon lose) the ability to communicate with the vehicle management system 65.

Some embodiments comprise methods of using a vehicle management system 65 to operate a self-driving vehicle 2. The vehicle management system 65 can be configured to be communicatively coupled with a remote computing device 12. The remote computing device 12 can be configured to enable a user 1 to control behaviors of the self-driving vehicle 2. The remote computing device 12 can comprise a battery 13 configured to provide electrical power to the remote computing device 12. The battery 13 can comprise one or more cells. As used herein, a "battery" can be a single battery or can be a collection of several batteries configured to provide electrical power to the remote computing device 12.

Several embodiments comprise coupling communicatively the remote computing device 12 to the vehicle management system 65; and detecting, by the remote computing device 12, a first battery 13 charge indication of the battery 13. The remote computing device 12 can be configured to detect when the first battery 13 charge indication is below a first predetermined threshold. Texas Instruments Incorporated, having an office in Dallas, Tex., manufactures several battery 13 gauges and battery 13 monitoring integrated circuits. These integrated circuits can be used in remote computing devices 12 to enable the remote computing devices 12 to receive real-time information regarding the voltage, current, charge, health, and estimated depletion of the battery 13. These integrated circuits can detect when the battery 13 charge indication is below a predetermined threshold. In various embodiments, the predetermined threshold can be a charge level, a voltage level, a percentage of remaining battery 13 charge, an amount of time left before the system estimates the battery 13 will be depleted, etc.

The system can take various actions in response to detecting that the battery 13 life is low (e.g., to reduce the risk of the user 1 needing to communicate with the self-driving vehicle 2, but being unable to communicate with the self-driving vehicle 2).

Figure 16:
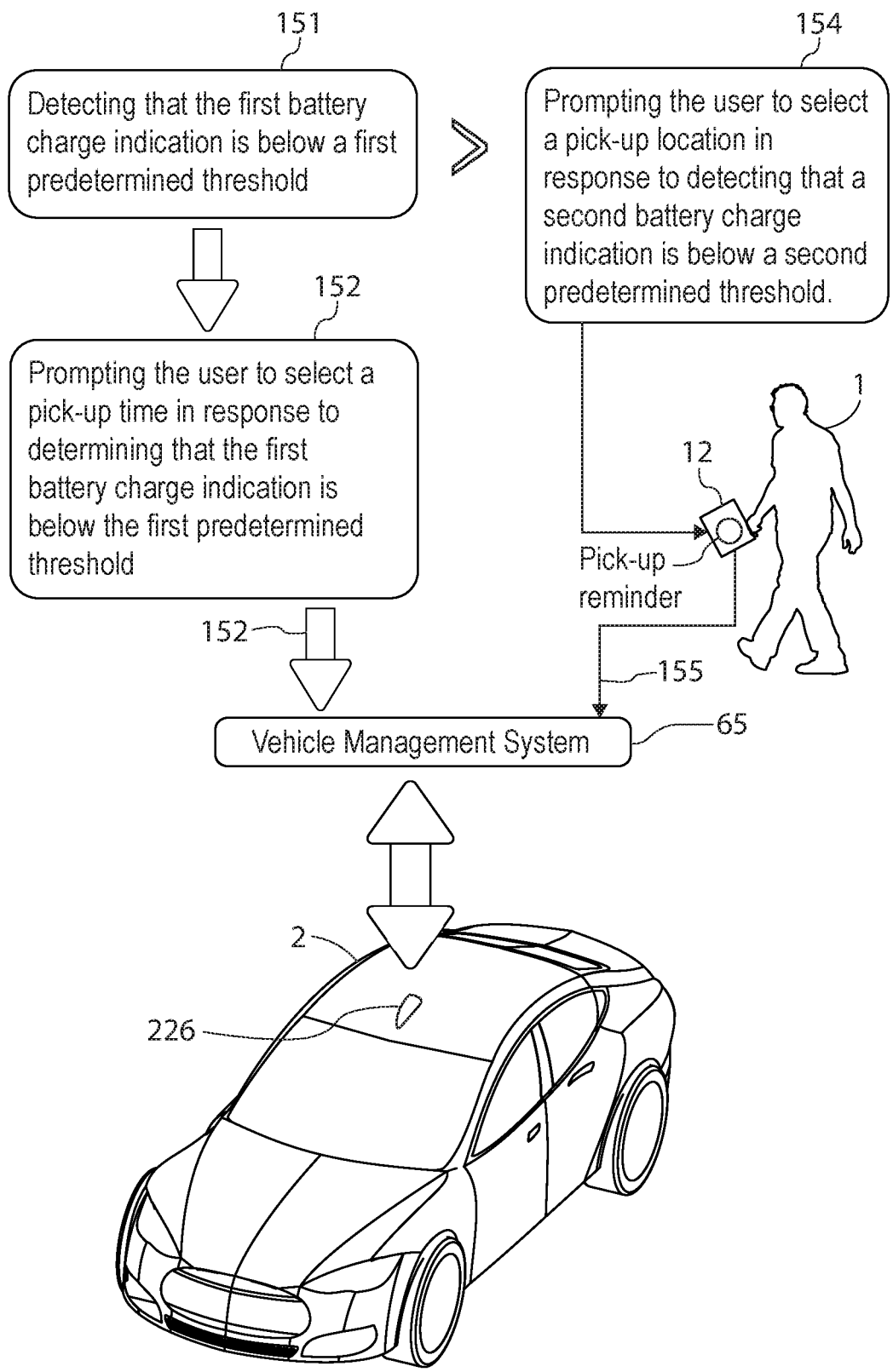

Referring now primarily to FIG. 16, some embodiments comprise determining, by the remote computing device 12, that the first battery 13 charge indication is below a first predetermined threshold (e.g., see block 151). Then the system can prompt, by the remote computing device 12, the user 1 to select a pick-up time in response to determining that the first battery 13 charge indication is below the first predetermined threshold (e.g., see block 152). The system can then send, by the remote computing device 12, the pick-up time selected by the user 1 to the vehicle management system 65 (e.g., see arrow 153).

The vehicle management system 65 can comprise a computer system (e.g., located in the vehicle, located in the Cloud) configured to control behaviors of the self-driving vehicle 2 according to instructions received from the user 1 via the remote computing device 12.

The remote computing device 12 can send information to the vehicle management system 65 through direct wireless communication methods and/or through indirect wireless communication methods (e.g., using other communication systems 5 such as cellular communication networks, satellite communication networks, radio communication networks, and any other communication devices and technologies).

Some embodiments comprise prompting, by the remote computing device 12, the user 1 to select a pick-up location in response to determining, by the remote computing device 12, that a second battery 13 charge indication is below a second predetermined threshold (e.g., see block 154). In several embodiments, the remote computing device 12 has an "app" (e.g., software configured to run on the remote computing device 12). The "app" is configured to monitor the battery 13 charge level of the remote computing device 12 and then can prompt the user 1 to select a pick-up time and/or pick-up location in response to determining that a battery 13 charge indication is below a threshold. The "app" can prompt the user 1 via a pop-up notification that appears on the screen of the remote computing device 12. In some embodiments, the prompt includes a vibration and/or a sound configured to encourage the user 1 to check her remote computing device 12 for a notification. The notification can ask the user 1 to select a new pick-up time and new pick-up location, which in some embodiments supersedes a previously selected pick-up time and pick-up location.

Some embodiments comprise sending, by the remote computing device 12, the pick-up location selected by the user 1 to the vehicle management system 65 (e.g., see arrow 155). In some embodiments (but not all embodiments), the second predetermined threshold is lower than the first predetermined threshold.

In some cases, the remote computing device 12's battery 13 can be so low that the remote computing device 12 (and/or the vehicle management system 65) determines that the battery 13 will run out of power before a pick-up time previously selected by the user 1 (and/or determined by the vehicle management system 65). The remote computing device 12 can be configured to remind the user 1 about the pick-up time (prior to the pick-up time and before the remote computing device 12 runs out of battery 13 power.

For example, if the scheduled pick-up time is 5:00 and the remote computing device 12 estimates that its battery 13 will run out around 4:00, then the remote computing device 12 can remind the user 1 about the 5:00 pick-up time before the 4:00 battery 13 depletion time to increase the odds of the user 1 knowing about the pick-up time at 5:00. In some embodiments, the reminder occurs within 90 minutes of the battery 13 depletion time, within 60 minutes of the battery 13 depletion time, and/or within 60 minutes of the time at which the remote computing device 12 shuts itself off (due to the low battery 13 state).

Some embodiments comprise determining, by the remote computing device 12, that a third battery 13 charge indication is below a third predetermined threshold. (The third predetermined threshold is less than the first predetermined threshold.) Some embodiments comprise reminding, by the remote computing device 12, the user 1 regarding the pick-up time in response to determining that the third battery 13 charge indication is below the third predetermined threshold.

Some embodiments comprise estimating, by at least one of the remote computing device 12 and the vehicle management system 65, that a battery 13 power supply of the remote computing device 12 will be depleted before the pick-up time, and then in response to the estimating, reminding, by the remote computing device 12, the user 1 regarding the pick-up time prior to depleting the battery 13 power supply.

Figure 17:
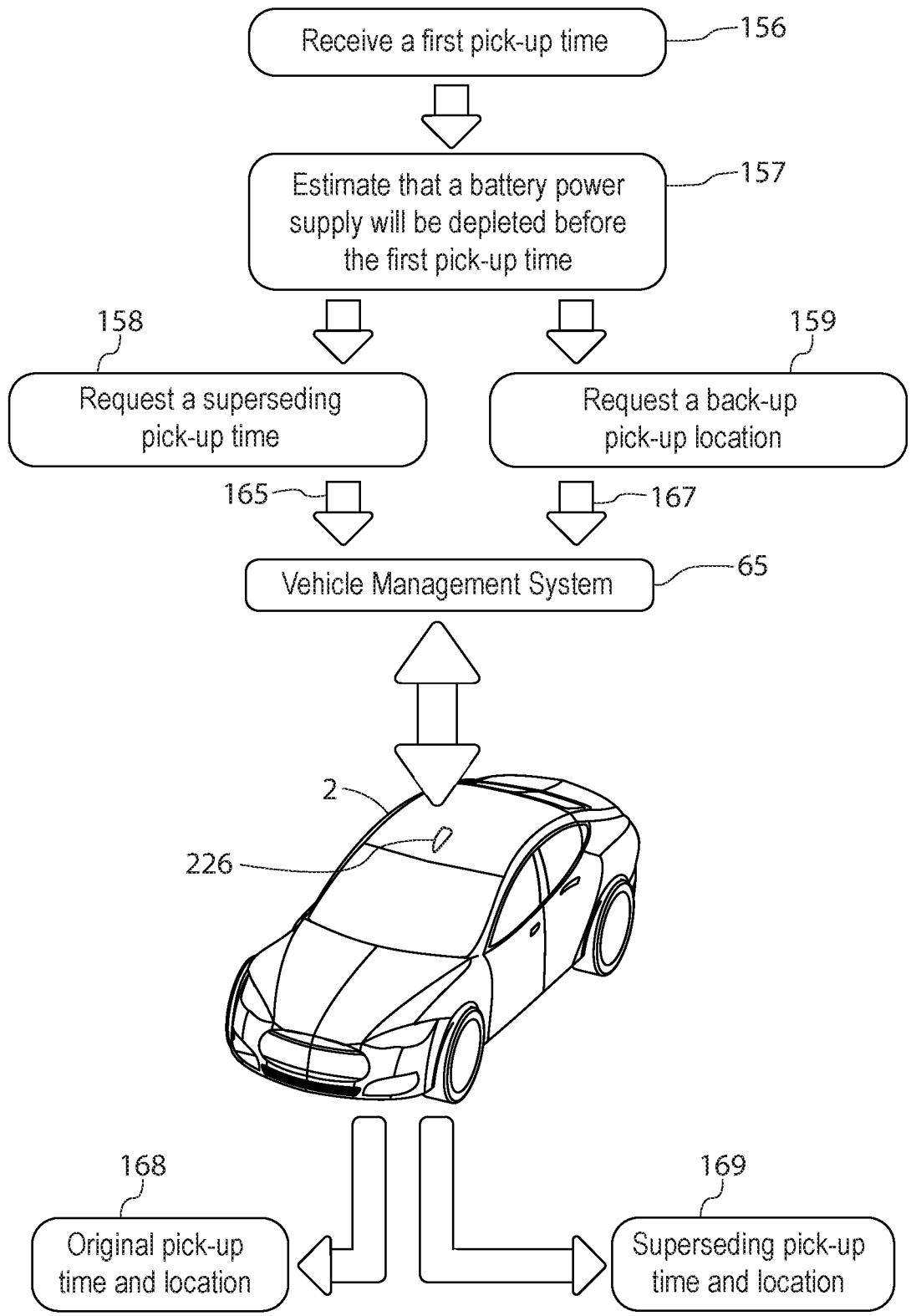

Referring now primarily to FIG. 17, in some embodiments the system (e.g., the remote computing device 12 and/or the vehicle management system 65) already knows a pick-up time and location selected by the user 1 and/or determined by the system. However, if the system determines that the pick-up time is beyond the expected battery 13 life of the remote computing device 12, then the remote computing device 12 can be configured to prompt the user 1 to select a new pick-up time and location configured to supersede or act as back-ups to the original pick-up time and location.

This safeguard can be quite helpful because the user 1's plans may have changed since the system received and/or determined the original pick-up time and location. This safeguard provides an opportunity for the user 1 to update the pick-up time and location before the battery 13 runs out of electrical power.

Some embodiments comprise receiving, by the remote computing device 12, a first pick-up time (e.g., see block 156). The remote computing device 12 can receive the pick-up time and/or location by the user 1 selecting the pick-up time and location via on app running on the remote computing device 12. For example, the user 1 can enter the pick-up time and location. The user 1 can also "click" icons on the screen of the remote computing device 12 to select the pick-up time and location.

The system can be configured to estimate, by at least one of the remote computing device 12 and the vehicle management system 65, that a battery 13 power supply of the remote computing device 12 will be depleted before the first pick-up time (e.g., see block 157). In some embodiments, the estimation is based on the system analyzing a charge level of the battery 13 and a current and/or predicted rate of battery 13 charge usage to calculate an anticipated battery 13 depletion time. Then, in response to the estimating, the system can be configured to prompt, by the remote computing device 12, the user 1 to select a second pick-up time configured to supersede the first pick-up time (e.g., see block 158).

Embodiments can comprise sending, by the remote computing device 12, the second pick-up time to the vehicle management system 65 (e.g., see arrow 165). Some embodiments comprise sending, by the remote computing device 12, the second pick-up time to the vehicle management system 65 such that the second pick-up time supersedes the first pick-up time.

Some embodiments comprise receiving, by the remote computing device 12, a first pick-up time; estimating, by the remote computing device 12, that a battery 13 power supply of the remote computing device 12 will be depleted before the first pick-up time; and then in response to the estimating, prompting, by the remote computing device 12, the user 1 to select a back-up pick-up location (e.g., see block 159).

In some cases, the back-up pick-up location is not used (e.g., instead of the original pick-up location) unless the battery 13 of the remote computing device 12 is so low that the remote computing device 12 cannot send (or is programmed to not send) wireless communications. In some cases, the back-up pick-up location is not used (e.g., instead of the original pick-up location) unless the battery 13 of the remote computing device 12 is so low that the remote computing device 12 turns itself off. The vehicle management system 65 may not be able to communicate with the remote computing device 12 for many reasons, including (but not limited to) the remote computing device 12 being configured to not send (or receive) wireless communications or the remote computing device 12 not having wireless service (e.g., due to being in an area without cellular coverage). In these cases, the system can be configured to use a back-up pick-up time and/or location.

The system can determine, based on many factors described herein and/or incorporated by reference, whether the vehicle should go to the original pick-up location perhaps at the original pick-up time (e.g., see block 168) or to the back-up pick-up location perhaps at the back-up pick-up time (e.g., see block 169).

Some embodiments comprise sending, by the remote computing device 12, the back-up pick-up location to the vehicle management system 65 such that the vehicle management system 65 is configured to send the self-driving vehicle 2 to the back-up pick-up location in response to the vehicle management system 65 being unable to communicate with the remote computing device 12 (e.g., see arrow 167).

The system can prioritize battery 13 life according to the needs of the user 1. Enabling the user 1 to communicate with the vehicle management system 65 can be such a high priority that the system can be configured to enter a low battery 13 mode to preserve the ability of the remote computing device 12 to send information (e.g., a pick-up time and location) to the vehicle management system 65 in the future. For example, without entering into the low battery 13 mode, the battery 13 can run out of power much sooner (and therefore leave the user 1 stranded without a way to summon a ride) than is the case with the low battery 13 mode. The system can be configured to exit the low battery 13 mode once the user 1 needs to send a pick-up time and/or location to the vehicle management system 65.

Entering the low battery 13 mode at unnecessary times can be bothersome to the user 1 (because the low battery 13 mode can interfere with some functions of the remote computing device 12), so the system can be configured to enter the low battery 13 mode in response to specific triggers intended to reduce the number of times the remote computing device 12 enters the low battery 13 mode unnecessarily.

Figure 18:
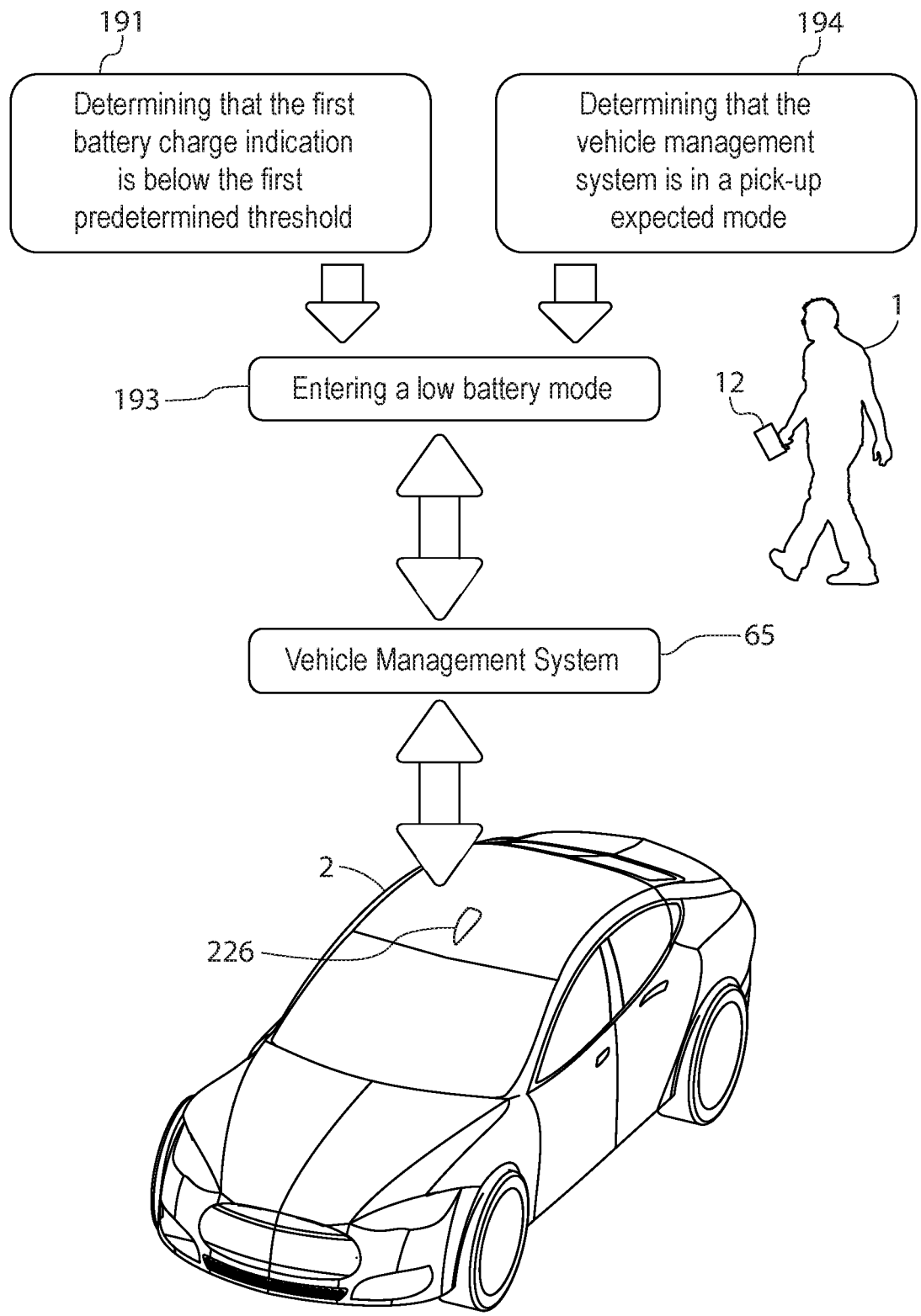

Referring now primarily to FIG. 18, some embodiments comprise determining, by the remote computing device 12, that the first battery 13 charge indication is below a first predetermined threshold (e.g., see block 191).

The remote computing device 12 can be configured to enter a low battery 13 mode in response to determining that the first battery 13 charge indication is below the first predetermined threshold (e.g., see block 193). The remote computing device 12 can be configured to enter a low battery 13 mode in response to determining that the vehicle management system 65 is in a pick-up expected mode (e.g., see block 194). Some embodiments comprise entering, by the remote computing device 12, a low battery 13 mode in response to determining that the first battery 13 charge indication is below the first predetermined threshold and also in response to determining, by the remote computing device 12, that the vehicle management system 65 is in a pick-up expected mode.

The low battery 13 mode is configured to reduce the power consumption of the remote computing device 12. In several embodiments, entering the low battery 13 mode comprises disabling a radio-frequency signal transmission system of the remote computing device 12. Disabling radio-frequency signal transmissions of the remote computing device 12 can include turning off some or all of the systems in the remote computing device 12 that are configured to enable telephone communications, radio communications, Bluetooth communications, WiFi communications, and/or other communications.

In several embodiments, entering the low battery 13 mode comprises disabling at least one feature of the remote computing device 12 to reduce power consumption of the remote computing device 12. Example features that can be affected, slowed, or disabled to reduce power consumption include downloads, email fetching, background "app" refreshing or updating, certain visual effects, screen brightness, screen sleep time, retrieving information from the remote computers such as the Cloud, virtual assistant systems such as "Siri" created by Apple Inc.

The pick-up expected mode is a mode in which the vehicle management system 65 expects that the user 1 will need to be picked up within 12 hours.

In several embodiments, the vehicle management system 65 is configured to be in the pick-up expected mode from a first time when the self-driving vehicle 2 drops off the user 1 until a second time when the self-driving vehicle 2 picks up the user 1.

In several embodiments, the vehicle management system 65 is configured to be in the pick-up expected mode from a first time when the vehicle management system 65 drops off the user 1 (e.g., with a first self-driving vehicle 2) until a second time when the vehicle management system 65 picks up the user 1 (e.g., with the first self-driving vehicle 2 or with a different self-driving vehicle 2).

In several embodiments, the pick-up expected mode comprises a mode in which at least one of the user 1 is located remotely relative to the self-driving vehicle 2 yet the self-driving vehicle 2 anticipates picking up the user 1, the vehicle management system 65 is waiting for an instruction from the remote computing device 12 to pick up the user 1, and a pick-up time selected by the user 1 is less than twelve hours away.

Some embodiments comprise receiving, by the remote computing device 12, a pick-up time; sending, by the remote computing device 12, the pick-up time to the vehicle management system 65; and exiting, by the remote computing device 12, the low battery 13 mode in response to receiving the pick-up time.

Some embodiments comprise receiving, by the remote computing device 12, a pick-up location; sending, by the remote computing device 12, the pick-up location to the vehicle management system 65; and exiting, by the remote computing device 12, the low battery 13 mode in response to receiving the pick-up location.

Some embodiments comprise receiving, by the remote computing device 12, at least one of a pick-up time and a pick-up location; sending, by the remote computing device 12, at least one of the pick-up time and the pick-up location to the vehicle management system 65; and exiting, by the remote computing device 12, the low battery 13 mode in response to sending at least one of the pick-up time and the pick-up location.

Some embodiments comprise shutting down the remote computing device 12 in response to determining, by the remote computing device 12, that a second battery 13 charge indication is below a second predetermined threshold and in response to determining, by the remote computing device 12, that the vehicle management system 65 is in the pick-up expected mode. The second predetermined threshold can be lower than the first predetermined threshold.

In some embodiments, the system transfers control of the self-driving vehicle 2 to another person 1b. The person 1b can be selected by the user 1. Transferring control of the self-driving vehicle 2 can enable the system to receive the instructions it needs to operate in the event that the system loses contact with the user 1. The second remote computing device 12b of the person 1b can be a back-up contact. For example, the remote computing device 12 and/or the vehicle management system 65 can transfer control of the self-driving vehicle 2 to the second remote computing device 12b.

At least one of the vehicle management system 65 and the remote computing device 12 can detect that a second remote computing device 12b is near the remote computing device 12 and can determine that the contact information of the second remote computing device 12b is in the contact list of the remote computing device 12. The remote computing device 12 and/or the vehicle management system 65 can then ask the user 1 (e.g., via an "app" running on the remote computing device 12) to select a back-up contact, which can include the contact of the person 1b.

Figure 19:
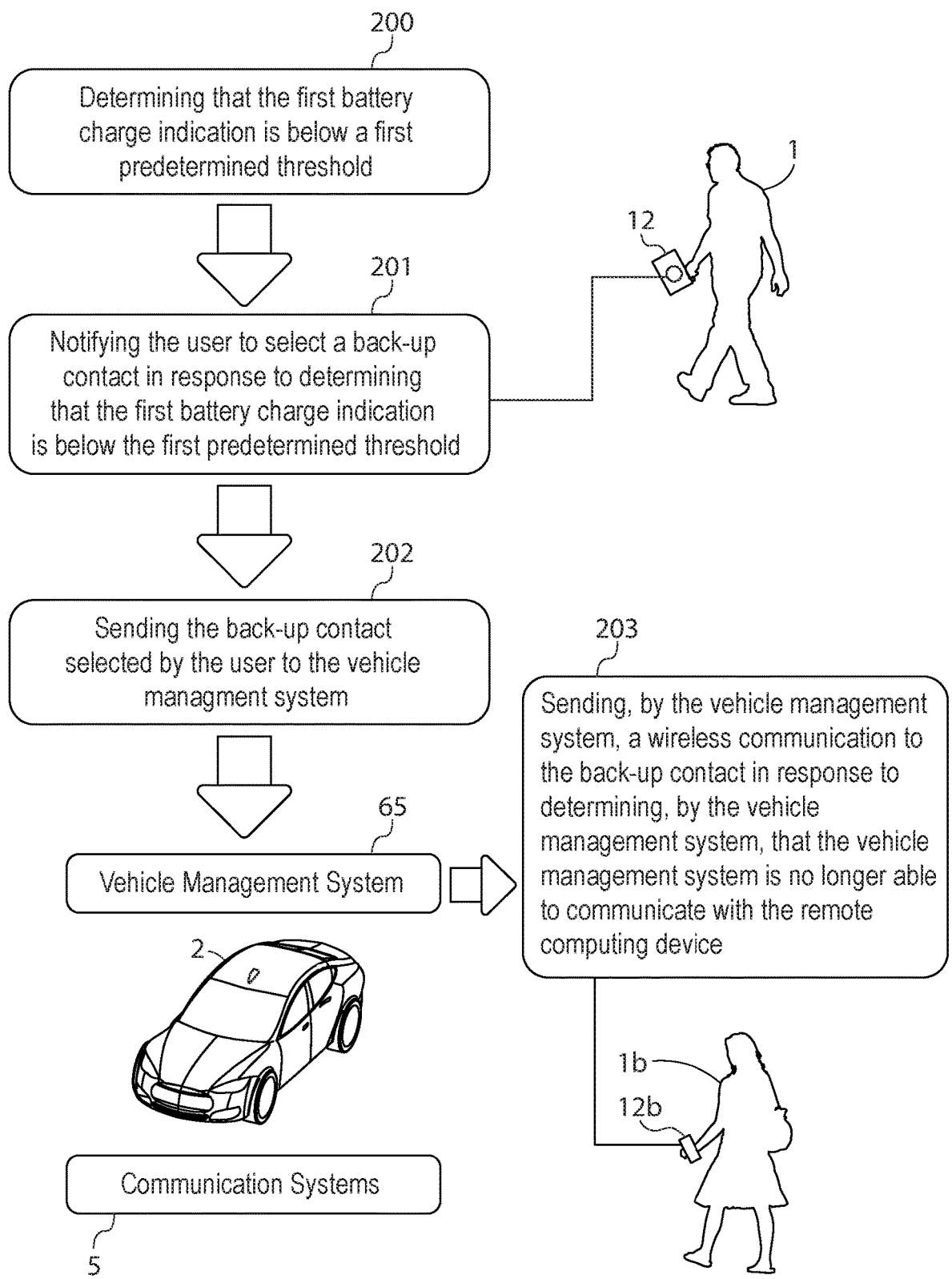

Referring now primarily to FIG. 19, some embodiments comprise determining, by the remote computing device 12, that the first battery 13 charge indication is below a first predetermined threshold (e.g., see block 200); and prompting, by the remote computing device 12, the user 1 to select a back-up contact in response to determining that the first battery 13 charge indication is below the first predetermined threshold (e.g., see block 201). Some embodiments comprise sending, by the remote computing device 12, the back-up contact selected by the user 1 to the vehicle management system 65 (e.g., see block 202).

Some embodiments comprise sending, by the vehicle management system 65, a wireless communication to the back-up contact in response to determining, by the vehicle management system 65, that the vehicle management system 65 is no longer able to communicate with the remote computing device 12 (e.g., see block 203). The wireless communication can comprise location information regarding the user 1. The wireless communication can comprise previous locations of the user 1 and/or a last known location of the user 1. The wireless communication can be configured to prompt the back-up contact to take action to aid the user 1. For example, the wireless communication can prompt the back-up contact to try to contact the user 1, find the user 1, determine when and where the user 1 might want to be picked up, etc. The wireless communication can prompt the back-up contact to select a pick-up time and pick-up location for the user 1. The wireless communication can prompt the back-up contact to select where the vehicle should go (e.g., the back-up contact can instruct the vehicle to move to a waiting location, a home base, and/or to the user 1's home).

Some embodiments comprise granting control, by at least one of the remote computing device 12 and the vehicle management system 65, of the self-driving vehicle 2 to the back-up contact in response to receiving, by the remote computing device 12, the back-up contact from the user 1. In several embodiments, granting control enables the back-up contact to choose a destination for the self-driving vehicle 2.

Figure 20:
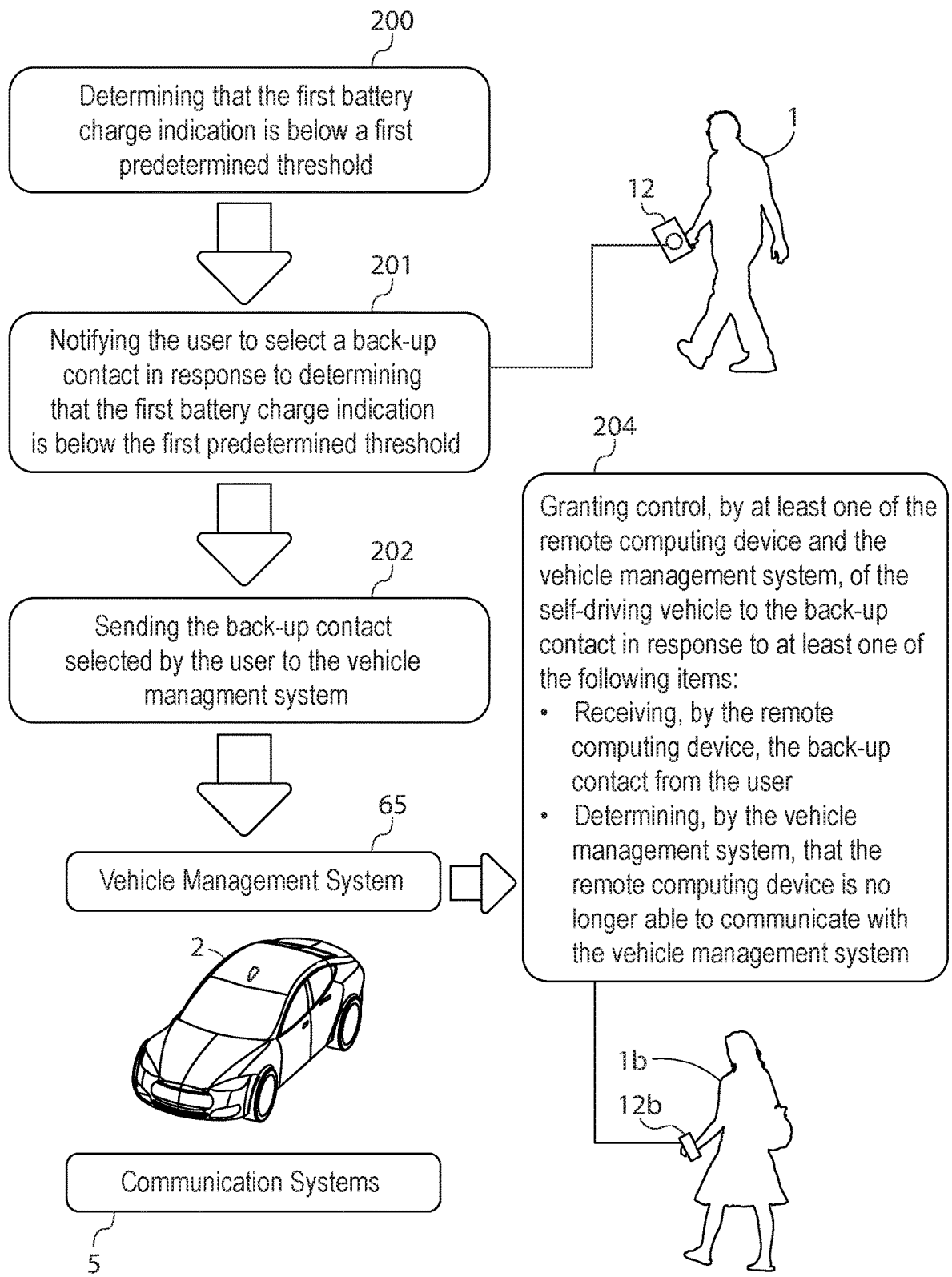

Referring now primarily to FIG. 20, some embodiments comprise granting control, by at least one of the remote computing device 12 and the vehicle management system 65, of the self-driving vehicle 2 to the back-up contact in response to receiving, by the remote computing device 12, the back-up contact from the user 1 and also in response to determining, by the vehicle management system 65, that the vehicle management system 65 is no longer able to communicate with the remote computing device 12 (e.g., see block 204).

Some embodiments comprise determining, by the remote computing device 12, that the first battery 13 charge indication is below a first predetermined threshold; determining, by the remote computing device 12, that a back-up contact is located within 50 yards of the user 1; and prompting, by the remote computing device 12, the user 1 to select the back-up contact to at least one of receive a notification regarding the self-driving vehicle 2 and control at least one movement of the self-driving vehicle 2. Prompting the user 1 can be in response to determining that the first battery 13 charge indication is below the first predetermined threshold.

In some embodiments, the remote computing device 12 can determine that a back-up contact is within 50 yards by receiving a Bluetooth communication from the second remote computing device 12b and/or by detecting a mobile hotspot of the second remote computing device 12b.

To reduce unnecessary redundancy, not every element or feature is described in the context of every embodiment, but all elements and features described in the context of any embodiment herein and/or incorporated by reference can be combined with any elements and/or features described in the context of any other embodiments.

The entire contents of the following application are incorporated by reference herein: U.S. patent application Ser. No. 16/205,013; filed Nov. 29, 2018; and entitled SELF-DRIVING VEHICLE SYSTEMS AND METHODS.

The vehicles 2, 2a, 2b described herein can include any of the features of the vehicles described in U.S. patent application Ser. No. 16/205,013.

The entire contents of the following application are incorporated by reference herein: U.S. patent application Ser. No. 15/099,565; filed Apr. 14, 2016; and entitled SELF-DRIVING VEHICLE SYSTEMS AND METHODS.

The vehicles 2, 2a, 2b described herein can include any of the features of the vehicles described in U.S. patent application Ser. No. 15/099,565.

Self-driving vehicles can include cars, vans, trucks, buses, scooters, motorcycles, helicopters, quadcopters, flying machines, air taxis, planes, and any motorized vehicle configured to transport a person.

In some embodiments, the vehicle 2 is configured to drive on a road. The vehicle management system can comprise a vehicle guidance system 117. The vehicle guidance system 117 can comprise radar 118, lidar 119, ultrasonic sensors, cameras 111, and any other sensing devices configured to enable the vehicle 2 to detect objects.

Some embodiments can be used with self-driving vehicles. Embodiments, however, are not limited to self-driving vehicles and can be used with non-self-driving vehicles.

As used herein, "location" is used broadly and is not limited to a street address. A location can be a Global Positioning System ("GPS") location and can be any other location indicator. A location can be an outdoor location. A location can be an indoor location (e.g., a location inside a large shopping center, an apartment complex or other building).

Some embodiments use iBeacon hardware to enable tracking remote computing devices indoors. iBeacon is a protocol developed by Apple Inc. Several embodiments use radio transceivers (such as Bluetooth transceivers) to enable tracking remote computing devices indoors.

Some embodiments use Global Positioning System ("GPS") hardware to determine an outdoor location of a remote computing device and/or of a vehicle. GPS can include the system of satellites put into orbit and maintained by the U.S. Department of Defense, Russia's GLONASS satellite system, assisted GPS systems, and/or any satellite system used to provide location data.

In some embodiments, each system comprises at least one processor and a memory comprising program instructions that when executed by the at least one processor cause the system to perform any of the steps described herein and/or incorporated by reference.

A self-driving vehicle 2 can include a vehicle guidance system 117 configured to detect objects (e.g., cars, pedestrians, other vehicles, buildings, fire hydrants, trees, lane markers, guard rails, roadway barriers, sidewalks, roadway signs, traffic lights) located around the self-driving vehicle 2. Various sensors of the vehicle guidance system 117 can sense objects even closer than an inch away (e.g., by using ultrasonic sensors) and even farther away than 100 yards (e.g., using long-range radar).

Figure 21:
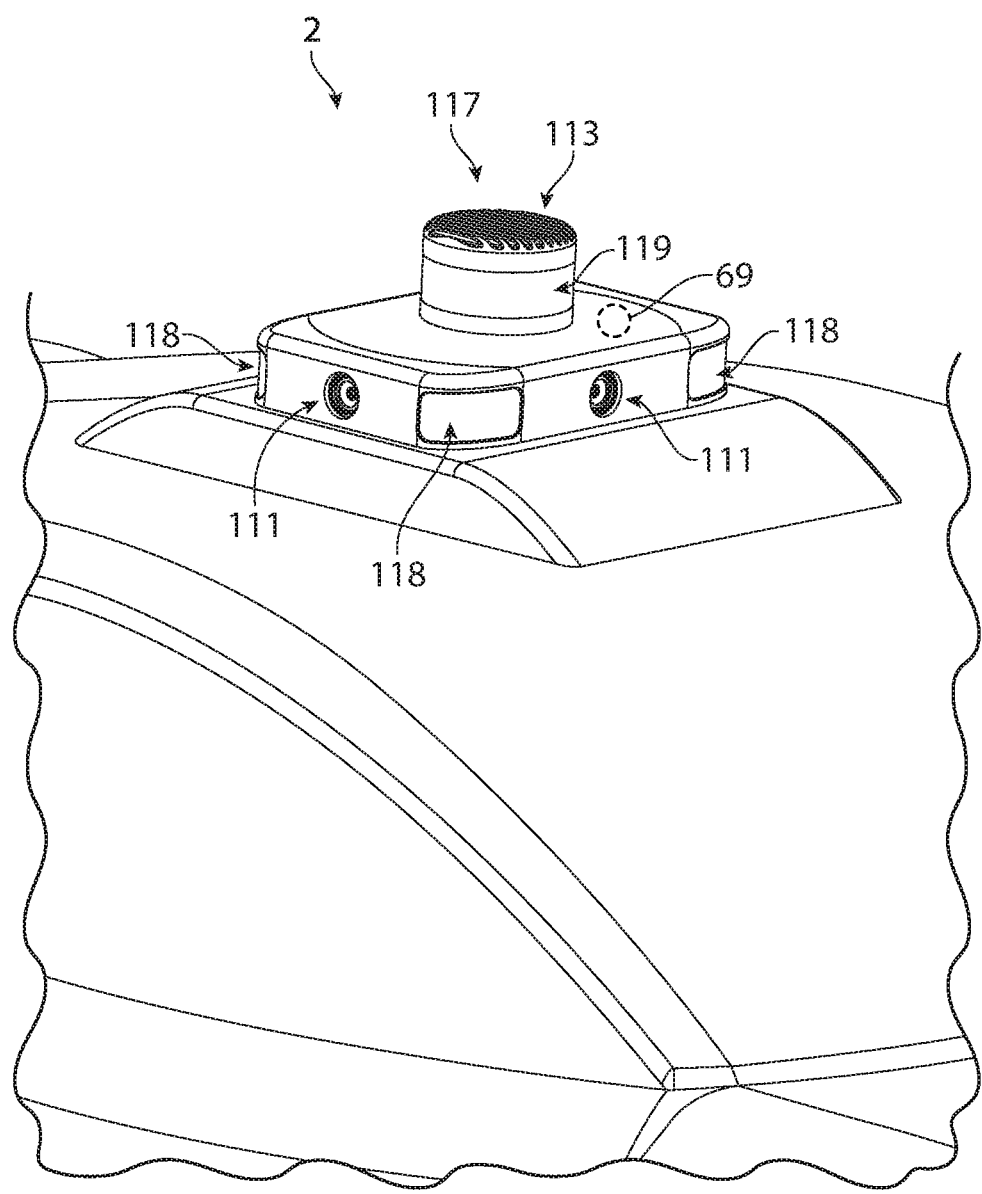
FIG. 21 illustrates a perspective view of a top side, a front side and a passenger side of a vehicle guidance system coupled to a vehicle, according to some embodiments.
Figure 22:
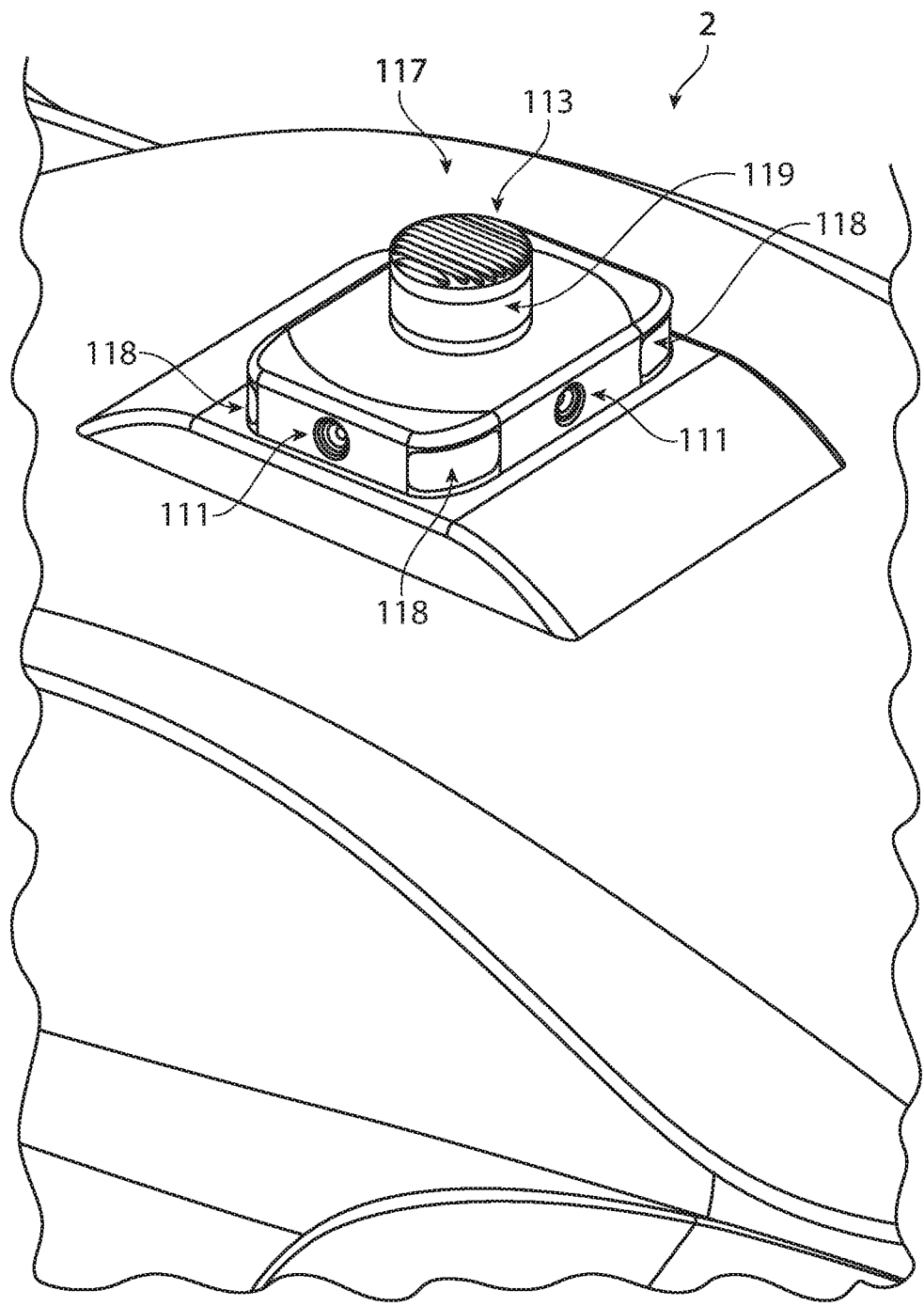
FIG. 22 illustrates a perspective view of the top side, a backside side and a driver side of the vehicle guidance system coupled to the vehicle, according to some embodiments.

FIG. 21 illustrates a perspective view of the top side, the front side and the passenger side of the vehicle guidance system 117 coupled to the vehicle 2. FIG. 22 illustrates a perspective view of the top side, the backside side and the driver side of the vehicle guidance system 117 coupled to the vehicle 2.

The vehicle guidance system 117 can comprise radar 118, lidar 119, ultrasonic sensors, cameras 111, and any other sensing devices configured to enable the vehicle 2 to detect objects.

The self-driving vehicle 2 can comprise a vehicle guidance system 117 mounted to the roof of the self-driving vehicle 2. In some embodiments, however, the components of the vehicle guidance system 117 are mounted on different areas of the self-driving vehicle 2. For example, the ultrasonic sensors can be mounted on the bumpers of the self-driving vehicle 2. The short range of the ultrasonic sensors can make bumper mounting helpful (because the bumper is often closer to the objects being sensed). The cameras 111 can be mounted just behind the windshield (e.g., in the rearview mirror) and just behind other windows. The radars 118 can be mounted near each of the four corners of the self-driving vehicle 2. In the illustrated embodiment, however, the vehicle guidance system 117 can be contained in one assembly to simplify the integration of the vehicle guidance system 117 into a vehicle.

The vehicle guidance system 117 can use cameras 111 mounted around a perimeter (e.g., around a perimeter of the vehicle 2 or around a perimeter of a housing of the vehicle guidance system 117). As illustrated in FIGS. 21 and 22, cameras 111 face forward, backward, left, and right to provide (collectively) a 360 degree view around the vehicle 2. The cameras 111 can be high-resolution cameras covered by a glass window to protect each cameras 111 from water and dirt.

Cameras 111 can be configured to see lane markers on a road. Using cameras 111 to see painted lane markers can be helpful (because painted lane markers sometimes lack enough three-dimensional nature to be detected by some other sensors). In addition, cameras 111 can see color differences (e.g., the difference between the color of the asphalt and the color of yellow or white paint of a lane marker). Cameras 111 can see the color of traffic lights (e.g., red, yellow, green).

Cameras 111 sometimes have trouble seeing in situations where the human eye would have trouble seeing (e.g., in fog or rain).

Radars 118 can be very helpful in fog and rain. An object that is not detected by cameras 111 (e.g., due to fog or rain) can be detected by radar 118. Radars 118 can detect the speed of other vehicles and the distance to other vehicles. Radars 118 can also detect objects that are far away.

Radar is an object-detection system that uses radio waves to determine the range, angle, or velocity of objects. A radar can comprise a transmitter producing electromagnetic waves in the radio or microwave domain, a transmitting antenna, a receiving antenna (which can be the same antenna as the transmitting antenna), a receiver, and/or a processor to determine properties of the objects detected by the radar.

Lidar uses light to detect objects. A lidar 119 can be located on the top portion of the vehicle guidance system 117 to provide a 360 degree view of the area around the self-driving vehicle 2. The lidar 119 can tell the difference between an actual person and a billboard that includes a picture of a person (due to the three-dimensional nature of the actual person and the two dimensional nature of the picture of a person).

The lidar 119 can accurately sense the three-dimensional nature of the world around the self-driving vehicle 2. The lidar 119 can also measure the distance to objects. Measuring distance can enable the self-driving vehicle 2 to know, for example, if an approaching car is 5 meters away (so there is not enough time to turn in front of the car) or 25 meters away (so there may be enough time to turn in front of the car).

In some embodiments, the lidar 119 is a Velodyne VLS-128 made by Velodyne LiDAR, Inc. having an office in San Jose, Calif. The Velodyne VLS-128 can provide real-time, three-dimensional data with up to 0.1 degree vertical and horizontal resolution, a range of up to 300 meters, and a 360-degree surround view. The VLS-128 can provide the range, resolution and accuracy required by some of the most advanced autonomous vehicle programs in the world.

Many types of lidars can be used. Some embodiments use "incoherent" or direct energy detection (which principally measures amplitude changes of the reflected light). Some embodiments use coherent detection (which in some cases can be well suited for measuring Doppler shifts, or changes in phase of the reflected light). Coherent systems can use optical heterodyne detection.

Lidar can use pulse models. Some lidar embodiments use micropulse or high energy. Micropulse systems can use intermittent bursts of energy. Some lidar embodiments use high-power systems.

Lidar can comprise lasers. Some embodiments include solid-state lasers. Some embodiments include flash lidar. Some embodiments include electromechanical lidar. Some embodiments include phased arrays to illuminate any direction by using a microscopic array of individual antennas. Some embodiments include mirrors (e.g., micro electromechanical mirrors). Some embodiments include dual oscillating plane mirrors, a polygon mirror and/or a scanner (e.g., a dual-axis scanner).

Lidar embodiments can include photodetector and receiver electronics. Any suitable type of photodetector can be used. Some embodiments include solid-state photodetectors (e.g., silicon avalanche photodiodes) and/or photomultipliers.

The motion of the vehicle 2 can be compensated for to accurately determine the location, speed, and direction of objects (such as other vehicles) located outside the vehicle 2. For example, if a first vehicle 2 is heading west at 35 miles per hour and a second vehicle is heading east at an unknown speed, a vehicle guidance system 117 of the first vehicle 2 can remove the contribution of the 35 miles per hour when determining the speed of the second vehicle.

In some embodiments, motion of the vehicle 2 is compensated for by using position and navigation systems to determine the absolute position, speed, and orientation of the lidar, camera, radar, or other object sensing system. A Global Positioning System ("GPS") receiver and/or an Inertial Measurement Unit ("IMU") can be used to determine the absolute position and orientation of the object sensing system.

Lidar can use active sensors that supply their own illumination source. The energy can hit objects. The reflected energy can be detected and measured by sensors. Distance to the object can be determined by recording the time between transmitted and backscattered pulses and by using the speed of light to calculate the distance traveled. Scanning can be used to create a three-dimensional image or map of the area around the vehicle 2.

Embodiments can use a short-range lidar to give the self-driving vehicle 2 a surround view near the self-driving vehicle 2 (to see objects close to the self-driving vehicle 2) and can use a long-range lidar configured to not only detect objects located far from the self-driving vehicle 2, but also to enable zooming into objects that are over 200 meters away. The long-range lidar can be very helpful at high-speed highway situations.

Lidar uses light to detect a distance to an object, a direction to the object, and/or a location of an object. Lidar can use pulsed laser light emitted by a laser.

The light can reflect off objects around the vehicle 2. These reflections can be detected by a sensor of the lidar. Measuring how long the light takes to return to the sensor and measuring the wavelengths of the reflected light can enable making a three-dimensional model of the object being sensed and of the entire area around the vehicle 2.

The self-driving vehicle 2 can include a vehicle navigation system, a communication system that has a transmitter and a receiver, a computer system that has a processor, a memory that has program instructions and map information, a traffic monitor, and a drive-by-wire system. In some embodiments, at least some of these items are part of the vehicle guidance system 117.

A vehicle navigation system can be configured to enable the vehicle 2 to follow a driving route. The vehicle navigation system can direct the vehicle toward a pick-up location, a drop-off location, and/or another location.

A communication system can be configured to communicate with a vehicle management system. The communication system can be configured to communicate with a remote computing device of a rider. The communication system can use an antenna to communicate with other vehicles and other devices via intermediary communication systems.

Intermediary communication systems can comprise wireless networks, Wi-Fi routers, Bluetooth systems, cellular networks, telephone networks, Internet systems, servers, cloud computing, remotely located computers, satellite systems, communication systems, and any other suitable means of enabling communication between the various components of embodiments described herein and/or incorporated by reference.

A vehicle management system can be communicatively coupled with a remote computing device of a rider via intermediary communication systems. Intermediary communication systems can enable communicative coupling over large distances.

In some embodiments, intermediary communication systems enable a vehicle management system to be communicatively coupled with a remote computing device of a rider even though the rider has already been dropped off, and the rider is located miles away from the vehicle that dropped off the rider. A vehicle can drop the rider off in front of a store, the rider can walk through the store while the vehicle provides rides to other people, and then the vehicle can return to the front of the store to pick up the rider.

As used herein, a person can be a "rider" even when the person is not located in the vehicle. A person can be a rider when the person is walking under her own power (and is not being transported by anything other than her own legs). As used herein, "rider" can be a title for a person who is being transported by a vehicle, was transported by the vehicle, was dropped off by a vehicle, and/or will be picked up by a vehicle. In some embodiments, a rider is dropped off by a first vehicle and then the rider gets a ride from a second vehicle. In some embodiments, a rider is dropped off by a first vehicle and then the rider uses a bicycle or skateboard to follow a walking route.

The vehicle 2 can comprise a drive-by-wire system. The drive-by-wire system can be a computer-regulated system for controlling the engine, accelerating, braking, steering, signaling, handling, suspension, and/or other functions related to autonomously driving the vehicle 2.

Receiving radio communications (with position data) from three or more GPS satellites can provide data to enable each vehicle and each remote computing device to calculate its own position.

Each device can receive radio signals broadcasted from GPS satellites. Then, the device can calculate how far it is away from the broadcasting satellite by determining how long the radio signal (traveling at lightspeed) took to arrive at the device. Trilateration (based on data from at least three GPS satellites) enables the device to know where it is located. The device can then send its location to the vehicle management system. A location tracking system can receive the location data from the vehicle management system, from the device, and/or from any other system.

Communicative coupling may be via continuous communications or intermittent communications. Intermittent communications can be via periodic communications (e.g., every 1 second, every 60 seconds, every 10 minutes). As used herein, "periodically" does not imply that every period has the same duration. In some embodiments, the communicative coupling is via intermediary communication systems 15.

A remote computing device can be a smartphone, a tablet computer, a laptop computer, a desktop computer, a server, augmented reality glasses, an implanted computer, and/or any type of computer. A rider can bring her remote computing device into the self-driving vehicle, use her remote computing device in the self-driving vehicle, and leave the self-driving vehicle with her remote computing device. In some embodiments, the rider requests a ride at her home with a remote computing device, but then leaves the remote computing device at home when she goes to get a ride from the self-driving vehicle.

In some embodiments, a remote computing device comprises an accelerometer, a barometer (which can include an altimeter), a gyroscope, a WiFi tracker, a compass, a location tracking system, a memory, a computer system having a processor, a database and/or a communication system. The communication system can include a transmitter, a receiver, and/or an antenna. The remote computing device can comprise a display screen configured to display images to a rider. The remote computing device can comprise a speaker configured to emit sounds to the rider. The remote computing device can comprise a microphone configured to record sounds from the rider.

Figure 23:
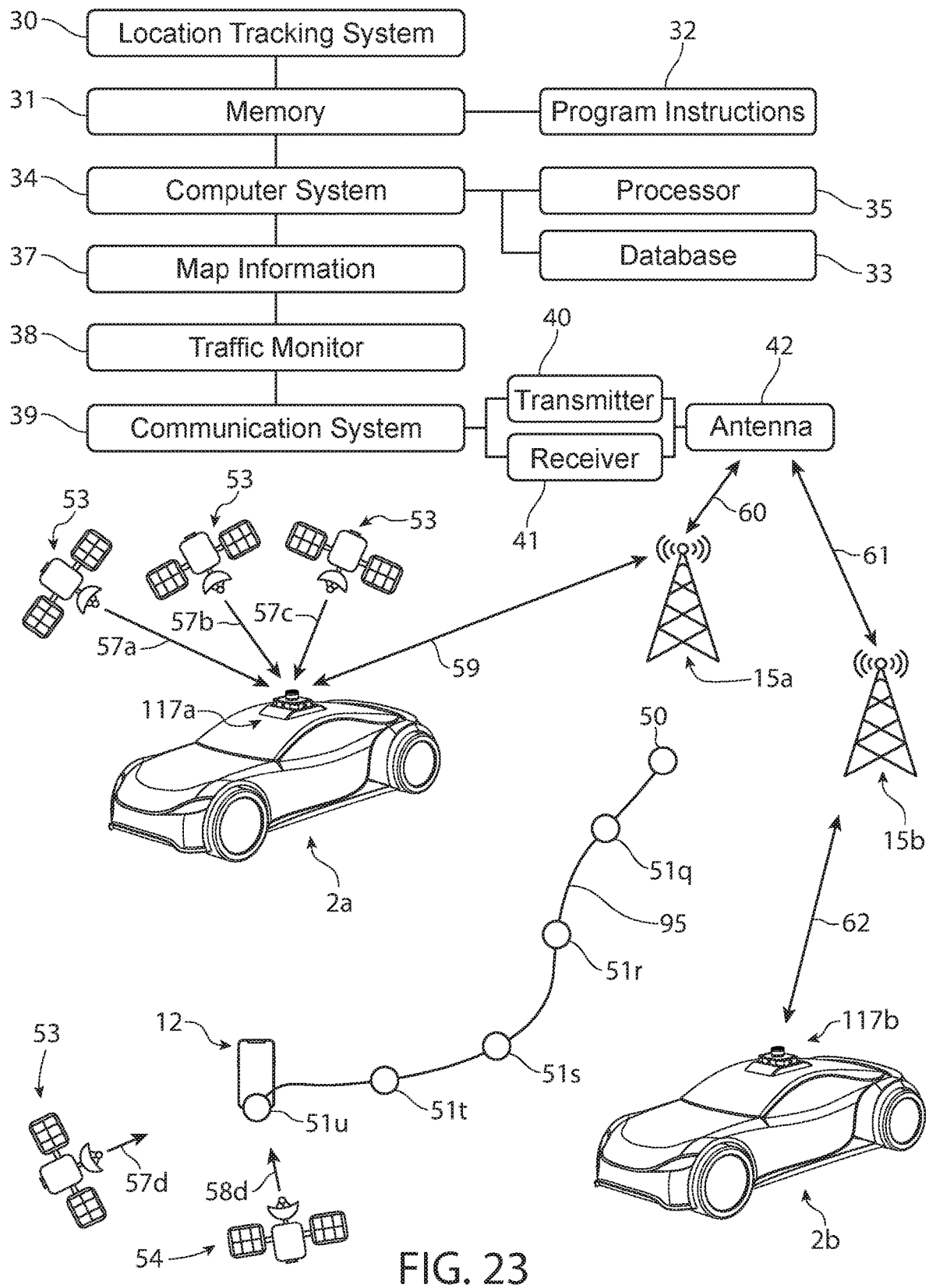
FIG. 23 illustrates a diagrammatic view of a first time after a rider was dropped off at a drop-off location, according to some embodiments.

Referring now primarily to FIG. 23, a person (i.e., a rider) can enter (and/or ride on) a first self-driving vehicle 2a or a second self-driving vehicle 2b. Whichever vehicle the rider enters can transport the rider to a drop-off location 50. At the drop-off location, the rider can exit the vehicle that transported the rider. Then, the rider can follow a walking route 95. As the rider moves along the walking route 95 (while carrying the remote computing device 12), the vehicle management system can receive location data regarding one or more locations 51q, 51r, 51s, 51t, 51u along the walking route 95. (In order for the walking route 95 to fit on FIGS. 23 and 24, the walking route 95 is not drawn to scale in FIGS. 23 and 24, and may be any length. In some embodiments, the walking route 95 is several miles.)

If the remote computing device 12 stops working (e.g., has a dead battery and/or is broken), the vehicle management system may stop receiving location data indicative of where the remote computing device 12 and thus the rider carrying the remote computing device 12 are located.

Location 51u is the last known location of the remote computing device 12. (The location 51u can be ascertained via GPS data and can be sent to the vehicle management system via intermediary communication systems). After arriving at the location 51u, the rider could have continued walking to an unknown location (as illustrated by the remote computing device 12 in FIG. 24). As a result, the vehicle management system does not know where to pick up the rider and the rider is unable to use the remote computing device 12 to request a ride home (e.g., via an "app" running on the rider's remote computing device 12). Thus, the rider could be stranded without a ride home.

In some embodiments, in response to being notified that the remote computing device 12 is not wirelessly communicating, the vehicle management system may instruct the first self-driving vehicle 2a and/or the second self-driving vehicle 2b to drive to the drop-off location 50 to attempt to pick up the rider.

In some embodiments, an administrative service such as Apple Inc., T-Mobile USA Inc., and AT&T Inc. notifies the vehicle management system that the remote computing device 12 is not communicating, is communicatively uncoupled, is turned off, has a dead battery, is non-responsive, etc., which enables the vehicle management system to enter an emergency rendezvous mode in which the vehicle management system is configured to predict an appropriate pick-up location for the rider.

The administrative service can be a telecommunications service provider. The administrative service can be an Internet Service Provider ("ISP"). An Internet Service Provider provides services for accessing the Internet.

Some embodiments comprise receiving, by the vehicle management system (e.g., from an administrative service), a notification that the remote computing device is not currently able to send communications and/or is not currently able to receive communications. Some embodiments comprise prompting, by the vehicle management system, the first self-driving vehicle to drive to a first area within a predetermined distance of the drop-off location to pick up the rider in response to receiving the notification.

In some embodiments, the vehicle management system determines that the remote computing device is no longer communicatively coupled to the vehicle management system in response to the vehicle management system receiving (e.g., from an administrative service) a notification that the remote computing device is not currently able to send communications and/or not currently able to receive communications.

Even though the drop-off location 50 is located far away from the last known location 51u, the vehicle management system may attempt to pick up the rider at the drop-off location 50 because the drop-off location 50 may be known to both the rider and the vehicle management system. Thus, the drop-off location 50 can be an emergency rendezvous location in the event that the vehicle management system is unable to detect a location of the remote computing device 12 and/or the rider is unable to use her remote computing device 12 to notify the vehicle management system where to pick her up.

Using the drop-off location 50 as an emergency rendezvous location is helpful in some cases. In some cases, however, determining a pick-up time is necessary. Otherwise, the vehicle management system may prompt a first self-driving vehicle 2a to wait at the drop-off location 50 for hours without the rider ever arriving. Some embodiments use a previously scheduled pick-up time for the emergency rendezvous location (e.g., the drop-off location 50) even though the previously scheduled pick-up time was originally intended for a different location.

Some embodiments use more complex methods to determine a pick-up time for the emergency rendezvous location (e.g., the drop-off location 50). Some of these embodiments are explained in the context of other embodiments.

A self-driving vehicle fleet can comprise one vehicle, two vehicles, several vehicles, one-hundred vehicles, thousands of vehicles, and/or any number of vehicles.

Figure 24:
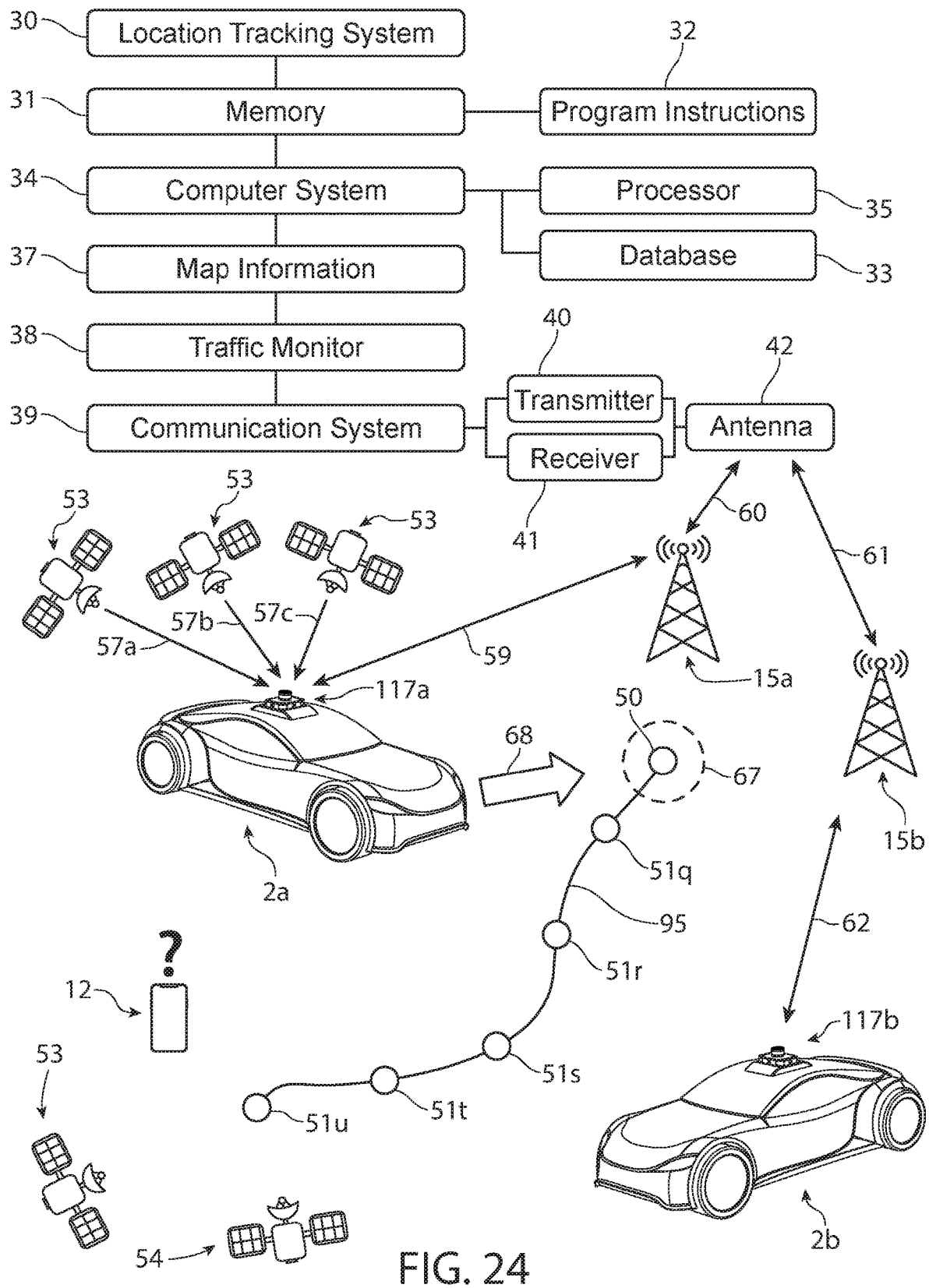
FIG. 24 illustrates a diagrammatic view of a second time after the rider was dropped off at the drop-off location, according to some embodiments.

FIG. 24 illustrates that the remote computing device 12 is in an unknown location (e.g., because the remote computing device 12 is not communicatively coupled with a location tracking system 30).

In response to the remote computing device 12 being communicatively uncoupled from the vehicle management system, the vehicle management system can prompt a self-driving vehicle 5a to drive to the drop-off location 50 to pick up the rider (as indicated by arrow 68) rather than drive toward the remote computing device 12 of the rider and rather than drive to a last known location 51u of the rider.

The first self-driving vehicle 2a and the second self-driving vehicle 2b can include any of the features described herein and/or incorporated by reference in the context of vehicles 2, 5, 5a, 5b, 5c and/or described herein and/or incorporated by reference in the context of other vehicles.

The first self-driving vehicle 2a can comprise a vehicle guidance system 117a. The vehicle guidance system 117a can comprise radar 118, lidar 119, ultrasonic sensors, cameras 111, and any other sensing devices configured to enable the vehicle 2a to detect objects and locations. The vehicle guidance system 117a can include any of the features described herein and/or incorporated by reference in the context of vehicle guidance system 117 and other vehicle guidance systems, detection system 7 (described in U.S. patent application Ser. No. 16/205,013), radar systems, lidar systems, camera systems, detection systems, and sensing devices.

The second self-driving vehicle 2b can comprise a vehicle guidance system 117b, which can include any of the features of vehicle guidance system 117a.

FIG. 23 is a diagrammatic view illustrating a time after the rider was dropped off at the drop-off location 50. The rider walked along a route 95 from the drop-off location 50 to a last known location 51u. Location data can comprise one or more locations 51q, 51r, 51s, 51t, 51u along the walking route 95. The locations 51q, 51r, 51s, 51t, 51u can be calculated by the remote computing device 12 based on communications 57d, 58d received (by the remote computing device 12) from positioning systems 53, 54. Some positioning systems 53 include GPS satellites. Some positioning systems 54 include indoor positioning systems.

In some cases, the first self-driving vehicle 2a transports the rider to the drop-off location 50 and the second self-driving vehicle 2b picks up the rider. A self-driving vehicle fleet can comprise one vehicle, two vehicles, three vehicles or more vehicles. In some embodiments, a self-driving vehicle fleet comprises hundreds or even thousands of vehicles. The vehicles can coordinate to provide efficient transportation to the rider (and/or to many riders).

The first self-driving vehicle 2a can receive communications (e.g., radio signals) from positioning systems 53 (which in some embodiments are GPS satellites). The second self-driving vehicle 2b can receive communications (e.g., radio signals) from positioning systems 53 (which in some embodiments are GPS satellites).

Positioning systems 53 (e.g., GPS satellites) can send communications 57a, 57b, 57c (e.g., radio signals) to the first self-driving vehicle 2a. The first self-driving vehicle 2a can use these communications 57a, 57b, 57c to determine positions of the first self-driving vehicle 2a at various times (e.g., when the first self-driving vehicle 2a drops off the rider at the drop-off location 50).

The first self-driving vehicle 2a can send communications 59 (which can include GPS coordinates of the first self-driving vehicle 2a) to an antenna 42 via intermediary communication systems 15a. Intermediary communication systems 15a can send communications 60 (which can include GPS coordinates of the first self-driving vehicle 2a) to the antenna 42. (Intermediary communication systems 15a, 15b can include all of the features and systems described in the context of intermediary communication systems 15.)

Receiving radio communications (with position data) from three or more GPS satellites can provide data to enable each vehicle 2a, 2b and each remote computing device 12 to calculate its own position. Then each vehicle 2a, 2b and each remote computing device 12 can send its position data to a vehicle management system (e.g., via intermediary communication systems 15a, 15b).

The location tracking system 30 can receive GPS location data of the vehicles 2a, 2b by the vehicles 2a, 2b sending their GPS location data to the location tracking system 30 via intermediary communication systems 15a, 15b.

The vehicles 2a, 2b can received radio communicates from GPS satellites. These radio communications can include information configured to enable the vehicles 2a, 2b to calculate their position at any time (including when the vehicle 2a drops off the rider such that the vehicle 2a knows the drop-off location 50 and can send the drop-off location 50 to the vehicle management system via the antenna 42).

Each device can receive radio signals broadcasted from GPS satellites. Then, the device can calculate how far it is away from the broadcasting satellite by determining how long the radio signal (traveling at lightspeed) took to arrive at the device. Trilateration (based on data from at least three GPS satellites) enables the device to know where it is located. The device can then send its location to the vehicle management system. A location tracking system 30 can receive the location data from the vehicle management system, from the device, and/or from any other system.

The location tracking system 30 can comprise a computer configured to receive locations of vehicles and remote computing devices. The location tracking system 30 can comprise a processor 35 and a memory 31 comprising program instructions 32 configured such that (when executed by the processor 35) the program instructions 32 cause the location tracking system 30 to monitor locations of vehicles 2a, 2b and remote computing devices 12.

In some cases, a rider uses a remote computing device 12 to request a ride from the vehicle management system. Then, the vehicle management system prompts a self-driving vehicle (e.g., a first self-driving vehicle 5a or a second self-driving vehicle 2b) to drive to a pick-up location selected by the rider (e.g., via an "app" on the remote computing device 12). The pick-up location can be located far away from the drop-off location 50.

Some embodiments predict whether the rider needs a ride, predict when the rider needs a ride and/or predict where the rider needs a ride using location data. Thus, some embodiments described herein and/or incorporated by reference dramatically increase the convenience of using a self-driving vehicle fleet for transportation.

The first self-driving vehicle 2a can send communications 59 (which can include GPS coordinates of the first self-driving vehicle 2a) to an antenna 42 via intermediary communication systems 15a. Intermediary communication systems 15a can send communications 60 (which can include GPS coordinates of the first self-driving vehicle 2a) to the antenna 42. The communications 59 can comprise GPS coordinates of the drop-off location 50.

The second self-driving vehicle 2b can send communications 62 (which can include GPS coordinates of the second self-driving vehicle 2b) to an antenna 42 via intermediary communication systems 15b. Intermediary communication systems 15b can send communications 61 (which can include GPS coordinates of the second self-driving vehicle 2b) to the antenna 42.

In some embodiments, a vehicle management system comprises a self-driving vehicle fleet having at least one of a first self-driving vehicle 2a and a second self-driving vehicle 2b. The self-driving vehicle fleet can be configured to transport a rider.

In some embodiments, a vehicle management system comprises map information 37, a traffic monitor 38, a database 33 (which can include a rider profile, rider preferences, location information, preferred pick-up location data, preferred drop-off location data, etc.), and a communication system 39 (which can comprise a transmitter 40, a receiver 41, and an antenna 42).

In some embodiments, a vehicle management system comprises a computer system 34 having at least one computer. The computer system 34 can be configured to be communicatively coupled (e.g., one-time, intermittently, continuously) with a remote computing device 12 of the rider. The computer system 34 can be configured to be communicatively coupled (e.g., one-time, intermittently, continuously) with at least one of the first self-driving vehicle 2a and the second self-driving vehicle 2b.

In some embodiments, a vehicle management system comprises a location tracking system 30 communicatively coupled (e.g., one-time, intermittently, continuously) with the computer system 34 and configured to receive a first location data indicative of a drop-off location 50 where the self-driving vehicle fleet dropped off the rider.

The first location data can include many different types of location data. Location data can include a GPS location, a street address, a location described by any type of positioning system, and/or any other data that is configured to indicate a location. In some embodiments, a GPS location is indicated by two numbers such as 47.606286, −122.341911. Location data can comprise other types of location indicators.

Some embodiments use Assisted GPS, which is a type of GPS. Assisted GPS can draw information from local cell towers and can enhance the performance of standard GPS.

Indoor positioning systems can enable the remote computing device 12 (and/or the vehicle management system) to determine a location of the remote computing device 12 inside a building (e.g., using radio waves, lights, magnetic fields, acoustic signals, or other sensory information sent from the indoor positioning systems). Determining a distance from the remote computing device 12 to anchor nodes (e.g., nodes with known positions) can enable the system to determine a precise location of the remote computing device 12. The method can use the same principles as are used in GPS location determinations (e.g., trilateration). Nodes can be WiFi access points, LiFi access points, Bluetooth beacons, and any other nodes configured to enable a remote computing device 12 to calculate the position of the remote computing device 12.

Some indoor positioning systems use iBeacon. iBeacon was developed by Apple Inc. iBeacon can use Bluetooth Low Energy (BLE) devices that broadcast their identifier (and other information) to nearby remote computing devices 12.

Some positioning systems use telecommunication systems to determine a position of a remote computing device 12 and/or to determine a location of a self-driving vehicle 2a, 2b. In some embodiments, positioning systems using telecommunication systems use Long-Term Evolution ("LTE") protocols. LTE is one of several standards for high-speed wireless communication for mobile devices and data terminals. LTE can be based on GSM/EDGE and UMTS/HSPA technologies.

Some positioning systems that use telecommunication systems are based on the LTE Positioning Protocol ("LPP"). Some positioning systems that use telecommunication systems are based on the LTE Positioning Protocol Annex ("LPPa").

Some embodiments use Observed Time Difference Of Arrival ("OTDOA"). OTDOA is a positioning feature. OTDOA was introduced in rel9 E-UTRA (LTE radio). In OTDOA, the remote computing device 12 measures the time difference between signals from several E-UTRAN Node Bs. Then, the remote computing device 12 reports these time differences to a specific device in the network (e.g., the Evolved Serving Mobile Location Center, which can be abbreviated as "ESMLC"). Based on these time differences and knowledge of the E-UTRAN Node B locations, the device (e.g., the ESMLC) can calculate the position of the remote computing device 12.

WiFi trackers 77 can analyze WiFi signals (e.g., from several WiFi emitters) to determine if a remote computing device 12 is moving. As the remote computing device 12 moves toward a first WiFi source, the signal will get stronger. As the remote computing device 12 moves away from a second WiFi source, the signal will get weaker. This signal analysis can enable the WiFi tracker 77 to determine if the remote computing device 12 is moving.

In some embodiments, the location tracking system 30 is configured to receive a location data indicative of at least one location 51*q*, 51*r*, 51*s*, 51*t*, 51*u* of the remote computing device 12 during at least a portion of a period from after when the self-driving vehicle fleet drops off the rider to before when the self-driving vehicle fleet picks up the rider. The at least one location 51*q*, 51*r*, 51*s*, 51*t*, 51*u* can comprise indoor locations and/or outdoor locations. The route 95 walked by the rider can move through a building (where indoor locations can be helpful) and can move through outdoor locations (e.g., through a parking lot, through a nature preserve, and/or along a street). In some embodiments, the rider 12 moves along the walking route 95 by running or by taking wheeled transportation.

Some embodiments comprise using a vehicle management system that includes a self-driving vehicle fleet. The fleet can comprise at least one of a first self-driving vehicle 2*a* and a second self-driving vehicle 2*b*. Embodiments can comprise coupling communicatively the vehicle management system to a remote computing device 12 of a rider. The remote computing device 12 can be configured to operate software adapted to enable the rider to select a pick-up location (e.g., via an "app"). The rider can launch an "app." The "app" can present an option for the rider to select a pick-up location and a pick-up time. In some cases, however, the user will not select a pick-up time and/or a pick-up location, and the vehicle management system can take steps to prevent the rider from being stranded without a ride.

Some embodiments comprise dropping off, by a vehicle of the self-driving vehicle fleet, the rider at a drop-off location 50 (shown in FIGS. 23 and 24). Dropping off the rider can include stopping a vehicle such that the rider exits the vehicle.

Some embodiments comprise determining, by the vehicle management system, that the remote computing device 12 is no longer communicatively coupled to the vehicle management system; and/or prompting, by the vehicle management system, the first self-driving vehicle 2*a* to drive to a first area 67 within a predetermined distance of the drop-off location 50 to pick up the rider in response to determining that the remote computing device 12 is no longer communicatively coupled to the vehicle management system. In some embodiments, the predetermined distance is 100 feet. In some embodiments, the predetermined distance is 250 feet. In some embodiments, the predetermined distance is 500 feet. Embodiments can comprise picking up, by the first self-driving vehicle 2*a*, the rider in the first area 67 in response to the prompting.

Some embodiments comprise instructing, by at least one of the vehicle management system and the remote computing device 12, the self-driving vehicle to pick up the rider at a first pick-up time selected in response to a prompting.

Embodiments can comprise determining, by the vehicle management system, that the remote computing device 12 is no longer communicatively coupled to the vehicle management system in response to determining that the vehicle management system has not received a first wireless communication from the remote computing device 12 for a predetermined amount of time. The predetermined amount of time can be greater than thirty seconds and less than sixty minutes.

After prompting the first self-driving vehicle 2*a* to drive to a first area 67, some embodiments comprise determining, by the vehicle management system, that the rider is not located in the first area 67 within 250 feet of the drop-off location 50; instructing, by the vehicle management system, the first self-driving vehicle 2*a* to move away from the first area 67 in response to determining that the rider is not located in the first area 67; and/or instructing at least a first portion of the self-driving vehicle fleet to return to the first area 67 after a first period of time to attempt to pick up the rider. The first portion can comprise the first self-driving vehicle 2*a*. The first portion can comprise the second self-driving vehicle 2*b*. In other words, either the first self-driving vehicle 2*a* or the second self-driving vehicle 2*b* can be the portion of the fleet that returns to the first area 67.

Some embodiments comprise determining, by the vehicle management system, that the rider is not located in the first area 67 within 250 feet of the drop-off location 50 after the first period of time; instructing, by the vehicle management system, the first portion of the self-driving vehicle fleet to move away from the first area 67; and/or instructing, by the vehicle management system, at least a second portion of the self-driving vehicle fleet to return to the first area 67 after a second period of time that is greater than the first period of time to attempt to pick up the rider. The second portion can comprise the first self-driving vehicle 2*a*. The second portion can comprise the second self-driving vehicle 2*b*.

Some embodiments comprise determining, by the vehicle management system, that the rider is not located in the first area 67 within 250 feet of the drop-off location 50 after the second period of time; instructing, by the vehicle management system, at least the second portion of the self-driving vehicle fleet to move away from the first area 67; and/or instructing, by the vehicle management system, at least a third portion of the self-driving vehicle fleet to return to the first area 67 after a third period of time that is greater than the second period of time to attempt to pick up the rider. The third portion can comprise the first self-driving vehicle 2*a*. The third portion can comprise the second self-driving vehicle 2*b*.

After prompting the first self-driving vehicle 2*a* to drive to the first area 67, some embodiments comprise determining, by the first self-driving vehicle 2*a*, that the rider is not located in the first area 67 within 250 feet of the drop-off location 50; and/or in response to determining that the rider is not located in the first area 67, prompting, by the vehicle management system, the first self-driving vehicle 2*a* to move to a parking location that is located outside of the first area 67. Moving to the parking location can be finding a location to "park" such that the vehicle is not moving. The parking location can be a parking garage, a parking spot, etc.

In some embodiments, the vehicle management system knows where the rider is located by tracking a location of the rider's remote computing device 12. However, when the remote computing device 12 is not communicating with the vehicle management system, the vehicle management system may not know the location of the rider. Some embodiments address this program by using an image analysis system 69 to visually recognize if the rider is present (e.g., in the area 67).

In some embodiments, the vehicle management system comprises an image analysis system 69 having program instructions configured to analyze images. The first self-driving vehicle 2*a* comprises a camera 111 (shown in FIG. 21) configured to take the images of places located outside the first self-driving vehicle 2*a*. For example, the first self-driving vehicle 2*a* can include cameras 111 pointing all around the vehicle 2*a* such that the vehicle guidance system 117 can take pictures 360 degrees around the vehicle to "see" if the rider is located within sight of the vehicle 2*a*.

Some embodiments comprise taking a picture, by the camera 111 of the first self-driving vehicle 2*a*, of at least a portion of the first area 67. For example, the first self-driving vehicle 2*a* can drive to the area 67 and then can take a picture with the camera 111 to enable the image analysis system 69 to determine if the rider is shown in the picture. If the rider is not present in the one or more pictures, then the vehicle management system can assume the rider is not located in the area.

Some embodiments comprise determining, by the vehicle management system, that the rider is not located in the first area 67 by using the image analysis system 69 to analyze the picture (e.g., to determine that the rider is not shown in the picture); and instructing, by the vehicle management system, the first self-driving vehicle 2*a* to move away (e.g., drive away) from the first area 67 in response to determining that the rider is not located in the first area 67.

In some embodiments, the vehicle management system terminates the emergency rendezvous mode in response to communication with the remote computing device 12 being restored. In some cases, if communication is restored, the emergency rendezvous mode is not necessary because the rider can use an "app" on her remote computing device 12 to request a ride (and specify a pick-up time and pick-up location). In some embodiments, the vehicle management system ceases trying to pick-up the rider in response to communication with the remote computing device 12 being restored.

After determining that the remote computing device 12 is no longer communicatively coupled to the vehicle management system and prompting the first self-driving vehicle 2*a* to drive to the first area 67, some embodiments comprise: determining, by the vehicle management system, that communicative coupling between the vehicle management system and the remote computing device 12 has been restored; and in response to determining that the communicative coupling has been restored, prompting, by the vehicle management system, the first self-driving vehicle 2*a* to move away (e.g., drive away) from the first area 67.

Some embodiments comprise sending a second wireless communication from the vehicle management system to the remote computing device 12 in response to determining that the remote computing device 12 is no longer communicatively coupled to the vehicle management system. The second wireless communication can be configured to elicit a reply wireless communication from the remote computing device 12 to the vehicle management system after the remote computing device 12 regains wireless communication abilities. Some embodiments later comprise prompting, by the vehicle management system, the first self-driving vehicle 2*a* to move away (e.g., drive away) from the first area 67 in response to receiving, by the vehicle management system, the reply wireless communication.

In some embodiments, the vehicle management system predicts a pick-up time. The predicted pick-up time can be used in conjunction with the predicted pick-up location.

In some embodiments, the vehicle management system comprises a memory having data regarding lengths of time between past drop-off times and past pick-up times associated with at least a portion of a second area within one mile of the drop-off location 50. For example, a first previous rider may be been dropped off within 500 feet of the drop-off location at 10:00 AM and picked up at 11:15 AM for a length of time of 1.25 hours. A second previous rider may be been dropped off within 250 feet of the drop-off location at 8:00 AM and picked up at 9:45 AM for a length of time of 1.75 hours. Both of the drop-off locations were within one mile of the drop-off location 50.

Some embodiments comprise selecting, by the vehicle management system at least partially based on the data regarding the lengths of time, a first pick-up time, and later prompting, by the vehicle management system, the first self-driving vehicle 2*a* to pick up the rider at the first pick-up time.

The vehicle management system can select the pick-up time for the rider with an unknown location at least partially based on data regarding the lengths of time associated with the first previous rider (time=1.25 hours) and the second previous rider (time=1.75 hours) by choosing a pick-up time 1.25 hours after the drop-off time of the rider with the unknown location, by choosing a pick-up time 1.75 hours after the drop-off time of the rider with the unknown location, by choosing a pick-up time 1.50 hours after the drop-off time of the rider with the unknown location (due to an average of 1.25 hours and 1.75 hours equaling 1.5 hours).

Of course, there are many ways in which the vehicle management system can select the first pick-up time for the rider with an unknown location based on previous lengths of time from other riders. As used in the context of this embodiment, "based on" means that the lengths of time between past drop-off times and past pick-up times associated with at least a portion of a second area within one mile of the drop-off location 50 are taken into account to select the first pick-up time (even though other factors such as time of day, a rider profile, rider preferences, the last known location 51*u*, etc. may also be taken into account).

In some embodiments, the lengths of time between past drop-off times of the rider with the unknown location and past pick-up times of the rider with the unknown location are used to predict when the rider will want to be picked up this time. This data can be particularly helpful because the data is based on behavior of the rider with the unknown location (rather than being based on data from other riders).

In some embodiments, the vehicle management system comprises a memory having data regarding lengths of time between past drop-off times of the rider and past pick-up times of the rider. Embodiments can comprise selecting, by the vehicle management system at least partially based on the data regarding the lengths of time, a first pick-up time, and later prompting, by the vehicle management system, the first self-driving vehicle 2*a* to pick up the rider at the first pick-up time.

In some embodiments, the vehicle management system comprises a memory having data regarding lengths of time between past drop-off times of the rider and past pick-up times of the rider associated with at least a portion of a second area within 500 feet of the drop-off location 50. Embodiments can comprise selecting, by the vehicle management system at least partially based on the data regarding the lengths of time, a first pick-up time, and later prompting, by the vehicle management system, the first self-driving vehicle 2*a* to pick up the rider at the first pick-up time.

Even if the current location of the rider is unknown, the memory 31 of the vehicle management system may contain other location information (e.g., locations 51*q*, 51*r*, 51*s*, 51*t*, 51*u*) for the rider from a period of time from after when the self-driving vehicle fleet drops off the rider to before the vehicle management system stopped receiving location data for the remote computing device 12 of the rider. This other location information can be used to predict a suitable pick-up time for the rider. For example, if the last known location 51u is two miles away from the drop-off location 50 and the other locations 51q, 51r, 51s, 51t (and their timestamps) indicate that the rider is walking at a rate of one mile per twenty minutes, then the pick-up time likely is not for at least forty minutes. Waiting forty minutes to attempt to pick up the rider at the drop-off location 50 can avoid wasting the vehicle's time. For example, the vehicle 2a could provide a rider to another person during the forty minutes.

Receiving the last known location 51u can enable the vehicle management system to know lengths of time that are typical for that particular location. For example, if the last known location 51u (which can be a GPS location) is inside a movie theater and the average movie is two hours long, then the vehicle management system can predict that the rider will exit the theater approximately two hours from when she entered the theater. This information can help the vehicle management system accurately predict a suitable pick-up time for the rider even though the rider's remote computing device is not communicating with the vehicle management system. This approach is particularly helpful for areas with many attendees (e.g., movie theaters, professional sporting events) because this approach can enable the vehicle management system to have a sufficient number of vehicles ready to provide rides when the event is over.

Some embodiments comprise receiving, by the vehicle management system, a first GPS location data (e.g., location 51u) indicative of at least one location of the remote computing device 12 of the rider during a period of time from after when the self-driving vehicle fleet drops off the rider to before when the remote computing device 12 is no longer communicatively coupled to the vehicle management system; and/or prompting, by the vehicle management system, the first self-driving vehicle 2a to pick up the rider at a first pick-up time selected by the vehicle management system at least partially based on the first GPS location data (e.g., location 51u).

Having a vehicle trying to pick up a rider is an expense for the transportation service provider. The cost (e.g., in dollars) of this expense could be passed onto the rider. For example, if a vehicle 2a spends an hour trying to pick up the rider due to the rider's remote computing device 12 not communicating with the vehicle management system, then the vehicle management system could charge an account of the rider an amount (e.g., $50) even though the rider did not request a ride. While the emergency rendezvous mode is convenient if the rider actually needs a ride, some riders will not want to pay for this convenience. As a result, in some embodiments, the rider can opt into and/or opt out of eligibility for the emergency rendezvous mode.

Some embodiments comprise receiving, by the vehicle management system from the remote computing device 12, an indication that the rider has requested for the self-driving vehicle fleet to pick up the rider at a second area within 500 feet of the drop-off location 50 in response to the remote computing device 12 being unable to communicate with the vehicle management system. In some embodiments, this indication could be the result of the rider selecting a button in an "app" to enable her eligibility for the emergency rendezvous mode. Some embodiments comprise driving, by the vehicle management system, the first self-driving vehicle 2a to the first area 67 in response to the receiving the indication and in response to determining that the remote computing device 12 is no longer communicatively coupled to the vehicle management system.

In some embodiments, an administrative service such as Apple Inc., T-Mobile USA Inc., and AT&T Inc. notifies the vehicle management system that the remote computing device 12 is not communicating, is communicatively uncoupled, is turned off, has a dead battery, is non-responsive, etc., which enables the vehicle management system to enter an emergency rendezvous mode in which the vehicle management system is configured to predict an appropriate pick-up location for the rider. The pick-up location can be a pick-up location previously selected by the rider (e.g., via an "app" on the rider's remote computing device 12). The pick-up location can be the drop-off location 50 (which can be helpful if the rider did not previously select a pick-up location).

The administrative service can be a telecommunications service provider. The administrative service can be an Internet Service Provider ("ISP"). An Internet Service Provider provides services for accessing the Internet.

Some embodiments comprise receiving, by the vehicle management system (e.g., from an administrative service), a notification that the remote computing device 12 is not currently able to send communications and/or is not currently able to receive communications. Some embodiments comprise prompting, by the vehicle management system, the first self-driving vehicle 2a to drive to a first area within a predetermined distance of the drop-off location 50 to pick up the rider in response to receiving the notification.

Some embodiments comprise using a vehicle management system having a self-driving vehicle fleet. The fleet can comprise at least one of a first self-driving vehicle 2a and a second self-driving vehicle 2b. Embodiments can comprise coupling communicatively the vehicle management system to a remote computing device 12 of a rider. The remote computing device 12 can be configured to operate software configured to enable the rider to select a first pick-up location. The self-driving vehicle fleet can drop-off the rider at a drop-off location 50.

Some embodiments comprise receiving, by the vehicle management system, a first indication that the remote computing device 12 is communicatively disabled; and prompting, by the vehicle management system, the first self-driving vehicle 2a to drive to a first area within a predetermined distance of the drop-off location 50 to pick up the rider in response to receiving the first indication. In some embodiments, the predetermined distance is 250 feet. Some embodiments comprise picking up, by the first self-driving vehicle 2a, the rider in the first area in response to the prompting.

The first indication can be a communication and/or data from an administrative service that informs the vehicle management system the remote computing device 12 is communicatively disabled. The vehicle management system can receive the indication in response to asking the administrative service regarding the status of the remote computing device 12. In some embodiments, the vehicle management system periodically "asks" (e.g., via software that generates a communication that requests information) the administrative service regarding the status of the remote computing device 12 (e.g., to determine if the remote computing device 12 is "on" and/or able to communicate).

As used herein, "communicatively disabled" means that the remote computing device 12 is at least one of turned "off", has a "dead" battery, is unable to send wireless communications, is unable to receive wireless communications, and has suspended radio-frequency transmissions (e.g., to disable Bluetooth, Wi-Fi, and telephone communications).

As used herein, "communicatively enabled" means that the remote computing device 12 is at least one able to send wireless communications, able to receive wireless communications, and has enabled radio-frequency transmissions (e.g., to enable Bluetooth, Wi-Fi, and telephone communications).

After receiving the first indication and prompting the first self-driving vehicle 2a to drive to the first area, some embodiments comprise receiving, by the vehicle management system, a second indication that the remote computing device 12 is communicatively enabled; and in response to receiving the second indication that the remote computing device 12 is communicatively enabled, prompting, by the vehicle management system, the first self-driving vehicle 2a to move away from the first area (without picking up the rider).

Some embodiments comprise receiving, by the vehicle management system, first location data indicative of the first pick-up location. The first location data can be GPS coordinates, a street address, or any other type of data that indicates a location. For example, GPS coordinates can indicate a pick-up location (and can enable the vehicle 2a to use the GPS coordinates to drive to the pick-up location).

Some embodiments comprise receiving, by the vehicle management system, a first indication that the remote computing device 12 is communicatively disabled; prompting, by the vehicle management system, the first self-driving vehicle 2a to drive to a first area within a predetermined distance of the first pick-up location in response to receiving the first indication that the remote computing device 12 is communicatively disabled; and/or picking up, by the first self-driving vehicle 2a, the rider in the first area in response to the prompting.

Interpretation

The self-driving vehicle can be any suitable vehicle. For example, the self-driving vehicle 2 can be a Tesla Model S made by Tesla, Inc. The Tesla Model S can include the Enhanced Autopilot package and the Full Self-Driving Capability package. The Full Self-Driving Capability package includes eight active cameras to enable full self-driving in almost all circumstances.

The self-driving vehicle 2 can also be a Waymo car. Waymo was formerly the Google self-driving car project. Waymo, which is owned by Alphabet Inc., has logged thousands of self-driving miles over many years. Waymo vehicles have sensors and software that are designed to detect pedestrians, cyclists, vehicles, roadwork and more from a distance of up to two football fields away in all directions. Waymo has stated that its software leverages over four million miles of real world driving data. In some embodiments, self-driving vehicles sometimes drive themselves, sometimes are driven remotely by a computing system, and sometimes are driven manually by a human turning a steering wheel, operating pedals, and performing other driver functions. In several embodiments, a self-driving vehicle drives without a human inside the vehicle to pick up the human and then lets the human drive the vehicle. Although in some cases, the human may choose not to drive the vehicle and instead may allow the vehicle to drive (e.g., steer and control speed) itself (e.g., in response to a destination requested by the human).

The remote computing device 12 can be a smartphone, a tablet computer, a laptop computer, a desktop computer, a server, augmented reality glasses, an implanted computer, and/or any type of computer that is located remotely relative to the vehicle. In some embodiments, the remote computing device 12 is an iPhone made by Apple Inc. or an Android phone based on software made by Alphabet Inc. The remote computing device 12 can comprise a speaker configured to emit sounds, a microphone configured to record sounds, and a display screen configured to display images. The remote computing device 12 can comprise a battery configured to provide electrical power to operate the remote computing device 12.

In some embodiments, portions of the vehicle management system 65 can be physically coupled to the self-driving vehicle 2 while other others of the vehicle management system 65 are not physically coupled to the vehicle 2 and are located remotely relative to the vehicle 2.

In some embodiments, at least a portion of the vehicle management system 65 is located in the vehicle 2. In several embodiments, at least a portion of the vehicle management system 65 is located remotely relative to the vehicle 2. The vehicle management system 65 can comprise many servers, computers, and vehicles. The vehicle management system 65 can comprise cloud computing and cloud storage.

In several embodiments, the entire vehicle management system 65 is located in the self-driving vehicle 2. The vehicle 2 can comprise the vehicle management system 65. In some embodiments, a first portion of the vehicle management system 65 is physically coupled to the vehicle 2, and a second portion of the vehicle management system 65 is not physically coupled to the vehicle 2. The second portion can be located remotely relative to the vehicle 2. In several embodiments, the entire vehicle management system 65 is located remotely relative to the vehicle 2.

The phrase "communicatively coupling" can include any type of direct and/or indirect coupling between the self-driving vehicle 2, remote computing device 12, and vehicle management system 65. For example, the remote computing device 12 can be communicatively coupled to the vehicle management system 65 via servers, Wi-Fi networks, cellular networks, and other communication systems.

In some embodiments, one or more of the pick-up location 120, parking location 134, drop-off location 140, most recent drop-off location 166, pre-determined drop-off location 192, first pick-up location 220, and/or the pick-up location 320 are in the same location. In some embodiments, one or more of the pick-up location 120, parking location 134, drop-off location 140, most recent drop-off location 166, pre-determined drop-off location 192, first pick-up location 220, and/or the pick-up location 320 are in different locations.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The term "app", as used in this disclosure, can includes native apps and mobile cloud apps (and Web apps). Native apps are installed directly on remote computing devices, whereby developers create separate app versions for each type of remote computing device (e.g., iPhone devices and Android devices). Native apps may be stored on the remote computing device out of the box, or the native apps can be downloaded from a public or private app store and installed on the remote computing device. Self-driving vehicle data associated with native apps can also stored on the remote computing device, although data can be stored remotely and accessed by the native app. Depending on the nature of the native app, Internet connectivity may not be required.

Mobile cloud apps are very similar to Web-based apps. The main similarity is that both mobile cloud apps and Web apps run on servers external to the remote computing device and may require the use of a browser on the remote computing device to display and then use the app user interface (UI). Mobile cloud apps can be native apps rebuilt to run in the mobile cloud; custom apps developed for mobile devices; or third-party apps downloaded to the cloud from external sources. Some organizations offer both a native and mobile cloud versions of their applications. In short, the term "app" includes native apps, mobile cloud apps, and other application software.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A method of using a vehicle management system comprising a self-driving vehicle fleet including a plurality of self-driving vehicles, the method comprising:
    communicatively coupling the vehicle management system to a remote computing device, wherein the remote computing device is configured to operate software adapted to enable a selection of a first pick-up location; and
    directing, via the vehicle management system, a first self-driving vehicle from the self-driving vehicle fleet, to drop-off a rider at a drop-off location.

2. The method of claim 1, further comprising instructing, by the vehicle management system, the first self-driving vehicle to go to a predetermined pick-up location of the rider in response to determining, by the vehicle management system, that the remote computing device is no longer communicatively coupled to the vehicle management system.

3. The method of claim 1, further comprising:
determining, by the vehicle management system, that the remote computing device is no longer communicatively coupled to the vehicle management system; and
prompting, by the vehicle management system, the first self-driving vehicle to drive to a first area within 250 feet of the drop-off location to pick up the rider in response to determining that the remote computing device is no longer communicatively coupled to the vehicle management system.

4. The method of claim 3, further comprising picking up, by the first self-driving vehicle, the rider in the first area in response to the prompting.

5. The method of claim 3, further comprising determining, by the vehicle management system, that the remote computing device is no longer communicatively coupled to the vehicle management system by sending a first wireless communication to the remote computing device and later determining that the remote computing device did not respond to the first wireless communication.

6. The method of claim 3, further comprising determining, by the vehicle management system, that the remote computing device is no longer communicatively coupled to the vehicle management system in response to determining that the vehicle management system has not received a first wireless communication from the remote computing device for a predetermined amount of time.

7. The method of claim 6, wherein the predetermined amount of time is greater than thirty seconds and less than sixty minutes.

8. The method of claim 3, further comprising determining, by the vehicle management system, that the remote computing device is no longer communicatively coupled to the vehicle management system by determining that a battery of the remote computing device is depleted.

9. The method of claim 3, further comprising after the prompting:
determining, by the vehicle management system, that the rider is not located in the first area within 250 feet of the drop-off location;
instructing, by the vehicle management system, the first self-driving vehicle to move away from the first area in response to determining that the rider is not located in the first area; and
instructing at least a first portion of the self-driving vehicle fleet to return to the first area after a first period of time to attempt to pick up the rider.

10. The method of claim 9, further comprising:
determining, by the vehicle management system, that the rider is not located in the first area within 250 feet of the drop-off location after the first period of time;
instructing, by the vehicle management system, the first portion of the self-driving vehicle fleet to move away from the first area; and
instructing, by the vehicle management system, at least a second portion of the self-driving vehicle fleet to return to the first area after a second period of time that is greater than the first period of time to attempt to pick up the rider.

11. The method of claim 10, further comprising:
determining, by the vehicle management system, that the rider is not located in the first area within 250 feet of the drop-off location after the second period of time;
instructing, by the vehicle management system, at least the second portion of the self-driving vehicle fleet to move away from the first area; and
instructing, by the vehicle management system, at least a third portion of the self-driving vehicle fleet to return to the first area after a third period of time that is greater than the second period of time to attempt to pick up the rider.

12. The method of claim 3, further comprising after prompting the first self-driving vehicle to drive to the first area:
determining, by the first self-driving vehicle, that the rider is not located in the first area within 250 feet of the drop-off location; and
in response to determining that the rider is not located in the first area, prompting, by the vehicle management system, the first self-driving vehicle to move to a parking location that is located outside of the first area.

13. The method of claim 3, wherein the vehicle management system comprises an image analysis system having program instructions configured to analyze images, and the first self-driving vehicle comprises a camera configured to take the images of places located outside the first self-driving vehicle, the method further comprising, after the prompting:
taking a picture, by the camera of the first self-driving vehicle, of at least a portion of the first area;
determining, by the vehicle management system, that the rider is not located in the first area by using the image analysis system to analyze the picture; and
instructing, by the vehicle management system, the first self-driving vehicle to move away from the first area in response to determining that the rider is not located in the first area.

14. The method of claim 3, further comprising after determining that the remote computing device is no longer communicatively coupled to the vehicle management system and prompting the first self-driving vehicle to drive to the first area:
determining, by the vehicle management system, that communicative coupling between the vehicle management system and the remote computing device has been restored; and
in response to determining that the communicative coupling has been restored, prompting, by the vehicle management system, the first self-driving vehicle to move away from the first area.

15. The method of claim 3, further comprising sending a second wireless communication from the vehicle management system to the remote computing device in response to determining that the remote computing device is no longer communicatively coupled to the vehicle management system, wherein the second wireless communication is configured to elicit a reply wireless communication from the remote computing device to the vehicle management system after the remote computing device regains wireless communication abilities, and later prompting, by the vehicle management system, the first self-driving vehicle to move away from the first area in response to receiving, by the vehicle management system, the reply wireless communication.

16. The method of claim 3, wherein the vehicle management system comprises a memory having data regarding lengths of time between past drop-off times and past pick-up times associated with at least a portion of a second area within one mile of the drop-off location, the method further comprising selecting, by the vehicle management system at least partially based on the data regarding the lengths of time, a first pick-up time, and later prompting, by the vehicle management system, the first self-driving vehicle to pick up the rider at the first pick-up time.

17. The method of claim 3, wherein the vehicle management system comprises a memory having data regarding lengths of time between past drop-off times of the rider and past pick-up times of the rider, the method further comprising selecting, by the vehicle management system at least partially based on the data regarding the lengths of time, a first pick-up time, and later prompting, by the vehicle management system, the first self-driving vehicle to pick up the rider at the first pick-up time.

18. The method of claim 3, wherein the vehicle management system comprises a memory having data regarding lengths of time between past drop-off times of the rider and past pick-up times of the rider associated with at least a portion of a second area within 500 feet of the drop-off location, the method further comprising selecting, by the vehicle management system at least partially based on the data regarding the lengths of time, a first pick-up time, and later prompting, by the vehicle management system, the first self-driving vehicle to pick up the rider at the first pick-up time.

19. The method of claim 3, further comprising:

receiving, by the vehicle management system, a first GPS location data indicative of at least one location of the remote computing device of the rider during a period of time after a vehicle from the self-driving vehicle fleet drops off the rider to the drop-off location and before when the remote computing device becomes no longer communicatively coupled to the vehicle management system; and prompting, by the vehicle management system, the first self-driving vehicle to pick up the rider at a first pick-up time selected by the vehicle management system at least partially based on the first GPS location data.

20. The method of claim 3, further comprising:

receiving, by the vehicle management system from the remote computing device, an indication that the rider has requested for the self-driving vehicle fleet to pick up the rider at a second area within 500 feet of the drop-off location in response to the remote computing device being unable to communicate with the vehicle management system; and driving, by the vehicle management system, the first self-driving vehicle to the first area in response to the receiving and in response to the determining.

21. The method of claim 1, further comprising:

receiving, by the vehicle management system, a first indication that the remote computing device is communicatively disabled; and prompting, by the vehicle management system, the first self-driving vehicle to drive to a first area within a predetermined distance of the drop-off location to pick up the rider in response to receiving the first indication.

22. The method of claim 21, wherein the predetermined distance is 250 feet.

23. The method of claim 21, further comprising picking up, by the first self-driving vehicle, the rider in the first area in response to the prompting.

24. The method of claim 21, after receiving the first indication and prompting the first self-driving vehicle to drive to the first area, the method further comprising:

receiving, by the vehicle management system, a second indication that the remote computing device is communicatively enabled; and in response to receiving the second indication that the remote computing device is communicatively enabled, prompting, by the vehicle management system, the first self-driving vehicle to move away from the first area.

25. The method of claim 1, further comprising:

receiving, by the vehicle management system, first location data indicative of the first pick-up location;

receiving, by the vehicle management system, a first indication that the remote computing device is communicatively disabled;

prompting, by the vehicle management system, the first self-driving vehicle to drive to a first area within a predetermined distance of the first pick-up location in response to receiving the first indication that the remote computing device is communicatively disabled; and picking up, by the first self-driving vehicle, the rider in the first area in response to the prompting.

* * * * *